US011019619B2

United States Patent
Gupta et al.

(10) Patent No.: US 11,019,619 B2
(45) Date of Patent: May 25, 2021

(54) REFERENCE SIGNAL MULTIPLEXING IN SHORTENED TRANSMISSION TIME INTERVALS

(71) Applicant: QUALCOMM Incorporated, San Diego, CA (US)

(72) Inventors: Abhinav Gupta, San Jose, CA (US); Seyedkianoush Hosseini, San Diego, CA (US); Amir Farajidana, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 16/176,397

(22) Filed: Oct. 31, 2018

(65) Prior Publication Data

US 2019/0141703 A1 May 9, 2019

Related U.S. Application Data

(60) Provisional application No. 62/581,641, filed on Nov. 3, 2017.

(51) Int. Cl.
*H04W 72/04* (2009.01)
*H04L 5/00* (2006.01)
*H04W 72/00* (2009.01)
*H04L 5/14* (2006.01)
*H04L 1/00* (2006.01)

(52) U.S. Cl.
CPC ....... *H04W 72/0446* (2013.01); *H04L 5/0048* (2013.01); *H04L 5/0051* (2013.01); *H04W 72/005* (2013.01); *H04L 1/0026* (2013.01); *H04L 5/005* (2013.01); *H04L 5/0057* (2013.01); *H04L 5/0091* (2013.01); *H04L 5/1469* (2013.01)

(58) Field of Classification Search
None
See application file for complete search history.

(56) References Cited

PUBLICATIONS

International Search Report and Written Opinion—PCT/US2018/058717—ISA/EPO—dated Feb. 15, 2019 (180652WO).

(Continued)

*Primary Examiner* — James P Duffy
(74) *Attorney, Agent, or Firm* — Qualcomm Incorporated

(57) ABSTRACT

Methods, systems, and devices for wireless communications are described for mapping demodulation reference signal (DMRS) data to resource elements (REs) within a shortened transmission time interval (sTTI) so as to avoid collision with other reference signal data that the sTTI may be configured to include, such as channel state information reference signal (CSI-RS) data, cell-specific reference signal (CRS) data, or the like. A base station may select a DMRS mapping pattern for an sTTI based on one or more factors, including a CSI-RS configuration, a CRS configuration of the sTTI, an antenna port configuration for CRS (e.g., a number of CRS ports and associated number of layers configured for CRS, such as a one port CRS having a two-layer configuration, or a two port CRS having a four-layer configuration), or a type of subframe that includes the sTTI.

47 Claims, 30 Drawing Sheets

(56) References Cited

PUBLICATIONS

LG Electronics: "Consideration on DL DMRS for sTTI", 3GPP Draft, R1-1717257 DL DMRS for STTI, 3rd Generation Partnership Project (3GPP), Mobile Competence Centre ; 650, Route Des Lucioles ; F-06921 Sophia-Antipolis Cedex , France, vol. RAN WG1, No. Prague. Czech Republic, Oct. 9, 2017-Oct. 13, 2017 Oct. 8, 2017 (Oct. 8, 2017). XP051340448, Retrieved from the Internet: URL:http://www.3gpp.org/ftp/Meetings3GPP_SYNC/RAN1/Docs/ [retrieved on Oct. 8, 2017].

LG Electronics., "Discussions on DL DMRS Design for Shortened TTI", 3GPP Draft, R1-1702428 Discussions on DL DMRS Design for Shortened TTI, vol. RAN WG1, (Feb. 12, 2017), Retrieved from the Internet: URL:http://www.3gpp.org/ftp/Meetings_3GPPSYNC/RAN1/Docs/[retrieved on Feb. 12, 2017].

CDM-4 RE Mapping for 12-ports CIS-RS

Pattern B2 for sTTI0

Pattern C2 for sTTI0

Pattern D2 for sTTI0

Pattern A2 for sTTI1

Pattern B2 for sTTI1

Pattern C2 for sTTI1

Pattern D2 for sTTI1

REFERENCE SIGNAL MULTIPLEXING IN SHORTENED TRANSMISSION TIME INTERVALS

CROSS REFERENCES

The present Application for Patent claims priority to U.S. Provisional Patent Application No. 62/581,641 by GUPTA, et al., entitled "Reference Signal Multiplexing in Shortened Transmission Time Intervals," filed Nov. 3, 2017, assigned to the assignee hereof, and expressly incorporated by reference in its entirety.

BACKGROUND

The following relates generally to wireless communication, and more specifically to reference signal multiplexing in shortened transmission time intervals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems (e.g., NR systems), a UE may communicate with a base station on a carrier using shortened transmission time intervals (sTTIs), whose length may be reduced or shorter than a legacy Long Term Evolution (LTE) subframe or a 1 ms TTI. The base station may transmit uplink reference signal data, such as channel state information reference signal (CSI-RS) data, cell-specific reference signal (CRS) data, or demodulation reference signal (DMRS) data, within one or more sTTIs. Techniques for mapping different types of reference signal data to resource elements (REs) within an sTTI may be desired.

SUMMARY

In some wireless communications systems (e.g., NR systems), a user equipment (UE) may communicate with a base station on a carrier using shortened transmission time intervals (sTTIs). The base station may transmit uplink reference signal data, such as channel state information reference signal (CSI-RS) data, cell-specific reference signal (CRS) data, or demodulation reference signal (DMRS) data, within one or more sTTIs. Generally, the techniques described herein provide for mapping DMRS data to resource elements (REs) within an sTTI so as to avoid collision with (e.g., avoid mapping to a same RE as) other reference signal data that the sTTI may be configured to include, such as CSI-RS data or CRS data.

Some wireless communications systems may use multiple types of sTTIs. For example, a first type of sTTI may include two or three orthogonal frequency-division multiplexing (OFDM) symbols within a subframe, and a second type of sTTI may include one slot within a subframe. A slot may include seven OFDM symbols.

For each type of sTTI, one or more DMRS mapping patterns may be defined. In some cases, a DMRS pattern may be defined over two resource blocks (RBs), each RB including 12 resource elements (e.g., RE0-RE11). A DMRS mapping pattern may specify a set of REs within an sTTI to which a base station may map DMRS data. The base station may select a DMRS mapping pattern for an sTTI based on one or more factors, configure the sTTI according to the selected DMRS mapping pattern, and transmit the configured REs (e.g., REs included in the sTTI) to one or more UEs. Factors upon which a base station may base selection of the DMRS mapping pattern include but are not limited to a CSI-RS configuration of the sTTI, a CRS configuration of the sTTI, an index of the sTTI within the subframe, an antenna port configuration for CRS (e.g., a number of CRS ports and associated number of layers configured for CRS, such as a one port CRS having a two-layer configuration, or a two port CRS having a four-layer configuration), or a type of the subframe.

A method of wireless communication is described. The method may include identifying a reference signal configuration of an sTTI in a subframe, the reference signal configuration including at least one of a CSI-RS configuration or a CRS configuration, selecting, based at least in part on the reference signal configuration of the sTTI, a DMRS mapping pattern from a plurality of DMRS mapping patterns for mapping DMRS data to REs within the sTTI, configuring REs within the sTTI according to the selected DMRS mapping pattern, and transmitting DMRS data on the configured REs.

An apparatus for wireless communication is described. The apparatus may include means for identifying a reference signal configuration of an sTTI in a subframe, the reference signal configuration including at least one of a CSI-RS configuration or a CRS configuration, means for selecting, based at least in part on the reference signal configuration of the sTTI, a DMRS mapping pattern from a plurality of DMRS mapping patterns for mapping DMRS data to REs within the sTTI, means for configuring REs within the sTTI according to the selected DMRS mapping pattern, and means for transmitting DMRS data on the configured REs.

Another apparatus for wireless communication is described. The apparatus may include a processor, memory in electronic communication with the processor, and instructions stored in the memory. The instructions may be operable to cause the processor to identify a reference signal configuration of an sTTI in a subframe, the reference signal configuration including at least one of a CSI-RS configuration or a CRS configuration, select, based at least in part on the reference signal configuration of the sTTI, a DMRS mapping pattern from a plurality of DMRS mapping patterns for mapping DMRS data to REs within the sTTI, configure REs within the sTTI according to the selected DMRS mapping pattern, and transmit DMRS data on the configured REs.

A non-transitory computer-readable medium for wireless communication is described. The non-transitory computer-readable medium may include instructions operable to cause a processor to identify a reference signal configuration of an sTTI in a subframe, the reference signal configuration including at least one of a CSI-RS configuration or a CRS configuration, select, based at least in part on the reference signal configuration of the sTTI, a DMRS mapping pattern from a plurality of DMRS mapping patterns for mapping DMRS data to REs within the sTTI, configure REs within the sTTI according to the selected DMRS mapping pattern, and transmit DMRS data on the configured REs.

In some examples of the method, apparatus, and non-transitory computer-readable medium described above, selecting the DMRS mapping pattern may include selecting a first DMRS mapping pattern to be applied to the sTTI, the first DMRS mapping pattern including DMRS data for a first antenna port pair being mapped to a second-lowest-frequency RE and a ninth-lowest-frequency RE within a first resource block (RB) of an OFDM symbol and to a fourth-lowest-frequency RE and an eleventh-lowest-frequency RE within a second RB of the OFDM symbol where the sTTI includes two or three OFDM symbols. In some examples of the method, apparatus, and non-transitory computer-readable medium described above, the first DMRS mapping pattern may further include DMRS data for a second antenna port pair being mapped to a lowest-frequency RE and an eighth-lowest-frequency RE within the first RB of the OFDM symbol and to a third-lowest-frequency RE and a tenth-lowest-frequency RE within the second RB of the OFDM symbol.

Some examples of the method, apparatus, and non-transitory computer-readable medium described above may further include processes, features, means, or instructions for identifying the CSI-RS configuration as lacking CSI-RS data. Some examples of the method, apparatus, and non-transitory computer-readable medium described above may further include processes, features, means, or instructions for identifying the CRS configuration as lacking CRS data.

In some examples of the method, apparatus, and non-transitory computer-readable medium described above, identifying the CRS configuration as lacking CRS data may include identifying the sTTI as a temporally third or fifth sTTI within the subframe.

In some examples of the method, apparatus, and non-transitory computer-readable medium described above, identifying the CRS configuration as lacking CRS data may include identifying the subframe as a multicast-broadcast single-frequency network (MBSFN) subframe.

Some examples of the method, apparatus, and non-transitory computer-readable medium described above may further include processes, features, means, or instructions for identifying the sTTI as a temporally sixth sTTI within the subframe. Some examples of the method, apparatus, and non-transitory computer-readable medium described above may further include processes, features, means, or instructions for mapping DMRS data to a temporally second or third OFDM symbol within the sixth sTTI.

In some examples of the method, apparatus, and non-transitory computer-readable medium described above, selecting the DMRS mapping pattern may include selecting a second DMRS mapping pattern to be applied to the sTTI, the second DMRS mapping pattern including DMRS data for a first antenna port pair being mapped to a third-lowest-frequency RE and a ninth-lowest-frequency RE within a first RB of an OFDM symbol and to a fifth-lowest-frequency RE and a twelfth-lowest-frequency RE within a second RB of the OFDM symbol where the sTTI includes two or three OFDM symbols. In some examples of the method, apparatus, and non-transitory computer-readable medium described above, the second DMRS mapping pattern may further include DMRS data for a second antenna port pair being mapped to a second-lowest-frequency RE and an eighth-lowest-frequency RE within the first RB of the OFDM symbol and to a third-lowest-frequency RE and an eleventh-lowest-frequency RE within the second RB of the OFDM symbol.

Some examples of the method, apparatus, and non-transitory computer-readable medium described above may further include processes, features, means, or instructions for identifying the CSI-RS configuration as lacking CSI-RS data. Some examples of the method, apparatus, and non-transitory computer-readable medium described above may further include processes, features, means, or instructions for identifying the CRS configuration as a shift0 configuration.

Some examples of the method, apparatus, and non-transitory computer-readable medium described above may further include processes, features, means, or instructions for identifying the CSI-RS configuration as including CSI-RS data. Some examples of the method, apparatus, and non-transitory computer-readable medium described above may further include processes, features, means, or instructions for identifying the CRS configuration as a shift0 configuration. Some examples of the method, apparatus, and non-transitory computer-readable medium described above may further include processes, features, means, or instructions for identifying the sTTI as a temporally sixth sTTI within the subframe.

Some examples of the method, apparatus, and non-transitory computer-readable medium described above may further include processes, features, means, or instructions for identifying the CSI-RS configuration as including CSI-RS data. Some examples of the method, apparatus, and non-transitory computer-readable medium described above may further include processes, features, means, or instructions for identifying the CRS configuration as a shift0 configuration. Some examples of the method, apparatus, and non-transitory computer-readable medium described above may further include processes, features, means, or instructions for identifying the sTTI as a temporally first, second, or fourth sTTI within the subframe.

Some examples of the method, apparatus, and non-transitory computer-readable medium described above may further include processes, features, means, or instructions for identifying the CSI-RS configuration as including CSI-RS data. Some examples of the method, apparatus, and non-transitory computer-readable medium described above may further include processes, features, means, or instructions for identifying the CRS configuration as lacking CRS data.

In some examples of the method, apparatus, and non-transitory computer-readable medium described above, identifying the CRS configuration as lacking CRS data may include identifying the sTTI as a temporally third or fifth sTTI within the subframe.

Some examples of the method, apparatus, and non-transitory computer-readable medium described above may further include processes, features, means, or instructions for identifying the subframe as a MBSFN subframe. Some examples of the method, apparatus, and non-transitory computer-readable medium described above may further include processes, features, means, or instructions for identifying the sTTI as a temporally third, fifth, or sixth sTTI within the subframe.

Some examples of the method, apparatus, and non-transitory computer-readable medium described above may further include processes, features, means, or instructions for identifying the sTTI as a temporally sixth sTTI within the subframe. Some examples of the method, apparatus, and non-transitory computer-readable medium described above may further include processes, features, means, or instructions for mapping DMRS data to a temporally second or third OFDM symbol within the sixth sTTI.

In some examples of the method, apparatus, and non-transitory computer-readable medium described above, selecting the DMRS mapping pattern may include selecting a third DMRS mapping pattern to be applied to the sTTI, the third DMRS mapping pattern including DMRS data for a first antenna port pair being mapped to a third-lowest-frequency RE and a ninth-lowest-frequency RE within a first RB of an OFDM symbol and to a fourth-lowest-frequency RE and a twelfth-lowest-frequency RE within a second RB of the OFDM symbol where the sTTI includes two or three OFDM symbols. In some examples of the method, apparatus, and non-transitory computer-readable medium described above, the third DMRS mapping pattern may further include DMRS data for a second antenna port pair being mapped to a lowest-frequency RE and a seventh-lowest-frequency RE within the first RB of the OFDM symbol and to a third-lowest-frequency RE and a tenth-lowest-frequency RE within the second RB of the OFDM symbol.

Some examples of the method, apparatus, and non-transitory computer-readable medium described above may further include processes, features, means, or instructions for identifying the CSI-RS configuration as including CSI-RS data. Some examples of the method, apparatus, and non-transitory computer-readable medium described above may further include processes, features, means, or instructions for identifying the CRS configuration as a shift1 configuration. Some examples of the method, apparatus, and non-transitory computer-readable medium described above may further include processes, features, means, or instructions for identifying the sTTI as a temporally first, second, or fourth sTTI within the subframe.

Some examples of the method, apparatus, and non-transitory computer-readable medium described above may further include processes, features, means, or instructions for identifying the CSI-RS configuration as lacking CSI-RS data. Some examples of the method, apparatus, and non-transitory computer-readable medium described above may further include processes, features, means, or instructions for identifying the CRS configuration as a shift1 configuration.

In some examples of the method, apparatus, and non-transitory computer-readable medium described above, selecting the DMRS mapping pattern may include selecting a fourth DMRS mapping pattern to be applied to the sTTI, the fourth DMRS mapping pattern including DMRS data for a first antenna port pair being mapped to a second-lowest-frequency RE and a tenth-lowest-frequency RE a first RB of an OFDM symbol and to a fourth-lowest-frequency RE and an eleventh-lowest-frequency RE within a second RB of the OFDM symbol where the sTTI includes two or three OFDM symbols. In some examples of the method, apparatus, and non-transitory computer-readable medium described above, the fourth DMRS mapping pattern may further include DMRS data for a second antenna port pair being mapped to a lowest-frequency RE and an eighth-lowest-frequency RE within the first RB of the OFDM symbol and to a second-lowest-frequency RE and a tenth-lowest-frequency RE within the second RB of the OFDM symbol.

Some examples of the method, apparatus, and non-transitory computer-readable medium described above may further include processes, features, means, or instructions for identifying the CSI-RS configuration as lacking CSI-RS data. Some examples of the method, apparatus, and non-transitory computer-readable medium described above may further include processes, features, means, or instructions for identifying the CRS configuration as a shift2 configuration.

Some examples of the method, apparatus, and non-transitory computer-readable medium described above may further include processes, features, means, or instructions for identifying the CSI-RS configuration as including CSI-RS data. Some examples of the method, apparatus, and non-transitory computer-readable medium described above may further include processes, features, means, or instructions for identifying the CRS configuration as a shift2 configuration. Some examples of the method, apparatus, and non-transitory computer-readable medium described above may further include processes, features, means, or instructions for identifying the sTTI as a temporally sixth sTTI within the subframe.

Some examples of the method, apparatus, and non-transitory computer-readable medium described above may further include processes, features, means, or instructions for identifying the CSI-RS configuration as including CSI-RS data. Some examples of the method, apparatus, and non-transitory computer-readable medium described above may further include processes, features, means, or instructions for identifying the CRS configuration as a shift2 configuration. Some examples of the method, apparatus, and non-transitory computer-readable medium described above may further include processes, features, means, or instructions for identifying the sTTI as a temporally first, second, or fourth sTTI within the subframe.

In some examples of the method, apparatus, and non-transitory computer-readable medium described above, selecting the DMRS mapping pattern may include selecting a fifth DMRS mapping pattern to be applied to the sTTI, the fifth DMRS mapping pattern including DMRS data for a first antenna port pair being mapped to a third-lowest-frequency RE and a ninth-lowest-frequency RE within a first RB of an OFDM symbol and to a sixth-lowest-frequency RE and a twelfth-lowest-frequency RE within a second RB of the OFDM symbol where the sTTI includes two or three OFDM symbols. In some examples of the method, apparatus, and non-transitory computer-readable medium described above, the fifth DMRS mapping pattern may further include DMRS data for a second antenna port pair being mapped to a lowest-frequency RE and a seventh-lowest-frequency RE within the first RB of the OFDM symbol and to a third-lowest-frequency RE and a ninth-lowest-frequency RE within the second RB of the OFDM symbol.

Some examples of the method, apparatus, and non-transitory computer-readable medium described above may further include processes, features, means, or instructions for identifying the CSI-RS configuration as including CSI-RS data. Some examples of the method, apparatus, and non-transitory computer-readable medium described above may further include processes, features, means, or instructions for identifying the CRS configuration as a shift1 configuration. Some examples of the method, apparatus, and non-transitory computer-readable medium described above may further include processes, features, means, or instructions for identifying the sTTI as a temporally sixth sTTI within the subframe.

Some examples of the method, apparatus, and non-transitory computer-readable medium described above may further include processes, features, means, or instructions for identifying the CSI-RS configuration as including CSI-RS data for more than twelve antenna ports. Some examples of the method, apparatus, and non-transitory computer-readable medium described above may further include processes, features, means, or instructions for configuring the sTTI to include no DMRS data.

Some examples of the method, apparatus, and non-transitory computer-readable medium described above may further include processes, features, means, or instructions for identifying the CSI-RS configuration as including CSI-RS data for twenty-four ports. Some examples of the method, apparatus, and non-transitory computer-readable medium described above may further include processes, features, means, or instructions for identifying the sTTI as a temporally fifth sTTI within the subframe. Some examples of the method, apparatus, and non-transitory computer-readable medium described above may further include processes, features, means, or instructions for configuring the sTTI to include no DMRS data.

Some examples of the method, apparatus, and non-transitory computer-readable medium described above may further include processes, features, means, or instructions for identifying the CSI-RS configuration as including CSI-RS data for thirty-two ports. Some examples of the method, apparatus, and non-transitory computer-readable medium described above may further include processes, features, means, or instructions for identifying the sTTI as a temporally third or fifth sTTI within the subframe. Some examples of the method, apparatus, and non-transitory computer-readable medium described above may further include processes, features, means, or instructions for configuring the sTTI to include no DMRS data.

In some examples of the method, apparatus, and non-transitory computer-readable medium described above, selecting the DMRS mapping pattern may include selecting a sixth DMRS mapping pattern to be applied to the sTTI, the sixth DMRS mapping pattern including DMRS data for a first antenna port pair being mapped to a second-lowest-frequency RE, a seventh-lowest-frequency RE, and a twelfth-lowest-frequency RE where the sTTI includes a slot of seven OFDM symbols. In some examples of the method, apparatus, and non-transitory computer-readable medium described above, the sixth DMRS mapping pattern may further include DMRS data for a second antenna port pair being mapped to a lowest-frequency RE, a sixth-lowest-frequency RE, and an eleventh-lowest-frequency RE.

Some examples of the method, apparatus, and non-transitory computer-readable medium described above may further include processes, features, means, or instructions for identifying the CSI-RS configuration as lacking CSI-RS data. Some examples of the method, apparatus, and non-transitory computer-readable medium described above may further include processes, features, means, or instructions for identifying the sTTI as a temporally second slot of the subframe.

In some examples of the method, apparatus, and non-transitory computer-readable medium described above, selecting the DMRS mapping pattern may include selecting a seventh DMRS mapping pattern to be applied to the sTTI, the seventh DMRS mapping pattern including DMRS data for a first antenna port pair being mapped to a third-lowest-frequency RE, an eighth-lowest-frequency RE, and a twelfth-lowest-frequency RE where the sTTI includes a slot of seven OFDM symbols. In some examples of the method, apparatus, and non-transitory computer-readable medium described above, the seventh DMRS mapping pattern may further include DMRS data for a second antenna port pair being mapped to a second-lowest-frequency RE, a sixth-lowest-frequency RE, and an eleventh-lowest-frequency RE.

Some examples of the method, apparatus, and non-transitory computer-readable medium described above may further include processes, features, means, or instructions for identifying the CRS configuration as a shift0 configuration. Some examples of the method, apparatus, and non-transitory computer-readable medium described above may further include processes, features, means, or instructions for identifying the sTTI as a temporally first slot of the subframe.

Some examples of the method, apparatus, and non-transitory computer-readable medium described above may further include processes, features, means, or instructions for identifying the CSI-RS configuration as including CSI-RS data. Some examples of the method, apparatus, and non-transitory computer-readable medium described above may further include processes, features, means, or instructions for identifying the CRS configuration as a shift0 configuration. Some examples of the method, apparatus, and non-transitory computer-readable medium described above may further include processes, features, means, or instructions for identifying the sTTI as a temporally second slot of the subframe.

In some examples of the method, apparatus, and non-transitory computer-readable medium described above, selecting the DMRS mapping pattern may include selecting an eighth DMRS mapping pattern to be applied to the sTTI, the eighth DMRS mapping pattern including DMRS data for a first antenna port pair being mapped to a third-lowest-frequency RE, a seventh-lowest-frequency RE, and a twelfth-lowest-frequency RE where the sTTI includes a slot of seven OFDM symbols. In some examples of the method, apparatus, and non-transitory computer-readable medium described above, the eighth DMRS mapping pattern may further include DMRS data for a second antenna port pair being mapped to a lowest-frequency RE, a sixth-lowest-frequency RE, and a tenth-lowest-frequency RE.

Some examples of the method, apparatus, and non-transitory computer-readable medium described above may further include processes, features, means, or instructions for identifying the CRS configuration as a shift1 configuration. Some examples of the method, apparatus, and non-transitory computer-readable medium described above may further include processes, features, means, or instructions for identifying the sTTI as a temporally first slot of the subframe.

Some examples of the method, apparatus, and non-transitory computer-readable medium described above may further include processes, features, means, or instructions for identifying the CSI-RS configuration as including CSI-RS data. Some examples of the method, apparatus, and non-transitory computer-readable medium described above may further include processes, features, means, or instructions for identifying the CRS configuration as a shift1 configuration. Some examples of the method, apparatus, and non-transitory computer-readable medium described above may further include processes, features, means, or instructions for identifying the sTTI as a temporally second slot of the subframe.

In some examples of the method, apparatus, and non-transitory computer-readable medium described above, selecting the DMRS mapping pattern may include selecting a ninth DMRS mapping pattern to be applied to the sTTI, the ninth DMRS mapping pattern including DMRS data for a first antenna port pair being mapped to a second-lowest-frequency RE, a seventh-lowest-frequency RE, and an eleventh-lowest-frequency RE where the sTTI includes a slot of seven OFDM symbols. In some examples of the method, apparatus, and non-transitory computer-readable medium described above, the ninth DMRS mapping pattern may further include DMRS data for a second antenna port pair being mapped to a lowest-frequency RE, a fifth-lowest-frequency RE, and a tenth-lowest-frequency RE.

Some examples of the method, apparatus, and non-transitory computer-readable medium described above may further include processes, features, means, or instructions for identifying the CRS configuration as a shift2 configuration. Some examples of the method, apparatus, and non-transitory computer-readable medium described above may further include processes, features, means, or instructions for identifying the sTTI as a temporally first slot of the subframe.

Some examples of the method, apparatus, and non-transitory computer-readable medium described above may further include processes, features, means, or instructions for identifying the CSI-RS configuration as including CSI-RS data. Some examples of the method, apparatus, and non-transitory computer-readable medium described above may further include processes, features, means, or instructions for identifying the CRS configuration as a shift2 configuration. Some examples of the method, apparatus, and non-transitory computer-readable medium described above may further include processes, features, means, or instructions for identifying the sTTI as a temporally second slot of the subframe.

In some examples of the method, apparatus, and non-transitory computer-readable medium described above, the sTTI may include two or three OFDM symbols. In some examples of the method, apparatus, and non-transitory computer-readable medium described above, each OFDM symbol may include two RBs. In some examples of the method, apparatus, and non-transitory computer-readable medium described above, each RB may include twelve REs.

In some examples of the method, apparatus, and non-transitory computer-readable medium described above, the sTTI may include a slot. In some examples of the method, apparatus, and non-transitory computer-readable medium described above, the slot may include seven OFDM symbols. In some examples of the method, apparatus, and non-transitory computer-readable medium described above, each OFDM symbol may include twelve REs.

A method of wireless communication is described. The method may include identifying a reference signal configuration of an sTTI in a subframe, the reference signal configuration including at least one of a CSI-RS configuration or a CRS configuration, selecting, based at least in part on the reference signal configuration of the sTTI, a DMRS mapping pattern from a plurality of DMRS mapping patterns, determining, based at least in part on the selected mapping pattern, one or more REs within the sTTI to monitor for DMRS data, and monitoring the one or more REs for DMRS data.

An apparatus for wireless communication is described. The apparatus may include means for identifying a reference signal configuration of an sTTI in a subframe, the reference signal configuration including at least one of a CSI-RS configuration or a CRS configuration, means for selecting, based at least in part on the reference signal configuration of the sTTI, a DMRS mapping pattern from a plurality of DMRS mapping patterns, means for determining, based at least in part on the selected mapping pattern, one or more REs within the sTTI to monitor for DMRS data, and means for monitoring the one or more REs for DMRS data.

Another apparatus for wireless communication is described. The apparatus may include a processor, memory in electronic communication with the processor, and instructions stored in the memory. The instructions may be operable to cause the processor to identify a reference signal configuration of an sTTI in a subframe, the reference signal configuration including at least one of a CSI-RS configuration or a CRS configuration, select, based at least in part on the reference signal configuration of the sTTI, a DMRS mapping pattern from a plurality of DMRS mapping patterns, determine, based at least in part on the selected mapping pattern, one or more REs within the sTTI to monitor for DMRS data, and monitor the one or more REs for DMRS data.

A non-transitory computer-readable medium for wireless communication is described. The non-transitory computer-readable medium may include instructions operable to cause a processor to identify a reference signal configuration of an sTTI in a subframe, the reference signal configuration including at least one of a CSI-RS configuration or a CRS configuration, select, based at least in part on the reference signal configuration of the sTTI, a DMRS mapping pattern from a plurality of DMRS mapping patterns, determine, based at least in part on the selected mapping pattern, one or more REs within the sTTI to monitor for DMRS data, and monitor the one or more REs for DMRS data.

Some examples of the method, apparatus, and non-transitory computer-readable medium described above may further include processes, features, means, or instructions for identifying the CSI-RS configuration based at least in part on whether the subframe includes CSI-RS data. Some examples of the method, apparatus, and non-transitory computer-readable medium described above may further include processes, features, means, or instructions for identifying the CRS configuration based at least in part on a CRS shift for a cell corresponding to the subframe.

Some examples of the method, apparatus, and non-transitory computer-readable medium described above may further include processes, features, means, or instructions for identifying whether the subframe includes a multicast-broadcast single-frequency network (MBSFN) subframe, and selecting the DMRS mapping pattern based at least in part on whether the subframe includes an MBSFN subframe.

Some examples of the method, apparatus, and non-transitory computer-readable medium described above may further include processes, features, means, or instructions for identifying a quantity of symbols included in the sTTI, and selecting the DMRS mapping pattern based at least in part on the quantity of symbols included in the sTTI. Some examples of the method, apparatus, and non-transitory computer-readable medium described above may further include processes, features, means, or instructions for identifying an index of the sTTI or of a symbol included in the sTTI, and selecting the DMRS mapping pattern based at least in part on the index.

DETAILED DESCRIPTION

Figure 1:
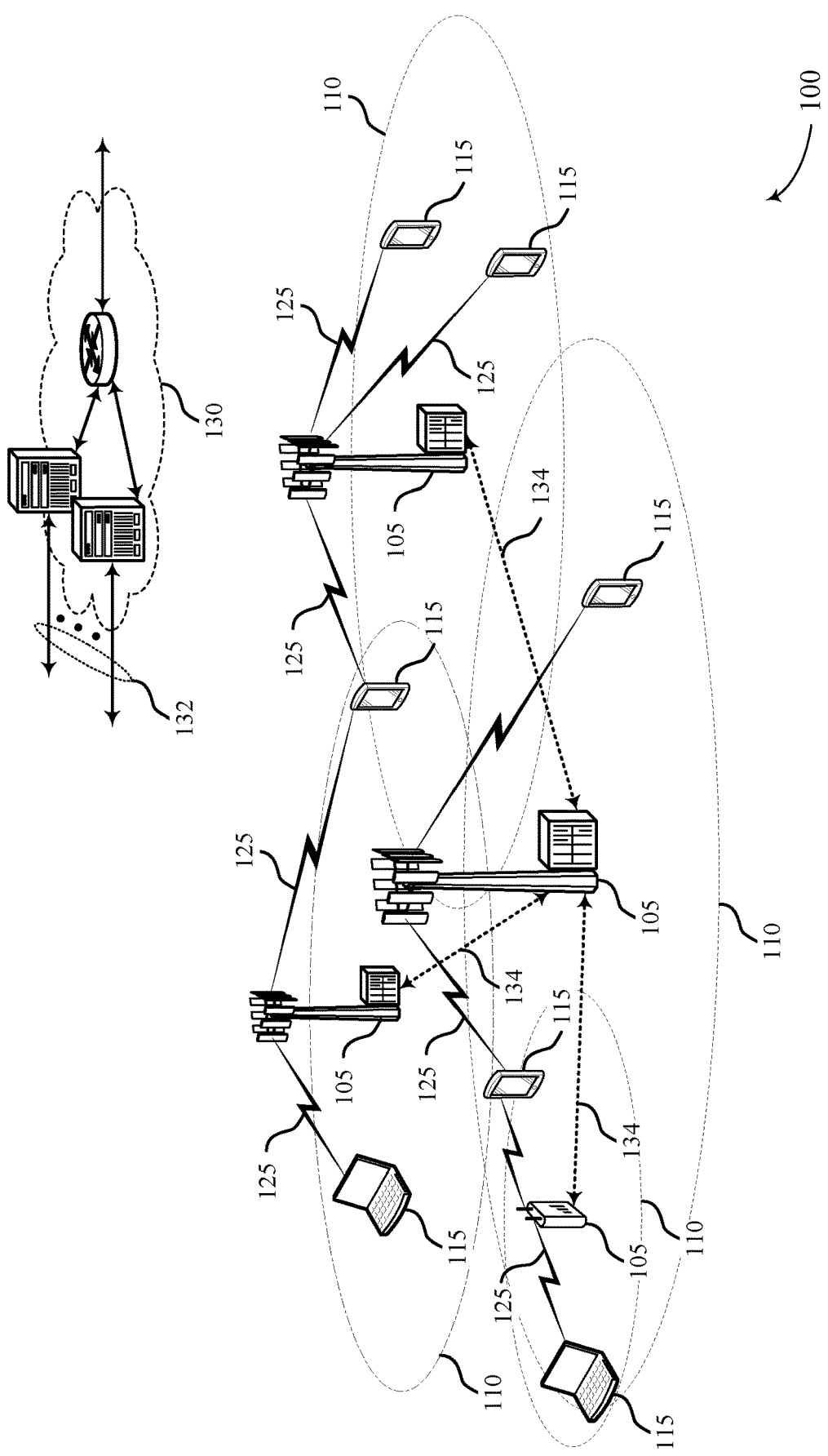
FIG. 1 illustrates an example of a system for wireless communication that supports reference signal multiplexing in shortened transmission time intervals (sTTIs) in accordance with aspects of the present disclosure.

In some wireless communications systems (e.g., NR systems), a user equipment (UE) may communicate with a base station on a carrier using shortened transmission time intervals (sTTIs). The base station may transmit uplink reference signal data, such as channel state information reference signal (CSI-RS) data, cell-specific reference signal (CRS) data, or demodulation reference signal (DMRS) data, within one or more sTTIs. Generally, the techniques described herein provide for mapping DMRS data to resource elements (REs) within an sTTI so as to avoid collision with (e.g., avoid mapping to a same RE as) other reference signal data that the sTTI may be configured to include, such as CSI-RS data or CRS data.

Some wireless communications systems may use multiple types of sTTIs. For example, a first type of sTTI may include two or three orthogonal frequency-division multiplexing (OFDM) symbols within a subframe, and a second type of sTTI may include one slot within a subframe. A slot may include seven OFDM symbols.

For each type of sTTI, one or more DMRS mapping patterns may be defined. A DMRS mapping pattern may specify a set of REs within an sTTI to which a base station may map DMRS data. The base station may select a DMRS mapping pattern for an sTTI based on one or more factors, configure the sTTI according to the selected DMRS mapping pattern, and transmit the configured REs (e.g., REs included in the sTTI) to one or more UEs. Factors upon which a base station may base selection of the DMRS mapping pattern include, but are not limited to, a CSI-RS configuration of the sTTI, a CRS configuration of the sTTI, an index of the sTTI within the subframe, an antenna port configuration for CRS (e.g., a number of CRS ports and associated number of layers configured for CRS, such as a one port CRS having a two-layer configuration, or a two port CRS having a four-layer configuration), or a type of the subframe.

By configuring an sTTI according to a DMRS mapping pattern as described herein and selected as described herein, the base station may map DMRS data to REs within the sTTI and beneficially enable other REs within the sTTI to carry CSI-RS data or CRS data without colliding with the REs having DMRS data. Thus, the techniques described herein may beneficially provide for efficiently and reliably transmitting CSI-RS data, CRS data, and DMRS data via a carrier that uses sTTIs. The techniques described herein may also beneficially provide for transmitting DMRS data that are spread in frequency so as to improve corresponding channel estimation capabilities of a UE, even for an sTTI containing CRS. For example, DMRS data may be mapped over two consecutive resource blocks (RBs), each RB including 12 REs (e.g., from RE 0 to RE 11) over one OFDM symbol, with the RBs spaced across the REs so as to reduce a gap between REs that carry DMRS data (e.g., to reduce the number of REs between the REs to which the DRMS data is mapped). In such cases, reducing the gap may result in obtaining a higher quality of a matrix of coherent time and frequency of the channel and information regarding how each RE in the channel is related to one another in time and frequency over the channel. DRMS data may be either interpolated or extrapolated to obtain a matrix of coherent time and frequency and the relationship information among the REs within the channel. As such, REs in between the DMRS data may undergo an interpolation, and REs at the edge of the two RBs may undergo an extrapolation. In some cases, interpolation may yield a higher quality matrix of coherent time and frequency and the relationship among the REs than extrapolation may yield. As such, it may be helpful to map the DMRS data closer to the edge of each RB (e.g., close to the highest or lowest frequency RE within the RB) so as to reduce a number of REs that need to be extrapolated. For example, if the DMRS data is mapped to RE 7 of the higher frequency RB and RE 2 of the lower frequency RB, then REs 8, 9, 10, and 11 of the higher frequency RB and REs 0 and 1 of the lower frequency RB may need to undergo extrapolation. If, however, the DMRS data is mapped to RE 10 of the higher frequency RB and RE 1 of the lower frequency RB, then only RE 11 of the higher frequency RB and RE 0 of the lower frequency RB may need be extrapolated. As such, by mapping the DMRS data closer to the edge of each of the RBs, the number of REs that need to be extrapolated may be reduced, and thus, the quality of the matrix of coherent time and frequency in the channel and the information regarding the relationship among the REs within the channel may be improved. In some examples, the DMRS data may additionally or alternatively be mapped as uniformly as possible (e.g., mapped with as uniform a spacing or distribution as possible) across the REs of each RB, which may enhance the quality of interpolations. Further, the techniques described herein may beneficially provide for reducing a number of possible DMRS mapping patterns within a subframe, which may improve a latency with which a UE may locate and process the DMRS data.

Aspects of the disclosure are initially described in the context of a wireless communications system. Aspects of the disclosure are further illustrated by and described with reference to example sTTI configurations, example DMRS mapping patterns, apparatus diagrams, system diagrams, and flowcharts that relate to reference signal multiplexing in sTTIs.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

The communication links 125 between a UE 115 and base station 105 may be or represent an organization of physical resources, such as time and frequency resources. A basic unit of time and frequency may be referred to as an RE. An RE may include one symbol period and one subcarrier (e.g., a 15 KHz frequency range). The number of bits carried by each RE may depend on the modulation scheme (the configuration of symbols that may be selected during each symbol period). Thus, the more REs that a UE 115 receives and the higher the modulation scheme, the higher the data rate may be.

In wireless communications system 100, a transmission time interval (TTI) may be defined as the smallest unit of time in which a base station 105 may schedule a UE 115 for uplink or downlink transmissions. As an example, a base station 105 may allocate one or more TTIs for uplink communication from a UE 115. The base station 105 may then monitor the one or more TTIs to receive uplink signals from the UE 115. In some wireless communications systems (e.g., LTE), a subframe may be the basic unit of scheduling or TTI. In other cases, such as with low latency operation, a different, reduced-duration TTI (e.g., a shortened TTI (sTTI)) may be used.

Wireless communications system 100 may employ various TTI durations. For example, wireless communications system 100 employ a first type of sTTI that includes two or three orthogonal frequency-division multiplexing (OFDM) symbols within a subframe. Wireless communications system 100 may also employ a second type of sTTI that includes one slot within a subframe—each slot may include seven OFDM symbols, and each subframe may include two slots.

A base station 105 may transmit different types of reference signal data, such as CRS data, CSI-RS data, and DMRS data, to aid UEs 115 in channel estimation and coherent demodulation. A base station 105 may use the techniques described herein to transmit multiple types of reference signal data to one or more UEs 115 using carriers configured with sTTIs.

Figure 2:
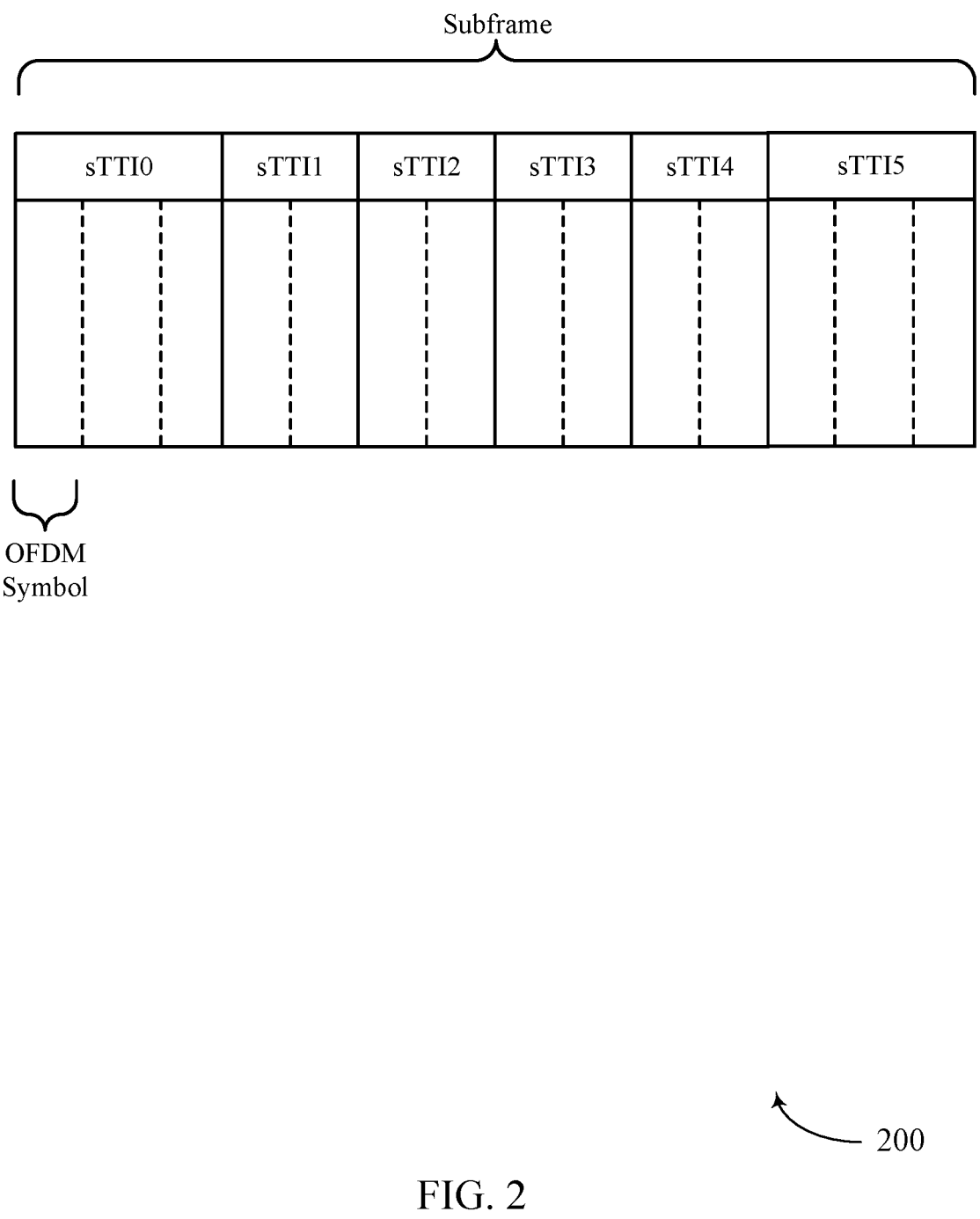
FIG. 2 illustrates an example of a first sTTI type that supports reference signal multiplexing in sTTIs in accordance with aspects of the present disclosure.

FIG. 2 illustrates an example of a first sTTI type 200 that supports reference signal multiplexing in sTTIs in accordance with various aspects of the present disclosure. In some examples, first sTTI type 200 may be implemented by aspects of wireless communication system 100.

An sTTI of the first sTTI type 200 may be referred to as a 2/3 sTTI. As illustrated in FIG. 2, each 2/3 sTTI may include either two or three OFDM symbols. Each 2/3 sTTI may have an index n, where n is an integer. Thus, a temporally first 2/3 sTTI within a subframe may be referred to as sTTI0, a temporally second 2/3 sTTI within the subframe may be referred to as sTTI1, and so on. As illustrated in FIG. 2, sTTI0 and sTTI5 may each include three OFDM symbols and each other 2/3 sTTI in the subframe may include two symbols. A subframe thus may include fourteen OFDM symbols, which may be indexed and referred to as symbols 0-13 of the subframe. In some cases, during sTTI5, a CSI-RS according to any one of CRS shift0, shift1, and shift2 may be transmitted.

In some cases, each symbol of a 2/3 sTTI may include two resource blocks (RBs) of twelve REs. Each RB may include, for example, 12 subcarriers within one symbol, with each subcarrier/symbol combination representing an RE. Subcarriers within an RB may be indexed and referred to as subcarriers 0-11, with the corresponding REs likewise indexed and referred to as REs 0-11. In some cases, it may be preconfigured that a DMRS data included in a 2/3 sTTI is to be included in the temporally first and second symbols of the 2/3 sTTI.

In some cases, a CRS shift to be used may depend on the type of data transmitted (e.g., PDCCH, PDSCH, ePDCCH, ePDSCH, or the like). For example, if CRS shift0 is used for a 2/3 sTTI for PDSCH, then for a 2/3 sTTI for PDCCH the same shift (shift0) used for the 2/3 sTTI for PDSCH may be used, but DMRS data may be mapped to one antenna port pair (e.g., port 7 and 8). In some cases, a shift used for a 2/3 sTTI for PDCCH may also be used for 1-slot sTTI for PDCCH. In some cases, configuration information of the 2/3 sTTI for PDCCH or PDSCH may be transmitted (e.g., via RRC signaling) to a UE 115 so that the UE may select a DMRS pattern accordingly. In some other cases, a 1-slot sTTI for PDCCH may be preconfigured to use, for example, one port.

Figure 3:
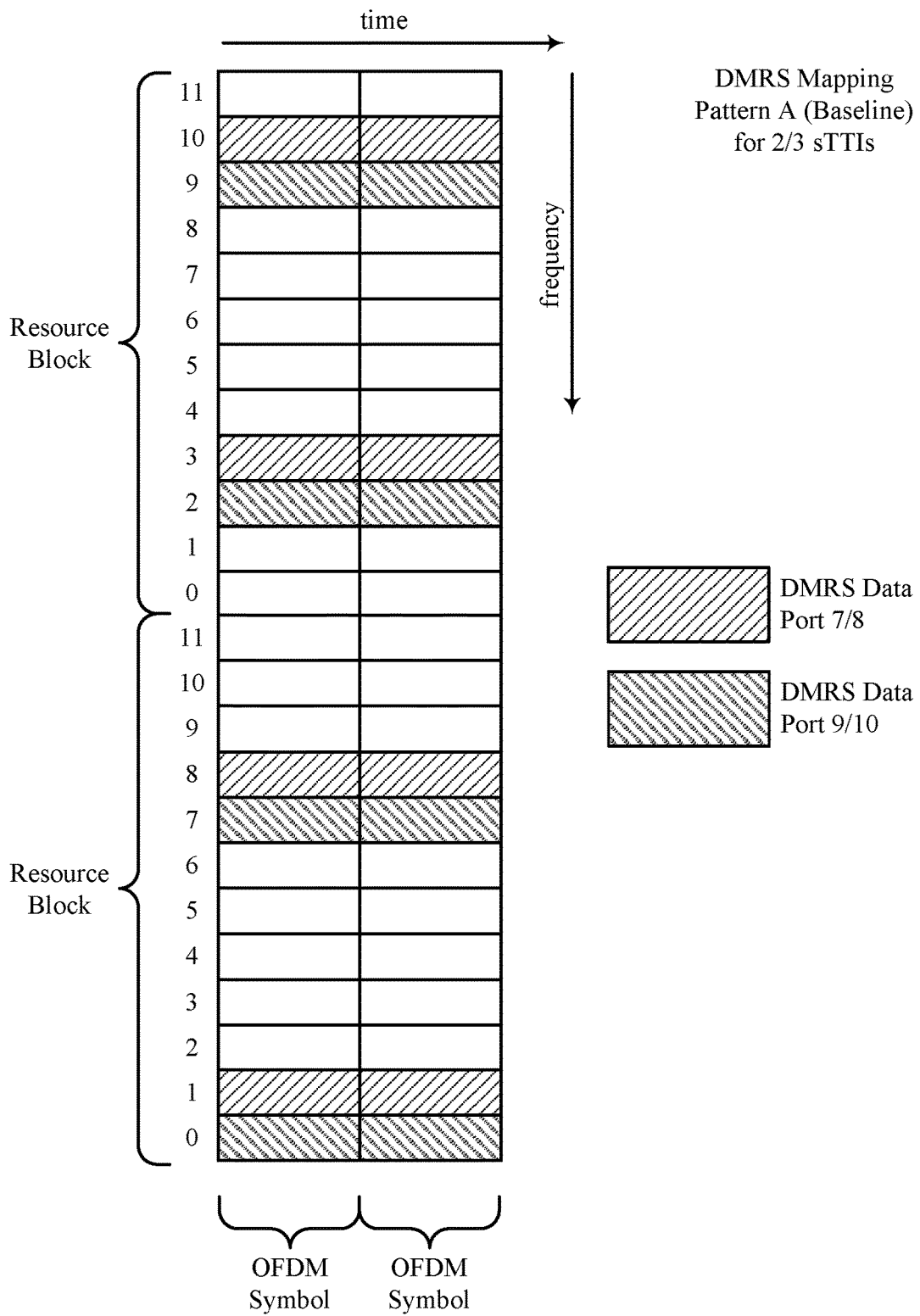
FIG. 3 illustrates an example of a demodulation reference signal (DMRS) mapping pattern that supports reference signal multiplexing in sTTIs in accordance with aspects of the present disclosure.

FIG. 3 illustrates an example of a DMRS mapping pattern 300 that supports reference signal multiplexing in sTTIs in accordance with various aspects of the present disclosure. In some examples, DMRS mapping pattern 300 may be implemented by aspects of wireless communication system 100.

DMRS mapping pattern 300 may be referred to as pattern A for 2/3 sTTIs or may be referred to as pattern A1. As illustrated in FIG. 3, pattern A1 may define REs over two consecutive symbols to which a base station 105 that selects pattern A1 is to map DMRS data. Within a symbol allocated to DMRS data, pattern A1 may map DMRS data for one antenna port pair (e.g., port 7/8) to REs 1 and 8 of a lower-frequency RB and REs 3 and 10 of a higher-frequency RB; pattern A1 may also map DMRS data for another antenna port pair (e.g., port 9/10) to REs 0 and 7 of the lower-frequency RB and REs 2 and 9 of the higher-frequency RB.

Pattern A1 may represent a baseline DMRS mapping pattern, and a base station 105 may select Pattern A1 for a 2/3 sTTI when, for example, the subframe is not configured to include a CSI-RS data and the 2/3 sTTI is not configured to include a CRS data. For example, the base station 105 may select the baseline DMRS mapping pattern (e.g., with a configured number of antenna port layers (e.g., a two-layer antenna port, a four-layer antenna port, etc.)) for a 2/3 sTTI for PDSCH transmission, if an RE for transmitting a DMRS data does not overlap with an RE configured for transmitting a CRS data or a CSI-RS data (e.g., a zero-power CSI-RS data, non-zero-power CSI RS data, etc.) within the subframe or the 2/3 sTTI.

In some cases, a base station 105 may determine whether the 2/3 sTTI is configured to include a CRS data based at least in part on an index of the sTTI. For example, it may be preconfigured that sTTI2 and sTTI4 within a subframe are not to include a CRS data.

In some cases, a base station 105 may determine whether the 2/3 sTTI is configured to include a CRS data based at least in part on a type of the subframe that includes the 2/3 sTTI. For example, it may be preconfigured that multicast-broadcast single-frequency network (MBSFN) subframes are not to include a CRS data.

Figure 4:
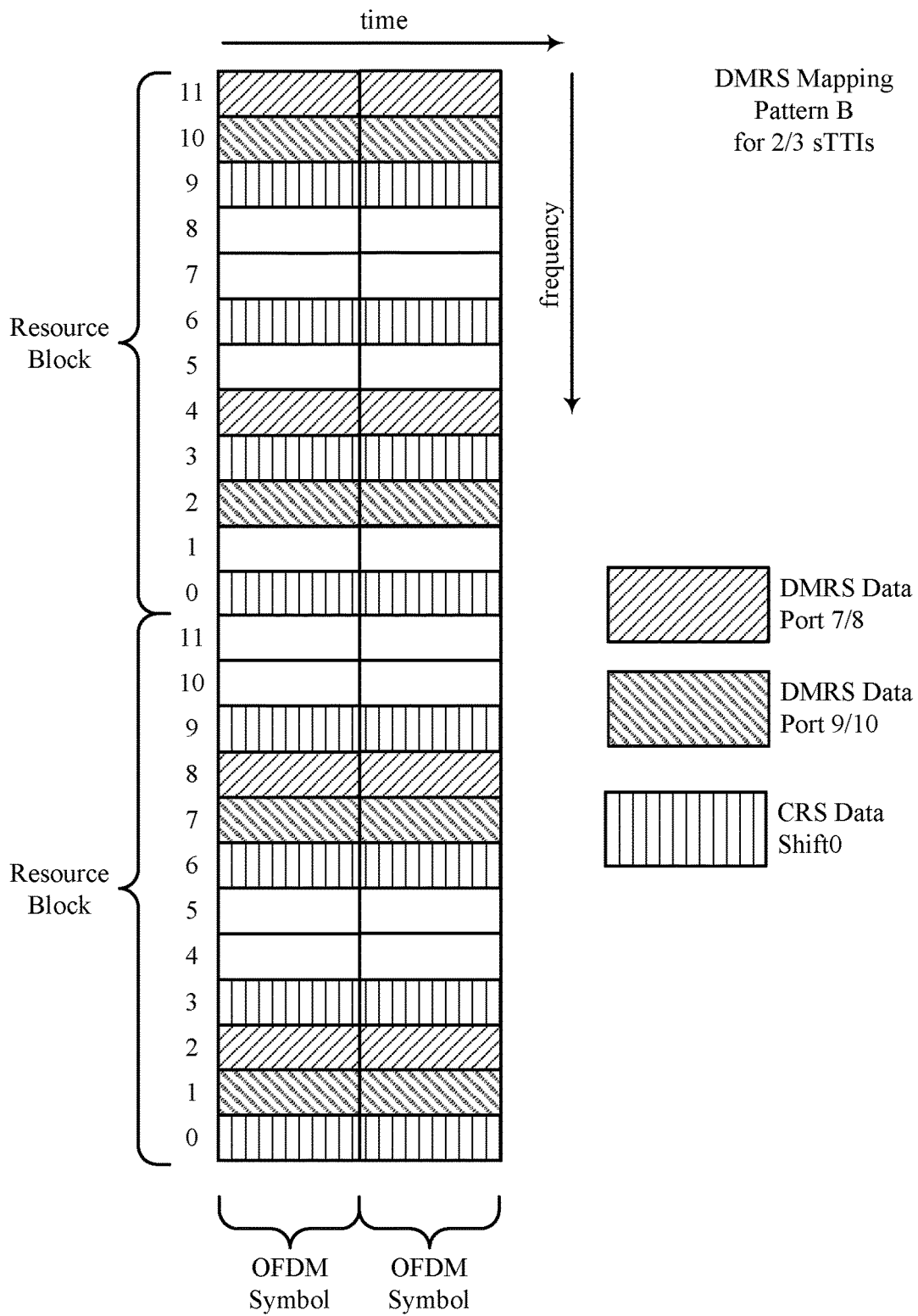
FIG. 4 illustrates an example of a DMRS mapping pattern that supports reference signal multiplexing in sTTIs in accordance with aspects of the present disclosure.

FIG. 4 illustrates an example of a DMRS mapping pattern 400 that supports reference signal multiplexing in sTTIs in accordance with various aspects of the present disclosure. In some examples, DMRS mapping pattern 400 may be implemented by aspects of wireless communication system 100.

DMRS mapping pattern 400 may be referred to as pattern B for 2/3 sTTIs or may be referred to as pattern B1. As illustrated in FIG. 4, pattern B1 may define REs over two consecutive symbols to which a base station 105 that selects pattern B1 is to map DMRS data. Within a symbol allocated to DMRS data, pattern B1 may map DMRS data for one antenna port pair (e.g., port 7/8) to REs 2 and 8 of a lower-frequency RB and REs 4 and 11 of a higher-frequency RB; pattern B1 may also map DMRS data for another antenna port pair (e.g., port 9/10) to REs 1 and 7 of the lower-frequency RB and REs 2 and 10 of the higher-frequency RB.

Pattern B1 may represent a DMRS mapping pattern for cells in which shift0 CRS data is transmitted. Base stations 105 may be configured to transmit CRS data at different frequencies in order to avoid interference between CRS transmissions of neighboring cells. In a cell with a shift0 CRS configuration, a base station 105 may be configured to transmit CRS data on REs 0, 3, 6, and 9 within an RB that is to include CRS data. Thus, a base station 105 may select Pattern B1 for a 2/3 sTTI when, for example, the subframe is not configured to include a CSI-RS data and the 2/3 sTTI is configured to include shift0 CRS data.

In some cases, a base station 105 may determine whether the 2/3 sTTI is configured to include shift0 CRS data based at least in part on an index of the sTTI. For example, it may be preconfigured that sTTI0, sTTI1, sTTI3, and sTTI5 within a subframe are to include CRS data, and whether that CRS data is shift0 CRS data may depend on the cell ID.

In some cases, if the subframe is configured to include CSI-RS data, which symbols within the subframe (e.g., which of symbols 0-13) and which REs within those symbols (e.g., which of REs 0-11) are to include the CSI-RS data may be preconfigured. Thus, because each 2/3 sTTI corresponds to two or three of symbols 0-13, the base station 105 may determine whether a given 2/3 sTTI is to be configured to include CSI-RS data, and, if so, which REs within the 2/3 sTTI are to carry the CSI-RS data, based at least in part on an index of the sTTI. Thus, a base station 105 may also select Pattern B1 for a 2/3 sTTI in some cases in which, for example, the subframe is configured to include CSI-RS data but the 2/3 sTTI is not configured to include any CRS data. This may, for example, apply to sTTI2 and sTTI4.

In some cases, a base station 105 may determine whether to select pattern B1 based at least in part on a type of the subframe that includes a 2/3 sTTI. For example, if a 2/3 sTTI for PDSCH transmission is included in an MBSFN subframe that is configured to include CSI-RS data, the base station 105 may select pattern B1 for sTTI2, sTTI4, and sTTI5 but select pattern A1 for sTTI0, sTTI1, and sTTI3.

Figure 5:
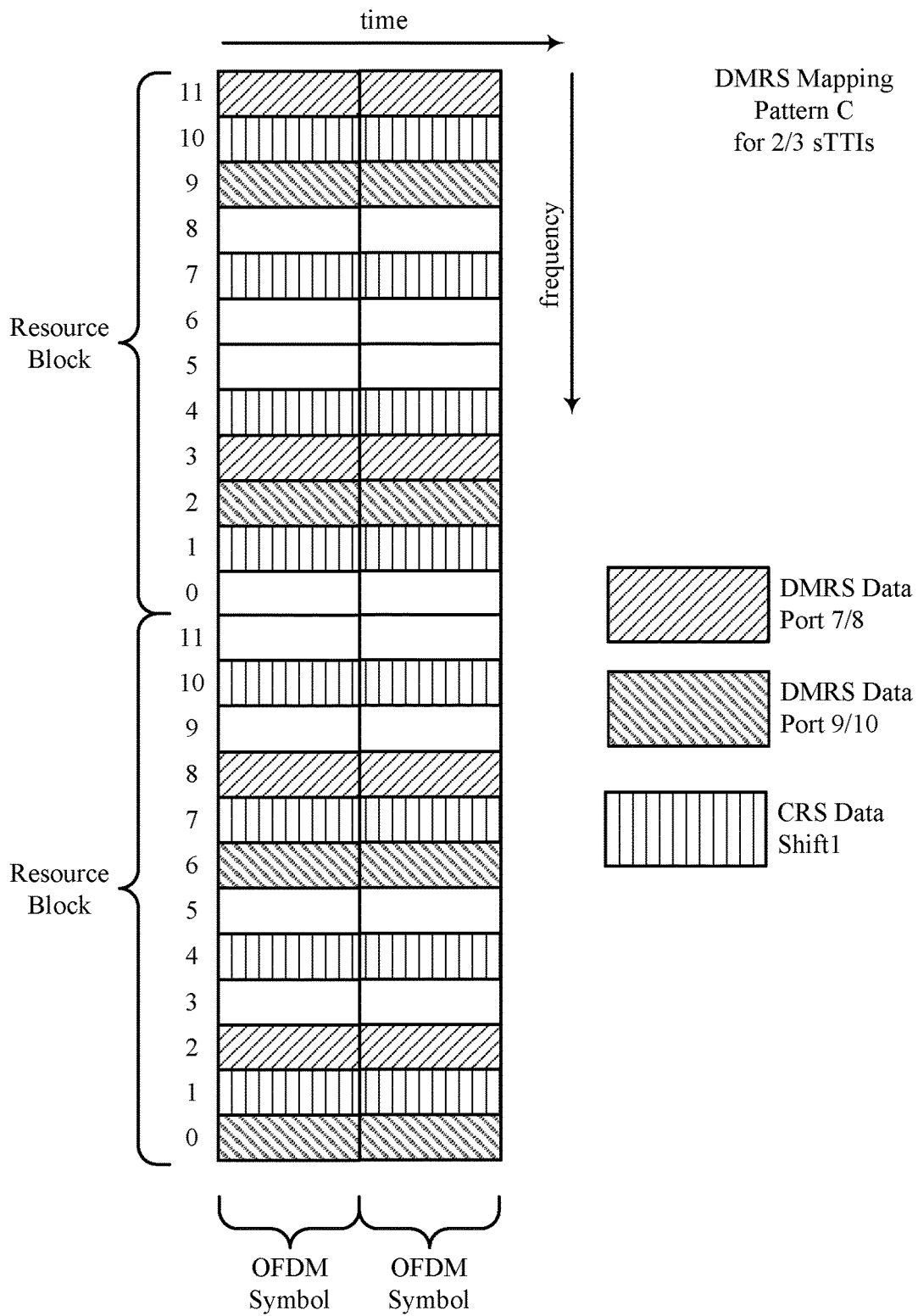
FIG. 5 illustrates an example of a DMRS mapping pattern that supports reference signal multiplexing in sTTIs in accordance with aspects of the present disclosure.

FIG. 5 illustrates an example of a DMRS mapping pattern 500 that supports reference signal multiplexing in sTTIs in accordance with various aspects of the present disclosure. In some examples, DMRS mapping pattern 500 may be implemented by aspects of wireless communication system 100.

DMRS mapping pattern 500 may be referred to as pattern C for 2/3 sTTIs or may be referred to as pattern C1. As illustrated in FIG. 5, pattern C1 may define REs over two consecutive symbols to which a base station 105 that selects pattern C1 is to map DMRS data. Within a symbol allocated to DMRS data, pattern C1 may map DMRS data for one antenna port pair (e.g., port 7/8) to REs 2 and 8 of a lower-frequency RB and REs 3 and 11 of a higher-frequency RB; pattern C1 may also map DMRS data for another antenna port pair (e.g., port 9/10) to REs 0 and 6 of the lower-frequency RB and REs 2 and 9 of the higher-frequency RB.

Pattern C1 may represent a DMRS mapping pattern for cells in which shift1 CRS data is transmitted. In a cell with a shift1 CRS configuration, a base station 105 may be configured to transmit CRS data on REs 1, 4, 7, and 10 within an RB that is to include CRS data. Thus, a base station 105 may select Pattern C1 for a 2/3 sTTI when, for example, the subframe is not configured to include a CSI-RS data and the 2/3 sTTI is configured to include shift1 CRS data.

In some cases, a base station 105 may determine whether the 2/3 sTTI is configured to include shift1 CRS data based at least in part on an index of the sTTI. For example, it may be preconfigured that sTTI0, sTTI1, sTTI3 within a subframe are to include CRS data, and whether that CRS data is shift1 CRS data may depend on the cell ID; or sTTI5 may be a special case for shift1 CRS data, as explained below.

In some cases, if the subframe is configured to include CSI-RS data, which symbols within the subframe (e.g., which of symbols 0-13) and which REs within those symbols (e.g., which of REs 0-11) are to include the CSI-RS data may be preconfigured. Thus, because each 2/3 sTTI corresponds to two or three of symbols 0-13, the base station 105 may determine whether a given 2/3 sTTI is to be configured to include CSI-RS data, and, if so, which REs within the 2/3 sTTI are to carry the CSI-RS data, based at least in part on an index of the sTTI. Thus, a base station 105 may also select Pattern C1 for a 2/3 sTTI in some cases in which, for example, the subframe is configured to include CSI-RS data and the 2/3 sTTI is configured to include shift1 CRS data. This may, for example, apply to sTTI0, sTTI1, and sTTI3.

Figure 6:
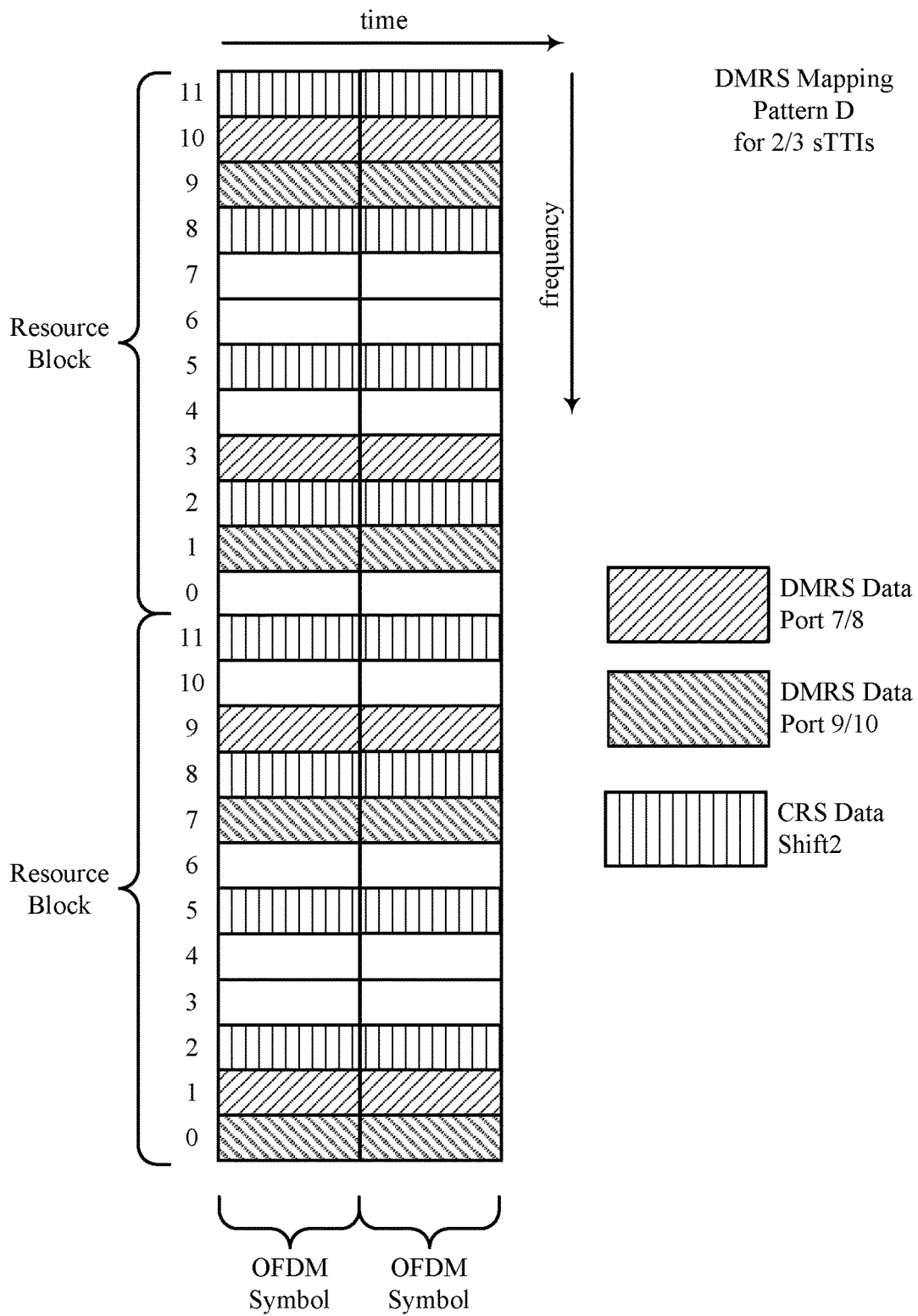
FIG. 6 illustrates an example of a DMRS mapping pattern that supports reference signal multiplexing in sTTIs in accordance with aspects of the present disclosure.

FIG. 6 illustrates an example of a DMRS mapping pattern 600 that supports reference signal multiplexing in sTTIs in accordance with various aspects of the present disclosure. In some examples, DMRS mapping pattern 600 may be implemented by aspects of wireless communication system 100.

DMRS mapping pattern 600 may be referred to as pattern D for 2/3 sTTIs or may be referred to as pattern D1. As illustrated in FIG. 6, pattern D1 may define REs over two consecutive symbols to which a base station 105 that selects pattern D1 is to map DMRS data. Within a symbol allocated to DMRS data, pattern D1 may map DMRS data for one antenna port pair (e.g., port 7/8) to REs 1 and 9 of a lower-frequency RB and REs 3 and 10 of a higher-frequency RB; pattern D1 may also map DMRS data for another antenna port pair (e.g., port 9/10) to REs 0 and 7 of the lower-frequency RB and REs 1 and 9 of the higher-frequency RB.

Pattern D1 may represent a DMRS mapping pattern for cells in which shift2 CRS data is transmitted. In a cell with a shift2 CRS configuration, a base station 105 may transmit CRS data on REs 2, 5, 8, and 11 within a RB that is to include CRS data. Thus, a base station 105 may select Pattern D1 for a 2/3 sTTI when, for example, the subframe is not configured to include a CSI-RS data and the 2/3 sTTI is configured to include shift2 CRS data.

In some cases, a base station 105 may determine whether the 2/3 sTTI is configured to include shift2 CRS data based at least in part on an index of the sTTI. For example, it may be preconfigured that sTTI0, sTTI1, sTTI3, and sTTI5 within a subframe are to include CRS data, and whether that CRS data is shift2 CRS data may depend on the cell ID.

In some cases, if the subframe is configured to include CSI-RS data, which symbols within the subframe (e.g., which of symbols 0-13) and which REs within those symbols (e.g., which of REs 0-11) are to include the CSI-RS data may be preconfigured. Thus, because each 2/3 sTTI corresponds to two or three of symbols 0-13, the base station 105 may determine whether a given 2/3 sTTI is to be configured to include CSI-RS data, and, if so, which REs within the 2/3 sTTI are to carry the CSI-RS data, based at least in part on an index of the sTTI. Thus, a base station 105 may also select Pattern C1 for a 2/3 sTTI in some cases in which, for example, the subframe is configured to include CSI-RS data and the 2/3 sTTI is configured to include shift2 CRS data. This may, for example, apply to sTTI0, sTTI1, sTTI3, and sTTI5.

Figure 7:
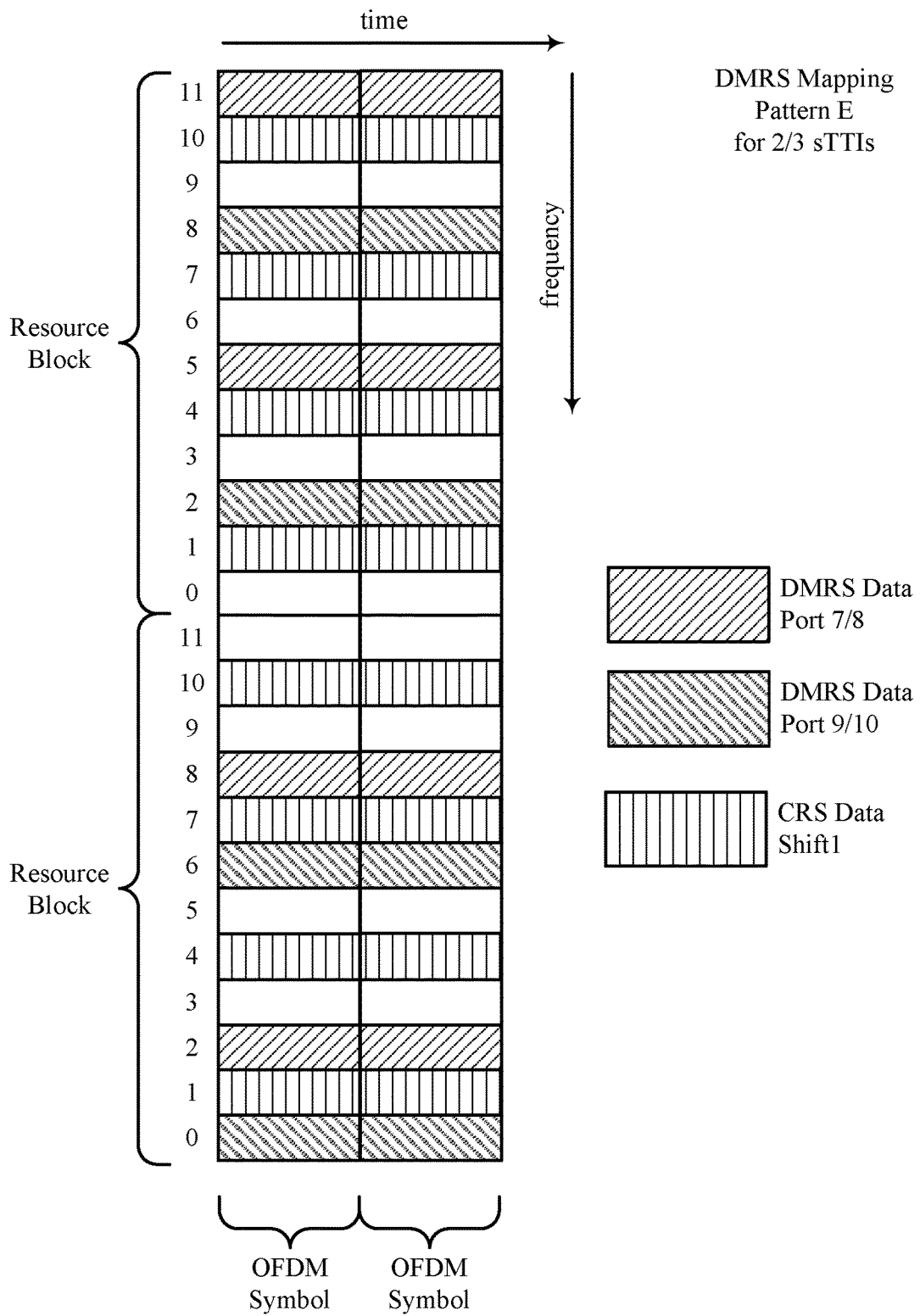
FIG. 7 illustrates an example of a DMRS mapping pattern that supports reference signal multiplexing in sTTIs in accordance with aspects of the present disclosure.

FIG. 7 illustrates an example of a DMRS mapping pattern 700 that supports reference signal multiplexing in sTTIs in accordance with various aspects of the present disclosure. In some examples, DMRS mapping pattern 700 may be implemented by aspects of wireless communication system 100.

DMRS mapping pattern 700 may be referred to as pattern E for 2/3 sTTIs or may be referred to as pattern E1. As illustrated in FIG. 7, pattern E1 may define REs over two consecutive symbols to which a base station 105 that selects pattern E1 is to map DMRS data. Within a symbol allocated to DMRS data, pattern E1 may map DMRS data for one antenna port pair (e.g., port 7/8) to REs 2 and 8 of a lower-frequency RB and REs 5 and 11 of a higher-frequency RB; pattern E1 may also map DMRS data for another antenna port pair (e.g., port 9/10) to REs 0 and 6 of the lower-frequency RB and REs 2 and 8 of the higher-frequency RB.

Pattern E1 may represent a DMRS mapping pattern specific to sTTI5 for cells in which shift1 CRS data is transmitted.

In some cases, it may be preconfigured that a DMRS data included in an sTTI5 is to be included in the temporally first and second symbols of the sTTI5 (e.g., symbols 11 and 12 of the subframe). In such cases, when the subframe is configured to include CSI-RS data and the sTTI5 is configured to include shift1 CRS data, a base station 105 may select pattern E1.

In other cases, when the subframe is configured to include CSI-RS data and the sTTI5 is configured to include shift1 CRS data, a base station 105 may shift DMRS data to the temporally second and third symbols of the sTTI5 (e.g., symbols 12 and 13 of the subframe) and treat the sTTI5 (e.g., pick a DMRS mapping pattern) as though the sTTI5 were instead an STTI2.

Figure 8A:
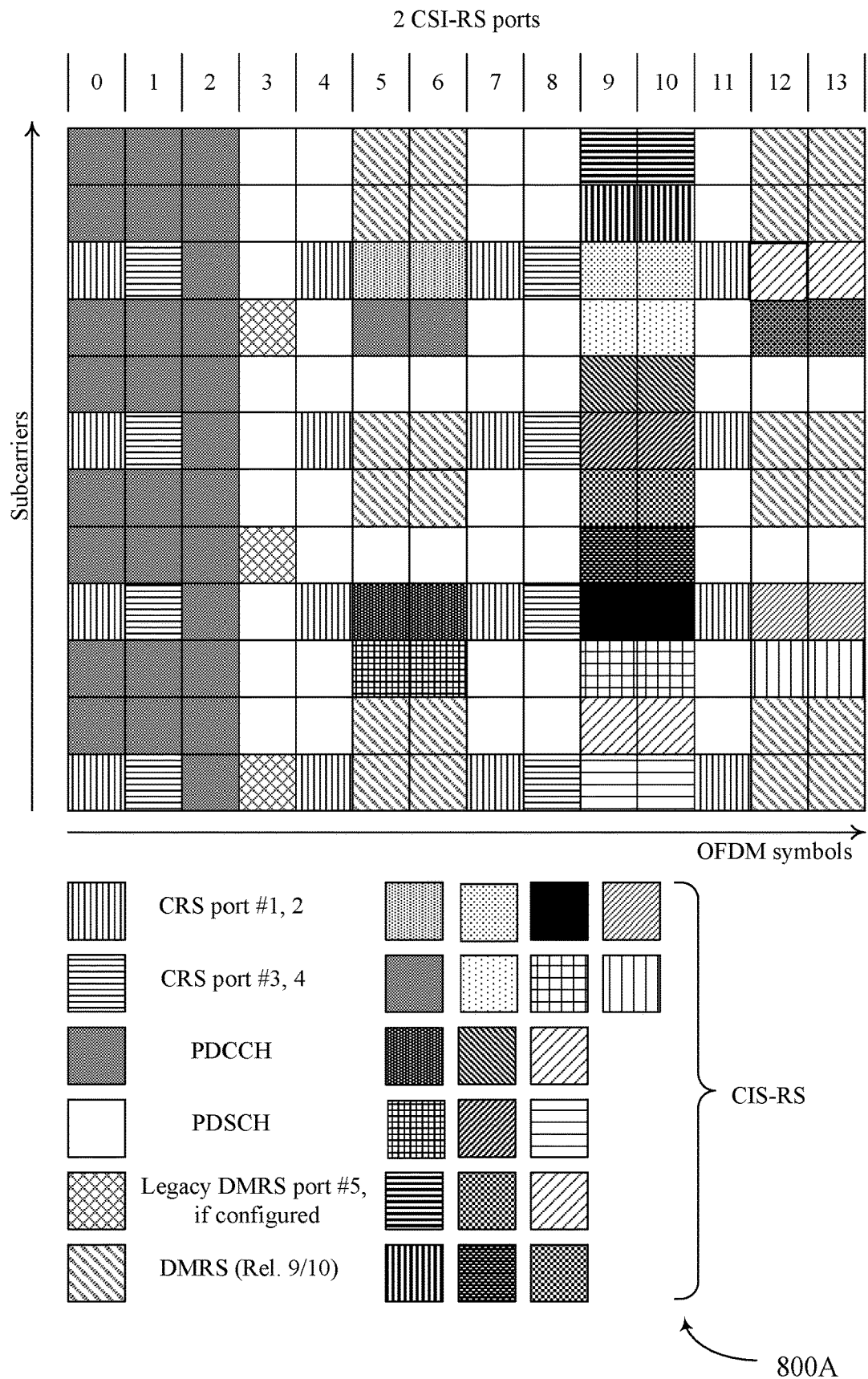
FIGS. 8A, 8B, and 8C illustrate examples of channel state information reference signal (CSI-RS) mapping patterns that support reference signal multiplexing in sTTIs in accordance with aspects of the present disclosure.
Figure 8B:
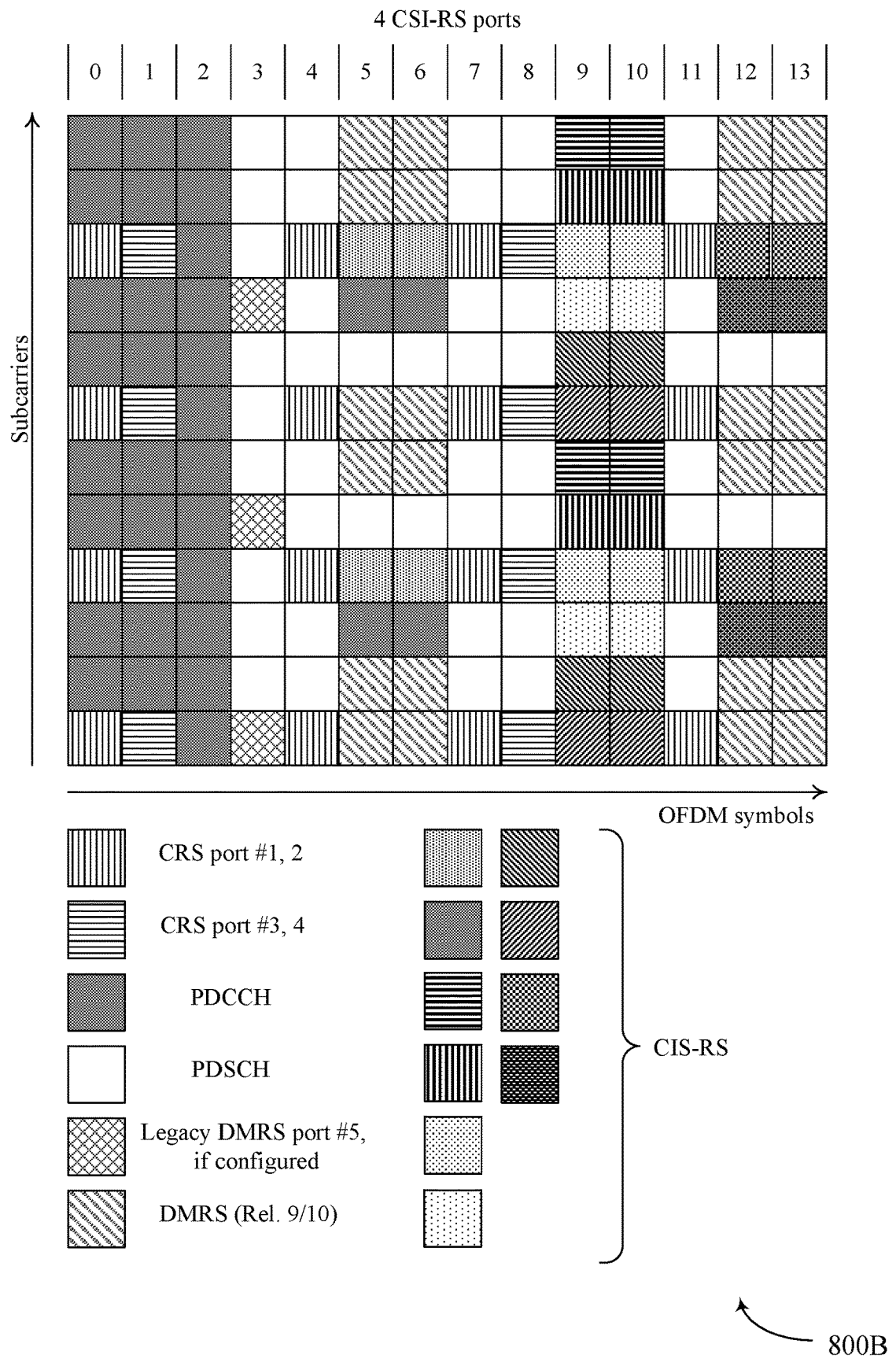
Figure 8C:
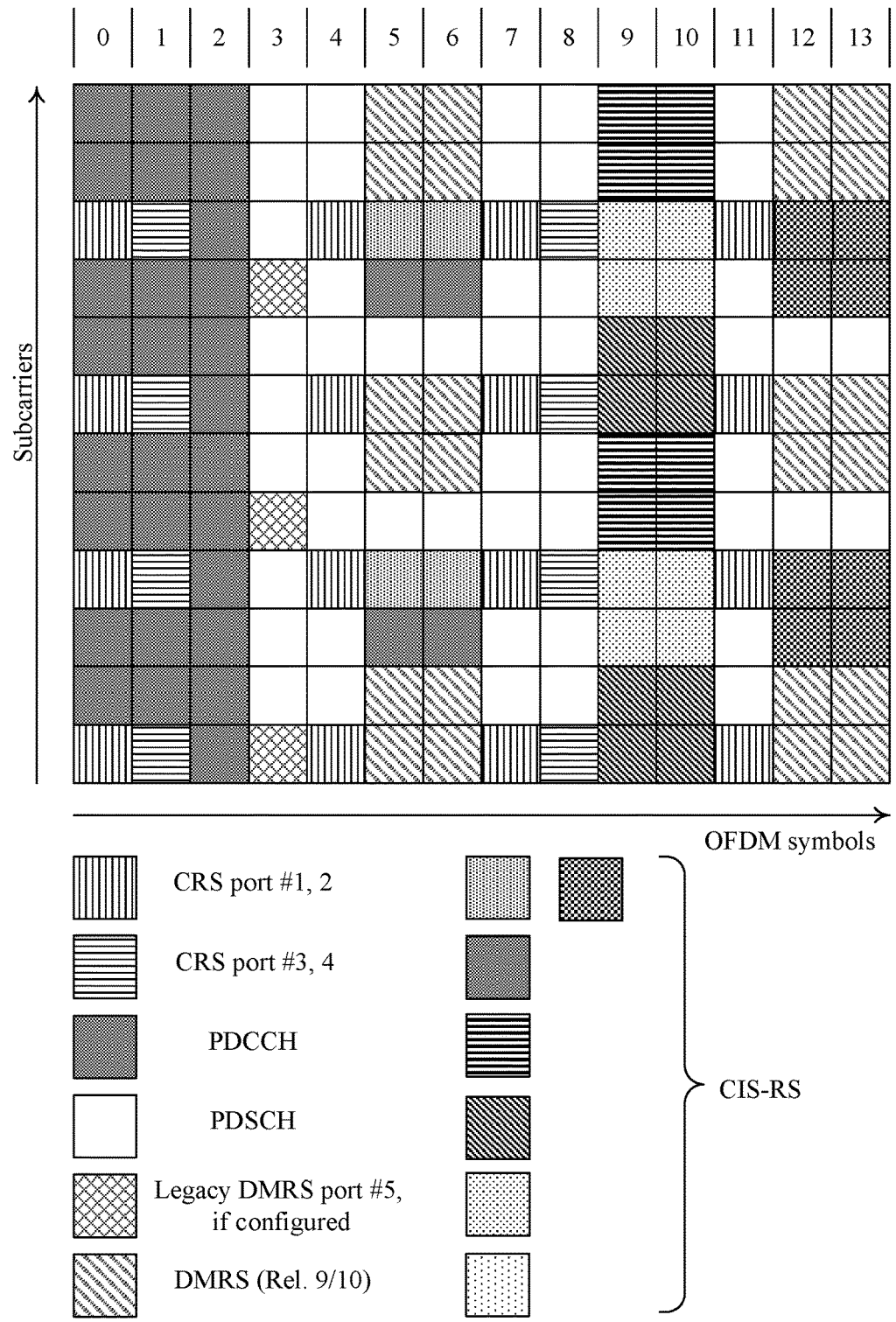

FIGS. 8A, 8B, and 8C illustrate examples of CSI-RS mapping patterns 800A, 800B, and 800C, respectively, that support reference signal multiplexing in sTTIs in accordance with various aspects of the present disclosure. In some examples, CSI-RS mapping patterns 800 may be implemented by aspects of wireless communication system 100.

For some communications systems, such as NR communications systems, CSI-RS mapping patterns 800A, 800B, and 800C may accurately reflect the REs used within a subframe for CSI-RS data-indicated in the REs, in which like shadings indicate a set of 2, 4, or 8 ports as applicable and the numbers indicate a port within the set—but may not accurately reflect the REs used for other signals. In FIGS. 8A, 8B, and 8C, CRS data may be mapped to REs within symbols 0, 4, 7, and 11 using antenna ports 1 and 2 or within symbols 1 and 8 using antenna ports 3 and 4. Legacy DMRS data, if configured, may be mapped to REs within symbol 3 using antenna port 6. DMRS data (e.g., DMRS data as described in 3GPP LTE technical specifications releases 9 or 10) may be mapped to REs within symbols 5, 6, 12, and 13. In some examples, REs within symbols 0, 1, 2, may be configured to support transmissions of control information (e.g., a PDCCH transmission). In some examples, REs within symbols 3-12 may be configured to support transmissions of data or other information (e.g., PDSCH transmissions). As illustrated in FIGS. 8A, 8B, and 8C, 2-port, 4-port, or 8-port CSI-RS data may be mapped to REs within symbols 5, 6, 9, 10, 12, or 13 of a subframe, and thus may be mapped to REs within sTTI2, sTTI4, or sTTI5 of the subframe if 2/3 sTTIs are used. Thus, if 2-port, 4-port, or 8-port CSI-RS data is configured for a subframe, a base station 105 may select pattern B1 for a 2/3 sTTI if the 2/3 sTTI is an sTTI2 or sTTI4 of the subframe. This may beneficially increase an amount of allowable 2-port, 4-port, or 8-port CSI-RS data configurations. For example, in FIG. 8B, one 4-port CSI-RS pattern may be transmitted during sTTI2 and two 4-port CSI-RS patterns may be transmitted during sTTI4. As such, by selecting pattern B1, REs 9 and 3 may be mapped to support the transmission of at least one 4-port CSI-RS pattern during sTTI2, and REs 9 and 3 and REs 6 and 0 each may be mapped to transmit at least two 4-port CSI-RS patterns transmission during sTTI4. An sTTI0, sTTI1, or sTTI3 of the subframe may be treated as an sTTI without CSI-RS data if 2-port, 4-port, or 8-port CSI-RS data is configured for the subframe. An sTTI5 may be treated as described elsewhere herein.

Figure 9A:
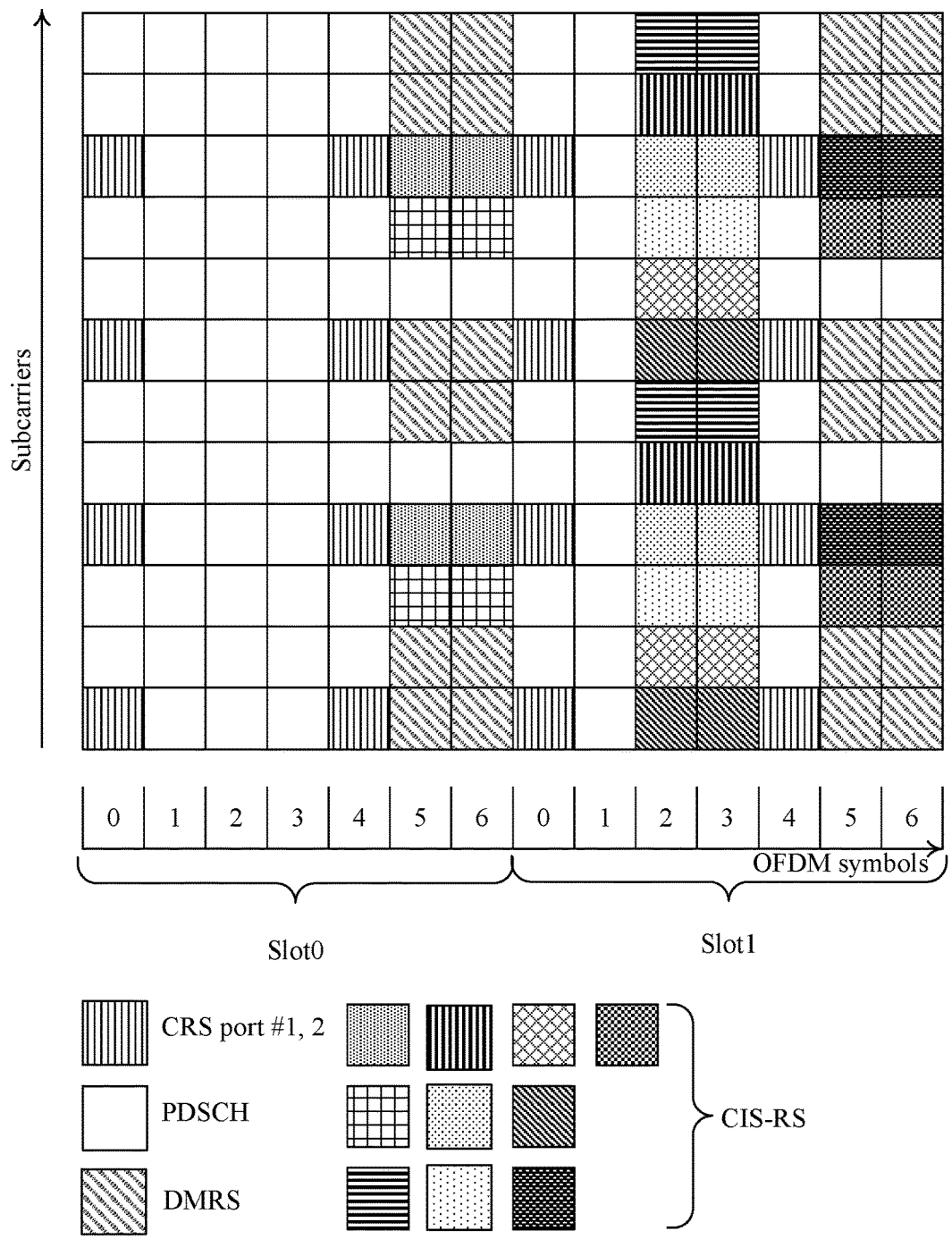
FIGS. 9A, 9B, and 9C illustrate examples of CSI-RS mapping patterns that support reference signal multiplexing in sTTIs in accordance with aspects of the present disclosure.
Figure 9B:
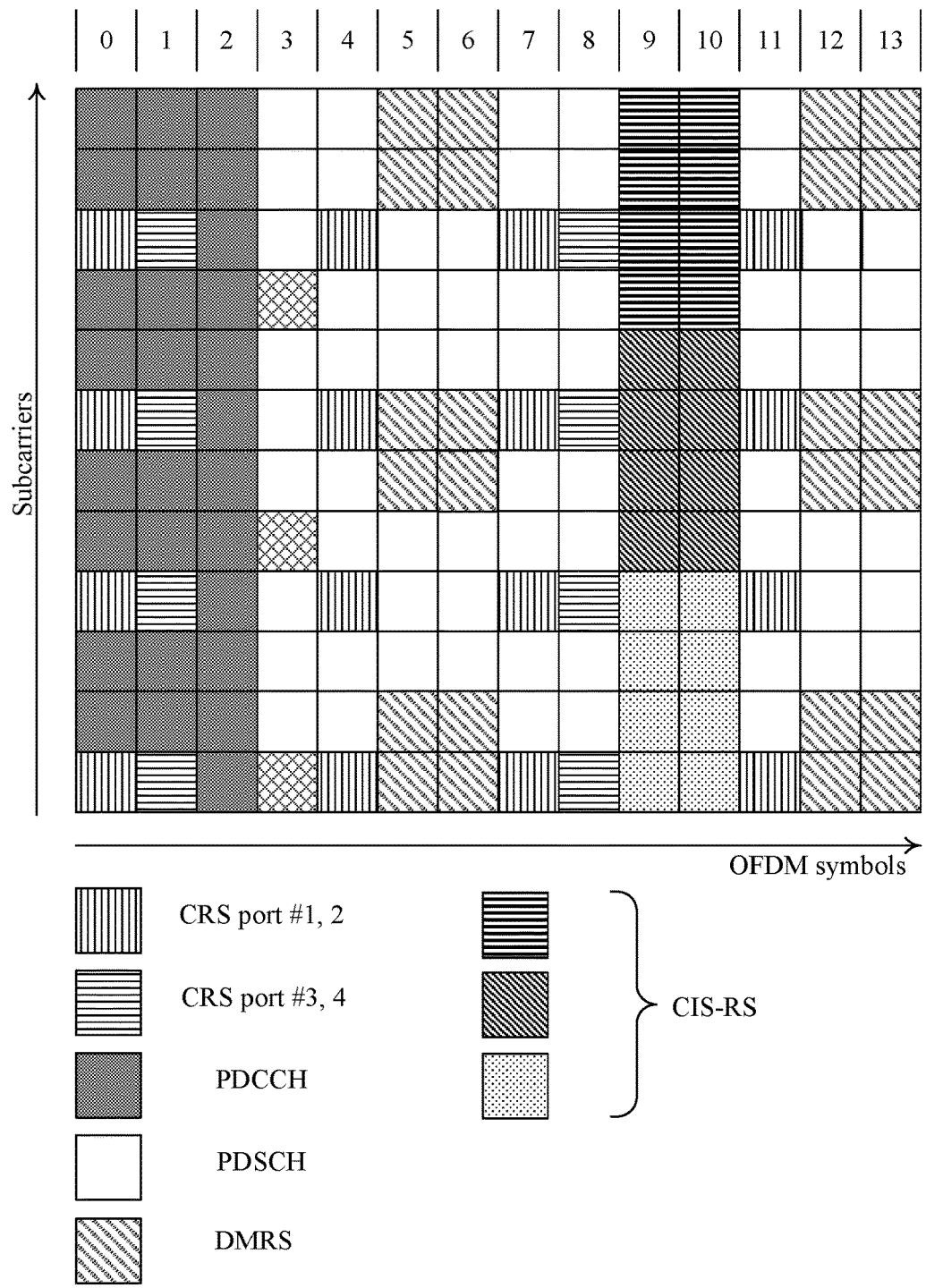
Figure 9C:
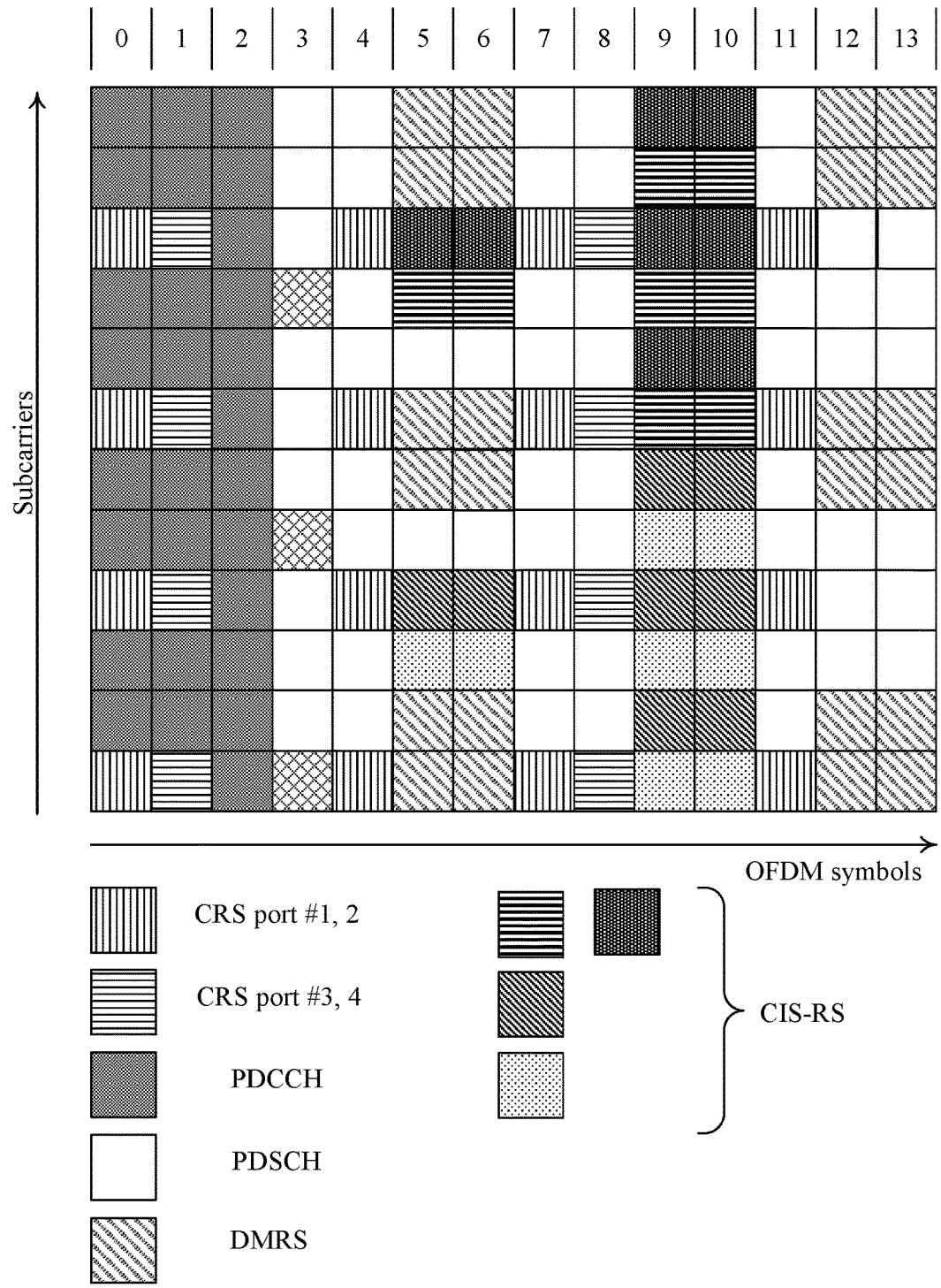

FIGS. 9A, 9B, and 9C illustrate examples of CSI-RS mapping patterns 900A, 900B, and 900C, respectively, that support reference signal multiplexing in sTTIs in accordance with various aspects of the present disclosure. In some examples, CSI-RS mapping patterns 900A, 900B, or 900C may be implemented by aspects of wireless communication system 100.

For some communications systems, such as NR communications systems, CSI-RS mapping patterns 900A, 900B, or 900C may accurately reflect the REs used within a subframe for CSI-RS data-indicated in the numbered REs, in which like shadings or letters indicate a set of 12, 24, or 32 ports as applicable and the numbers indicate a port within the set—but may not accurately reflect the REs used for other signals. In FIGS. 9A, 9B, and 9C, CRS data may be mapped to REs within symbols 0s and 4s of the slots 0 and 1, and DMRS data may be mapped to REs within symbols 5s and 6s of the slots 0 and 1. As illustrated, 24-port CSI-RS data (e.g., FIG. 9B), or 32-port CSI-RS data (e.g., FIG. 9C) may be mapped to REs within symbols 5, 6, 9, or 10 of a subframe, and thus may be mapped to REs within sTTI2 or sTTI4 of the subframe if 2/3 sTTIs are used, while 12-port CSI-RS data (e.g., FIG. 9 A) may be mapped to REs within symbols 5, 6, 9, 10, 12, or 13 of a subframe, and thus may be mapped to REs within sTTI2, sTTI4, or sTTI5 of the subframe if 2/3 sTTIs are used. In FIG. 9A, three 4-port CSI-RS patterns may be configured, REs marked as A, E, and H, each configured as one 4-port CSI-RS transmission. In FIG. 9B, a 24-port CSI-RS pattern may be configured to be transmitted within symbols 9 and 10. In FIG. 9C, a 32-port CSI pattern may be configured to be transmitted within symbols 5, 6, 9, and 10.

In some examples, if a CSI-RS configuration for more ports than 12 is used for a subframe, a base station 105 may configure the subframe to use DMRS sharing, which may refer to transmitting no DMRS data in one sTTI and configuring a UE 115 to use DMRS data transmitted in another sTTI to demodulate data transmitted in the DMRS-free sTTI. For example, if a subframe has a 24-port CSI-RS configuration, the base station 105 may configure the sTTI4 within the subframe to be DMRS free and instead rely on DMRS data included in a prior or subsequent sTTI. As another example, if a subframe has a 32-port CSI-RS configuration, the base station 105 may configure the sTTI2 and sTTI4 within the subframe to each be DMRS free and instead rely on DMRS data included in a prior or subsequent sTTI. In some examples, REs within symbols 0, 1, 2, may be configured to support transmissions of control information (e.g., a PDCCH transmission). In some examples, REs within symbols 3-12 may be configured to support transmissions of data or other information (e.g., PDSCH transmissions).

For some types of communications, such as ultra-reliable low latency communications (URLLC) for example, CRS-based transmissions may be desirable. Thus, in some cases, such as non-MBSFN subframes, a base station 105 may utilize DMRS sharing and configure up to 32 ports of CSI-RS for some UEs 115 as necessary, such as full-dimension multiple input-multiple output (FD-MIMO) UEs 115. In MBSFN subframes, DMRS-based transmissions may be desirable, and the base station 105 may switch a transmission mode of URLLC users to a DMRS-based transmission mode.

By using the DMRS mapping patterns and related techniques described herein, a base station 105 may support at least one of the 12-port, 24-port, or 32-port CSI-RS configurations shown in FIGS. 9A, 9B, and 9C, respectively.

Figure 10:
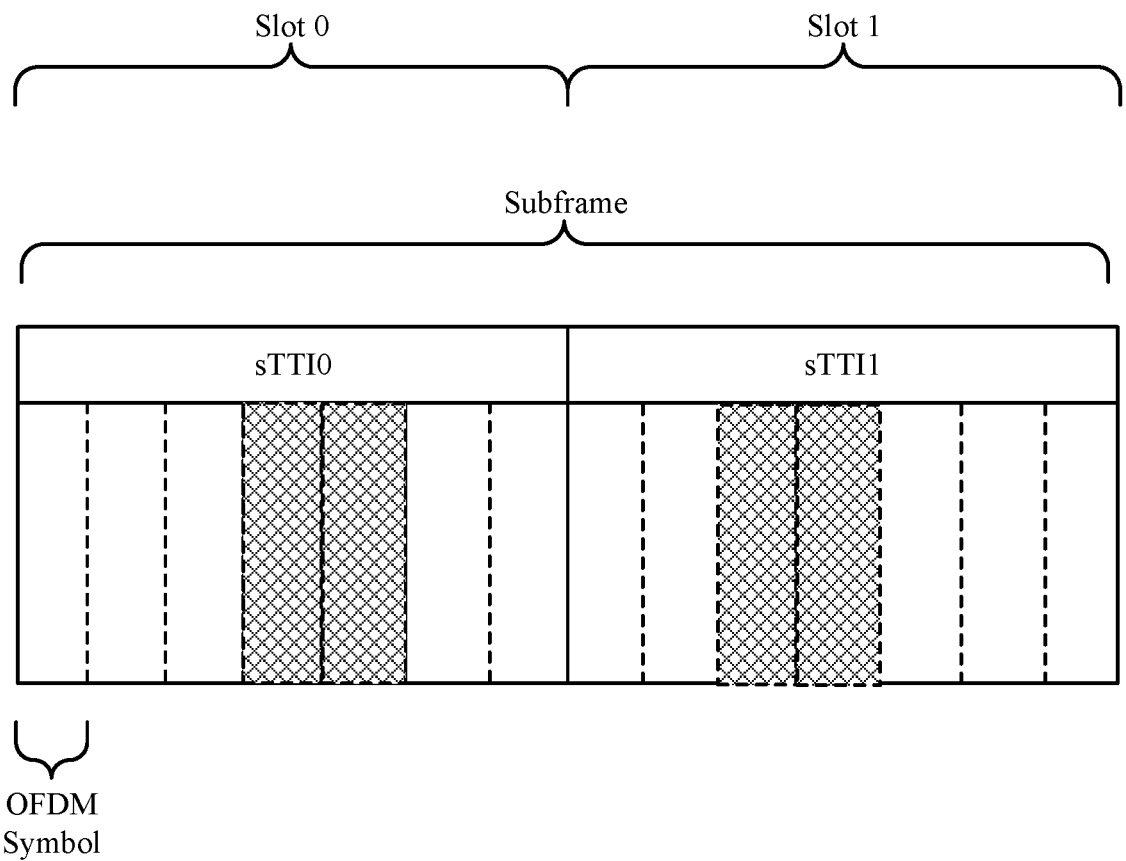
FIG. 10 illustrates an example of a second sTTI type that supports reference signal multiplexing in sTTIs in accordance with aspects of the present disclosure.

FIG. 10 illustrates an example of a second sTTI type 1000 that supports reference signal multiplexing in sTTIs in accordance with various aspects of the present disclosure. In some examples, second sTTI type 1000 may be implemented by aspects of wireless communication system 100.

An sTTI of the second sTTI type 1000 may be referred to as a 1-slot sTTI. As illustrated in FIG. 10, each 1-slot sTTI may include seven OFDM symbols, and a subframe may include two 1-slot sTTIs. The subframe thus may include fourteen OFDM symbols, which may be indexed and referred to as symbols 0-13 of the subframe. Each 1-slot sTTI may have an index n, where n is an integer. Thus, a temporally first 1-slot sTTI within a subframe may be referred to as sTTI0, and a temporally second 1-slot sTTI within the subframe may be referred to as sTTI1.

In some cases, each symbol of a 1-slot sTTI may include one RB of twelve REs. Each RB may include, for example, 12 subcarriers within one symbol, with each subcarrier/symbol combination representing an RE. Subcarriers within an RB may be indexed and referred to as subcarriers 0-11, with the corresponding REs likewise indexed and referred to as REs 0-11.

In some cases, it may be preconfigured that a DMRS data included in a 1-slot sTTI having index 0 is to be included in symbols 3 and 4 of the first 1-slot TTI of the subframe and that any DMRS data included in a 1-slot sTTI having index 1 is to be included in symbols 2 and 3 of the second 1-slot TTI of the subframe, as indicated by the patterning of those symbols in FIG. 10.

Figure 11:
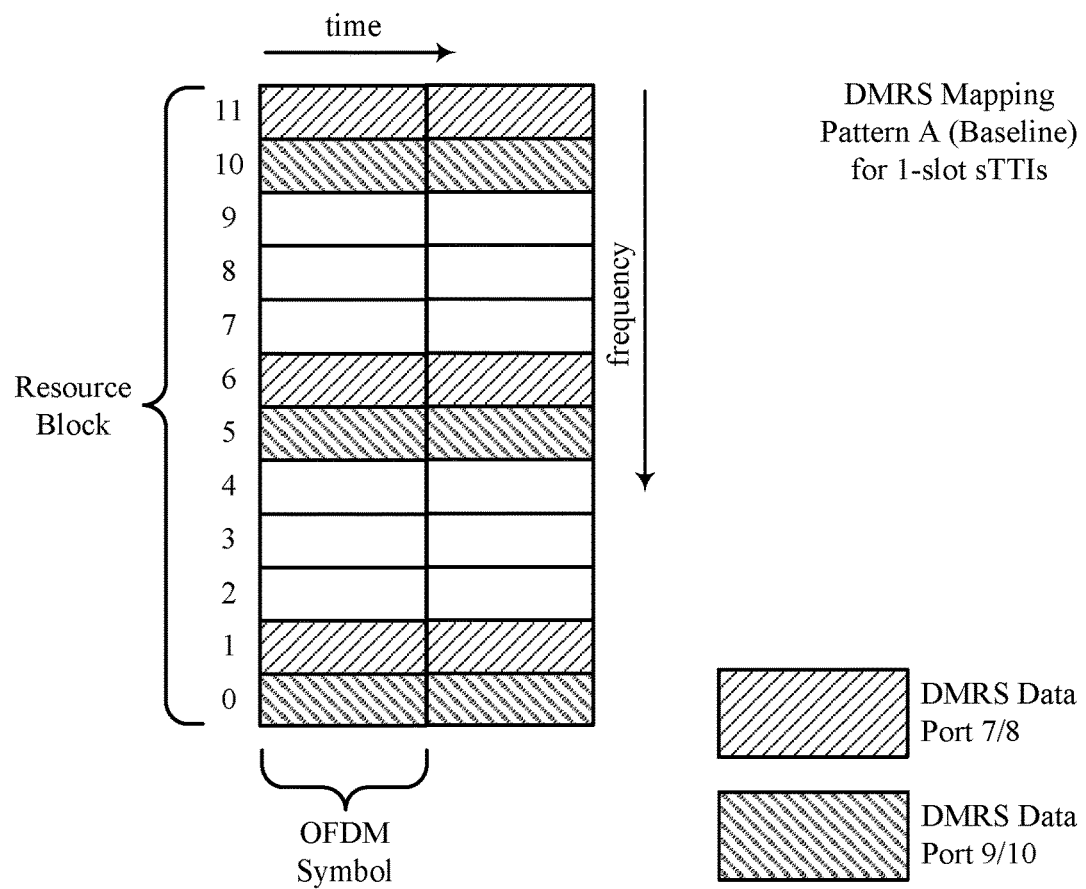
FIG. 11 illustrates an example of a DMRS mapping pattern that supports reference signal multiplexing in sTTIs in accordance with aspects of the present disclosure.

FIG. 11 illustrates an example of a DMRS mapping pattern 1100 that supports reference signal multiplexing in sTTIs in accordance with aspects of the present disclosure. In some examples, DMRS mapping pattern 1100 may be implemented by aspects of wireless communication system 100.

DMRS mapping pattern 1100 may be referred to as pattern A for 1-slot sTTIs or may be referred to as pattern A2. As illustrated in FIG. 11, pattern A2 may define REs over two consecutive symbols to which a base station 105 that selects pattern A2 is to map DMRS data. Within a symbol allocated to DMRS data, pattern A2 may map DMRS data for one antenna port pair (e.g., port 7/8) to REs 1, 6, and 11 of the RB; pattern A2 may also map DMRS data for another antenna port pair (e.g., port 9/10) to REs 0, 5, and 10 of the RB.

Pattern A2 may represent a baseline DMRS mapping pattern for 1-slot sTTIs, and a base station 105 may select Pattern A1 for a 1-slot sTTI when, for example, the subframe is not configured to include any CSI-RS data and the sTTI also lacks any CRS data in the candidate symbols for DMRS data—this is the case, for example, with a 1-slot sTTI having index slot1 or sTTI1. In some cases, pattern A2 may be selected for a 1-slot sTTI for PDSCH transmission if the 1-slot sTTI is included in an MBSFN subframe. In some cases, if a 1-slot sTTI for PDCCH transmission and a 2/3 sTTI for PDSCH transmission are included in a same TTI (e.g., a subframe, a slot, etc.), a DMRS mapping pattern used for the 2/3 sTTI for PDSCH transmission may be used for the 1-slot sTTI for PDCCH transmission.

Figure 12:
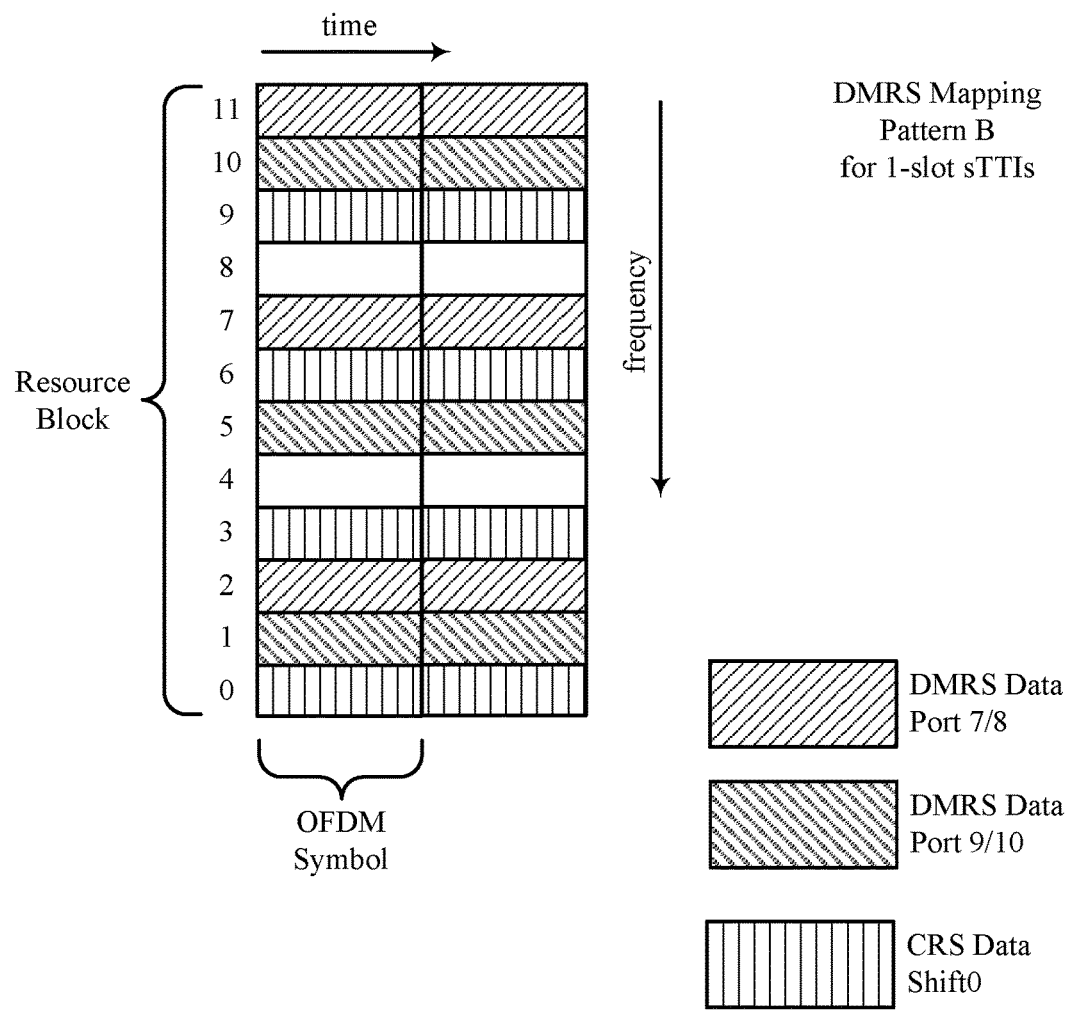
FIG. 12 illustrates an example of a DMRS mapping pattern that supports reference signal multiplexing in sTTIs in accordance with aspects of the present disclosure.

FIG. 12 illustrates an example of a DMRS mapping pattern 1200 that supports reference signal multiplexing in sTTIs in accordance with aspects of the present disclosure. In some examples, DMRS mapping pattern 1200 may be implemented by aspects of wireless communication system 100.

DMRS mapping pattern 1200 may be referred to as pattern B for 1-slot sTTIs or may be referred to as pattern B2. As illustrated in FIG. 12, pattern B2 may define REs over two consecutive symbols to which a base station 105 that selects pattern B2 is to map DMRS data. Within a symbol allocated to DMRS data, pattern B2 may map DMRS data for one antenna port pair (e.g., port 7/8) to REs 2, 7, and 11 of the RB; pattern B2 may also map DMRS data for another antenna port pair (e.g., port 9/10) to REs 1, 5, and 10 of the RB.

Pattern B2 may represent a DMRS mapping pattern for cells in which shift0 CRS data is transmitted. Thus, a base station 105 may select pattern B2 for a 1-slot sTTI when, for example, the 1-slot sTTI is configured to include shift0 CRS data and the 1-slot sTTI1 has index slot0 or sTTI0. A base station 105 may also select pattern B2 for a 1-slot sTTI when, for example, the subframe is configured to include CSI-RS data, the 1-slot sTTI is configured to include shift0 CRS data, and the 1-slot sTTI1 has index slot1 or sTTI1.

In some cases, the base station 105 may select pattern B2 for a 1-slot sTTI for PDSCH transmission if the 1-slot sTTI is included in a non-MBSFN subframe and if a cell-specific frequency shift is configured to be zero. For example, if a four-layer antenna port is configured and the cell-specific frequency shift is zero, then a DMRS data transmitted via ports 7 and 8 may be transmitted in the REs 2, 7, or 11 of an RB of the 1-slot sTTI, and a DMRS transmitted via ports 9 and 10 may be transmitted in the REs 1, 5, or 10 of the RB of the 1-slot sTTI. In some cases, if a 1-slot sTTI for PDCCH transmission and a 2/3 sTTI for PDSCH transmission are included in a same TTI (e.g., a subframe, a slot, etc.), a DMRS mapping pattern used for the 2/3 sTTI for PDSCH transmission may be used for the 1-slot sTTI for PDCCH transmission.

Figure 13:
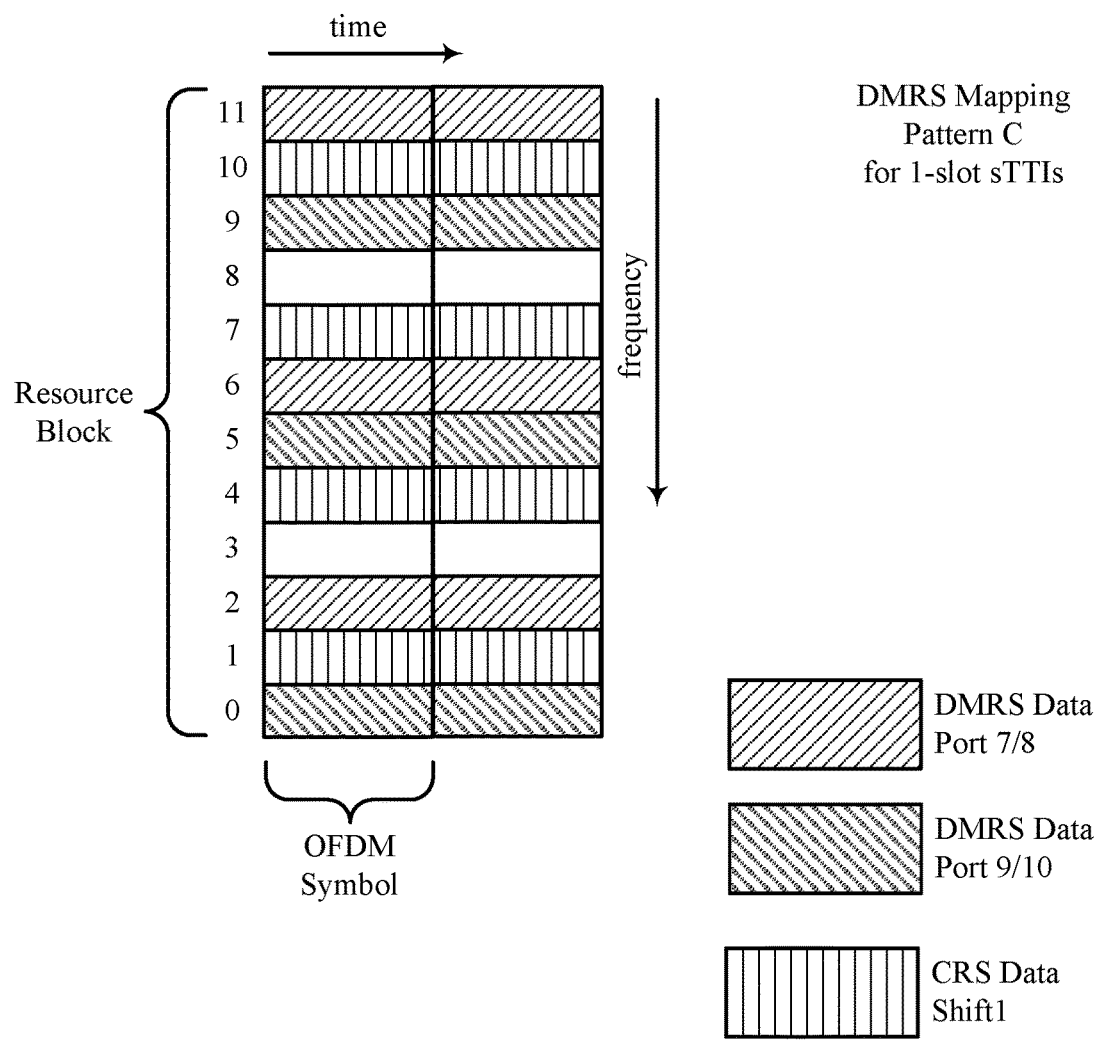
FIG. 13 illustrates an example of a DMRS mapping pattern that supports reference signal multiplexing in sTTIs in accordance with aspects of the present disclosure.

FIG. 13 illustrates an example of a DMRS mapping pattern 1300 that supports reference signal multiplexing in sTTIs in accordance with aspects of the present disclosure. In some examples, DMRS mapping pattern 1300 may implement aspects of wireless communication system 100.

DMRS mapping pattern 1300 may be referred to as pattern C for 1-slot sTTIs or may be referred to as pattern C2. As illustrated in FIG. 13, pattern C2 may define REs over two consecutive symbols to which a base station 105 that selects pattern C2 is to map DMRS data. Within a symbol allocated to DMRS data, pattern C2 may map DMRS data for one antenna port pair (e.g., port 7/8) to REs 2, 6, and 11 of the RB; pattern C2 may also map DMRS data for another antenna port pair (e.g., port 9/10) to REs 0, 5, and 9 of the RB.

Pattern C2 may represent a DMRS mapping pattern for cells in which shift1 CRS data is transmitted. Thus, a base station 105 may select Pattern C2 for a 1-slot sTTI when, for example, the 1-slot sTTI is configured to include shift1 CRS data and the 1-slot sTTI1 has index slot0 or sTTI0. A base station 105 may also select Pattern C2 for a 1-slot sTTI when, for example, the subframe is configured to include CSI-RS data, the 1-slot sTTI is configured to include shift1 CRS data, and the 1-slot sTTI1 has index slot1 or sTTI1.

In some cases, the base station 105 may select pattern C2 for a 1-slot sTTI for PDSCH transmission if the 1-slot sTTI is included in a non-MBSFN subframe and if a cell-specific frequency shift is configured to be one. For example, if a four-layer antenna port is configured and the cell-specific frequency shift is 1, then a DMRS data transmitted via ports 7 and 8 may be transmitted in the REs 2, 6, or 11 of an RB of the 1-slot sTTI, and a DMRS transmitted via ports 9 and 10 may be transmitted in the REs 0, 5, or 9 of the RB of the 1-slot sTTI. In some cases, if a 1-slot sTTI for PDCCH transmission and a 2/3 sTTI for PDSCH transmission are included in a same TTI (e.g., a subframe, a slot, etc.), a DMRS mapping pattern used for the 2/3 sTTI for PDSCH transmission may be used for the 1-slot sTTI for PDCCH transmission.

Figure 14:
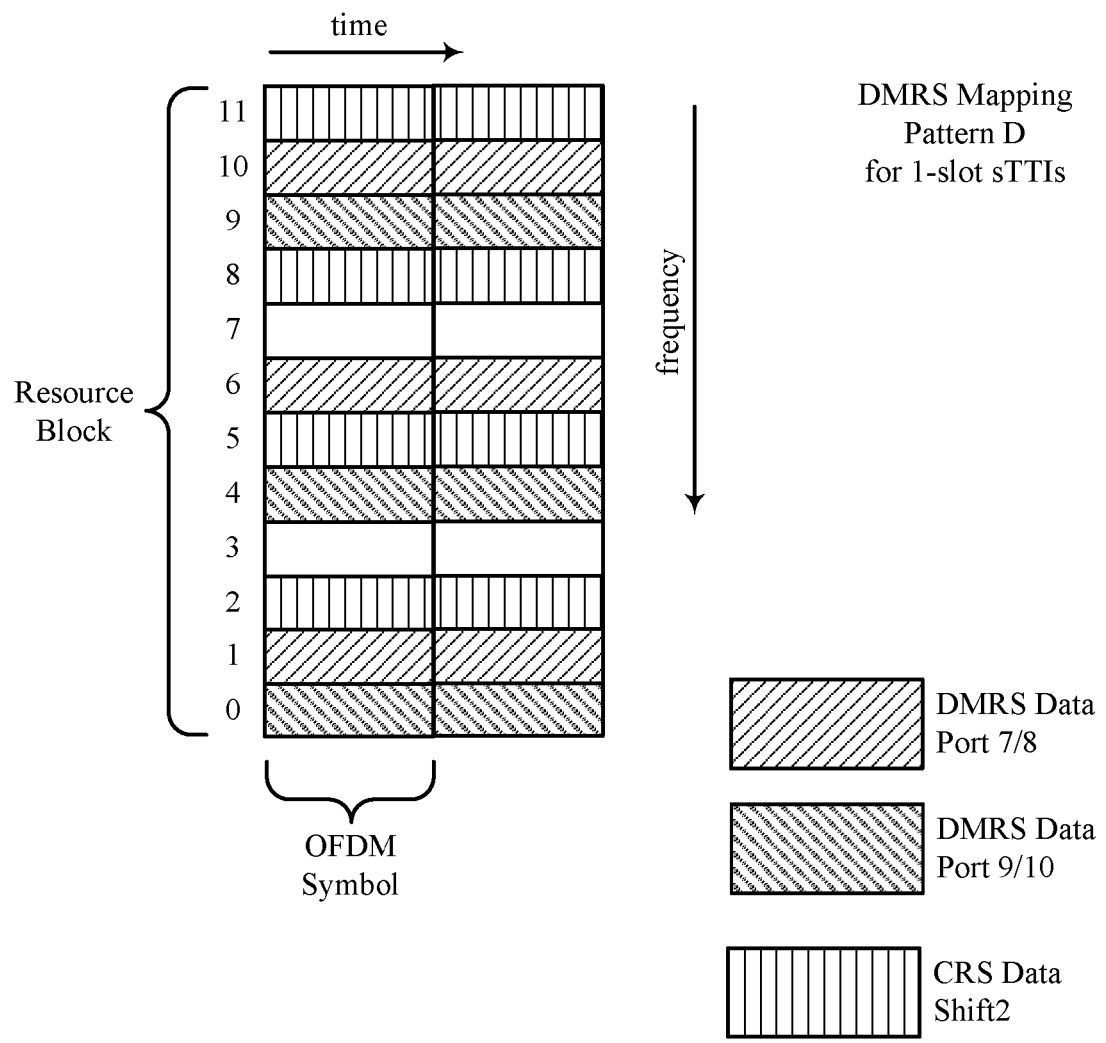
FIG. 14 illustrates an example of a DMRS mapping pattern that supports reference signal multiplexing in sTTIs in accordance with aspects of the present disclosure.

FIG. 14 illustrates an example of a DMRS mapping pattern 1400 that supports reference signal multiplexing in sTTIs in accordance with aspects of the present disclosure. In some examples, DMRS mapping pattern 1400 may implement aspects of wireless communication system 100.

DMRS mapping pattern 1400 may be referred to as pattern D for 1-slot sTTIs or may be referred to as pattern D2. As illustrated in FIG. 14, pattern D2 may define REs over two consecutive symbols to which a base station 105 that selects pattern D2 is to map DMRS data. Within a symbol allocated to DMRS data, pattern D2 may map DMRS data for one antenna port pair (e.g., port 7/8) to REs 1, 6, and 10 of the RB; pattern D2 may also map DMRS data for another antenna port pair (e.g., port 9/10) to REs 0, 4, and 9 of the RB.

Pattern D2 may represent a DMRS mapping pattern for cells in which shift2 CRS data is transmitted. Thus, a base station 105 may select pattern D2 for a 1-slot sTTI when, for example, the 1-slot sTTI is configured to include shift2 CRS data and the 1-slot sTTI1 has index slot0 or sTTI0. A base station 105 may also select pattern D2 for a 1-slot sTTI when, for example, the subframe is configured to include CSI-RS data, the 1-slot sTTI is configured to include shift2 CRS data, and the 1-slot sTTI1 has index slot1 or sTTI1.

In some cases, the base station 105 may select pattern D2 for a 1-slot sTTI for PDSCH transmission if the 1-slot sTTI is included in a non-MBSFN subframe and if a cell-specific frequency shift is configured to be two. For example, if a four-layer antenna port is configured and the cell-specific frequency shift is 2, then a DMRS data transmitted via ports 7 and 8 may be transmitted in the REs 1, 6, or 10 of an RB of the 1-slot sTTI, and a DMRS transmitted via ports 9 and 10 may be transmitted in the REs 0, 4, or 9 of the RB of the 1-slot sTTI. In some cases, if a 1-slot sTTI for PDCCH transmission and a 2/3 sTTI for PDSCH transmission are included in a same TTI (e.g., a subframe, a slot, etc.), a DMRS mapping pattern used for the 2/3 sTTI for PDSCH transmission may be used for the 1-slot sTTI for PDCCH transmission.

Figure 15A:
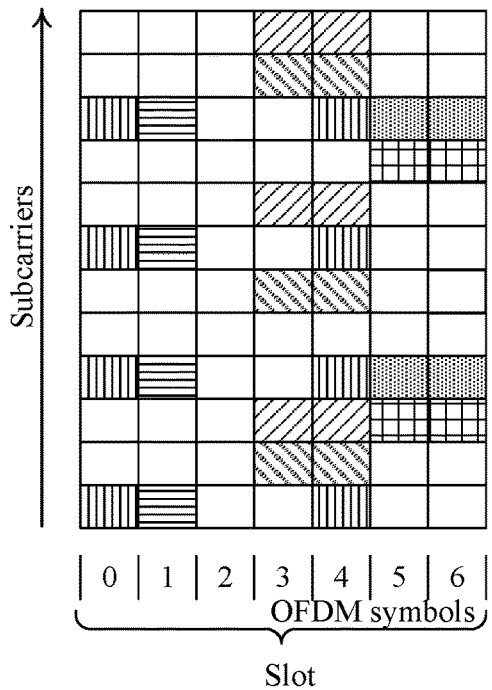
FIGS. 15A and 15B illustrate an example of a DMRS mapping pattern that supports reference signal multiplexing in sTTIs in accordance with aspects of the present disclosure.
Figure 15A:
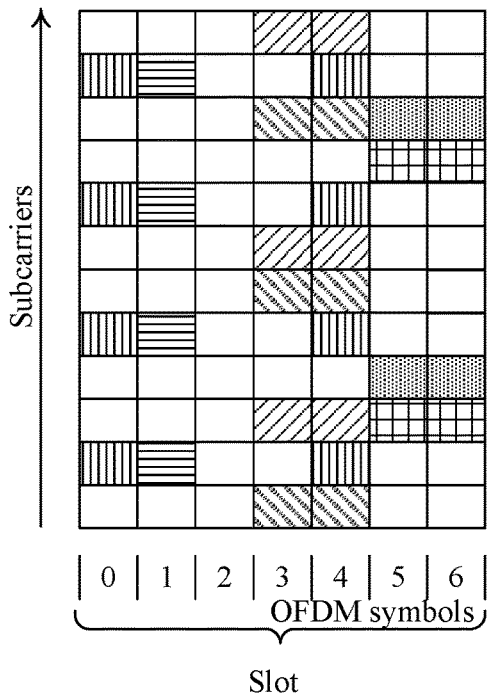
Figure 15A:
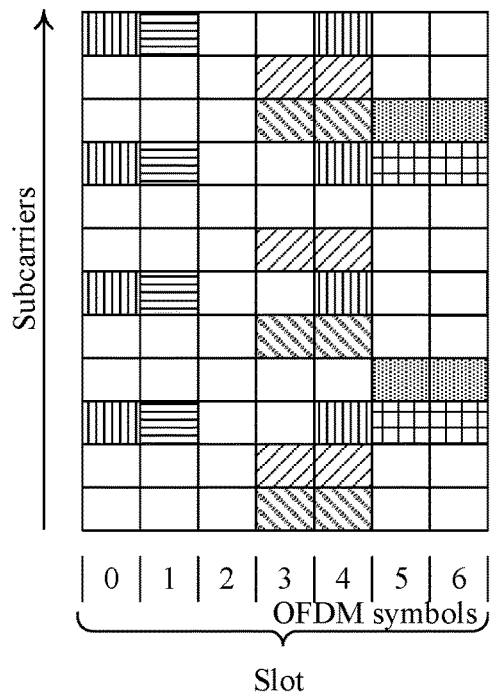
Figure 15A:
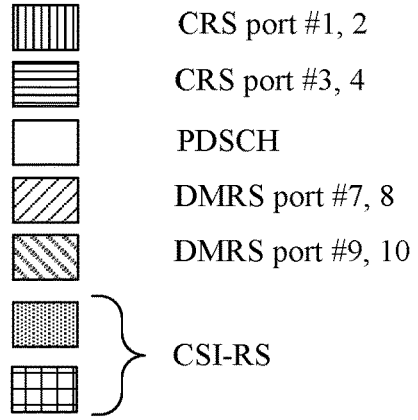
Figure 15B:
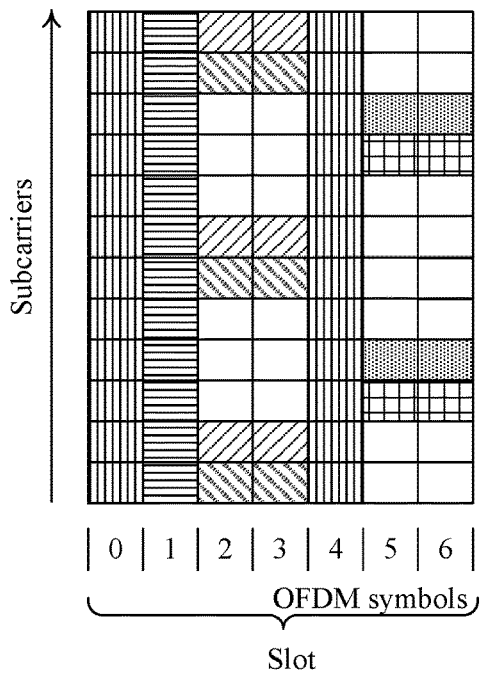
Figure 15B:
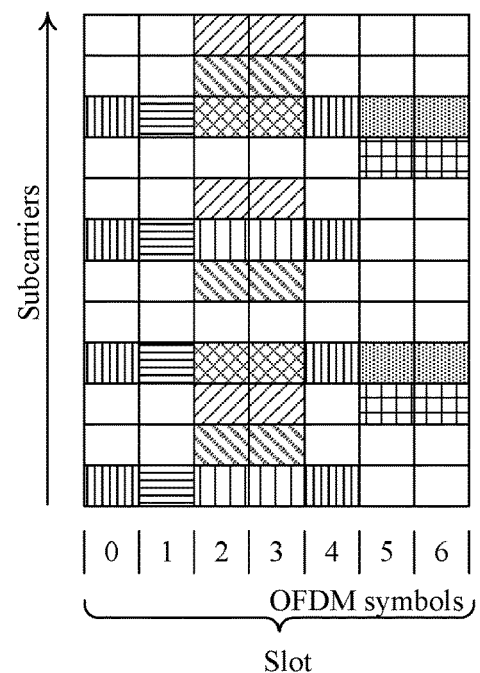
Figure 15B:
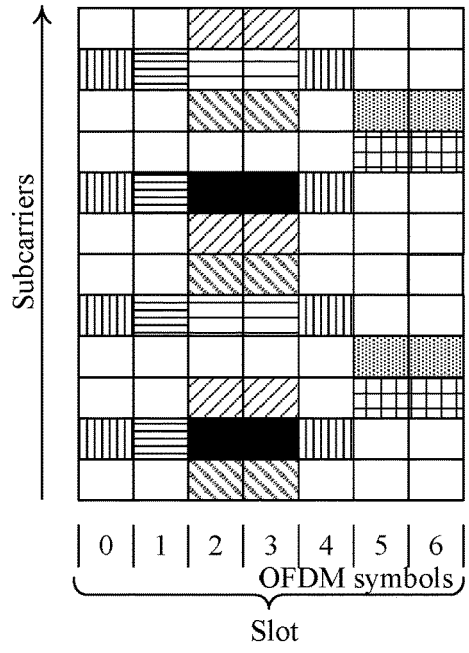
Figure 15B:
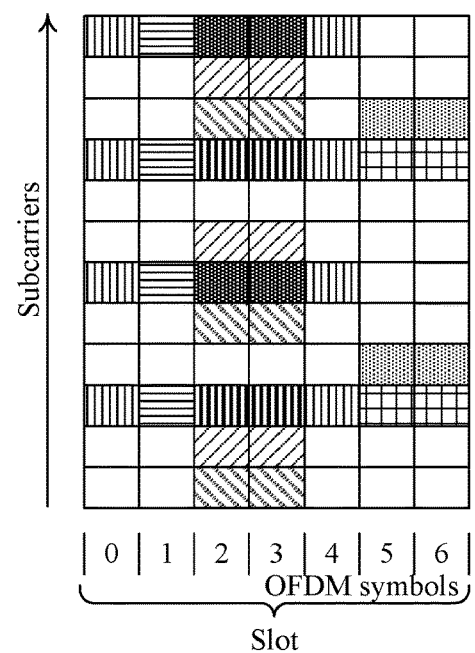

FIGS. 15A and 15B illustrate examples of a DMRS mapping patterns collections 1500A and 1500B, respectively, that supports reference signal multiplexing in sTTIs in accordance with aspects of the present disclosure. In some examples, DMRS mapping patterns collections 1500A or 1500B may be implemented by aspects of wireless communication system 100.

DMRS mapping patterns collection 1500A shows patterns B2, C2, and D2 as applied to 1-slot sTTIs (e.g., 1-slot sTTI for sPDSCH) having an index of sTTI0. DMRS mapping patterns collection 1500B shows patterns A2, B2, C2, and D2 as applied to 1-slot sTTIs (e.g., 1-slot sTTI for sPDSCH) having an index of sTTI1. DMRS data for a one antenna port pair (e.g., ports 9/10) may be mapped to REs within symbols 3 and 4 of sTTI0 or REs within symbols 2 and 3 of sTTI1, DMRS data for another second antenna port pair (e.g., ports 7/8) may be mapped to REs within symbols 3 and 4 of sTTI0 or REs within symbols 2 and 3 of sTTI1, CRS data may be mapped to REs within symbols 0, 1, and 4 of sTTI0 or REs within symbols 0, 1, and 4 of sTTI1, and CSI-RS data may be mapped to REs within symbols 5 and 6 of sTTI0 or REs within symbols 2, 3, 5, and 6 of sTTI1. During sTTI0 there may not be collision between DMRS data and CSI-RS data, but shifted CRS patterns may be used to accommodate a collision between CRS data and DMRS data mapped to REs within symbol 4 of sTTI0. As illustrated in FIG. 15A, two 4-port CSI-RS transmissions may be possible in sTTI0. During sTTI1, there may be collision between DMRS data and CSI-RS data mapped to REs within symbols 2 and 3 of sTTI1. Shifted CRS patterns (e.g., the same patterns used in sTTI0) may be used in sTTI1 to reduce the collision. As illustrated in FIG. 15B, four 4-port CSI-RS data may be mapped in sTTI1.

Figure 16:
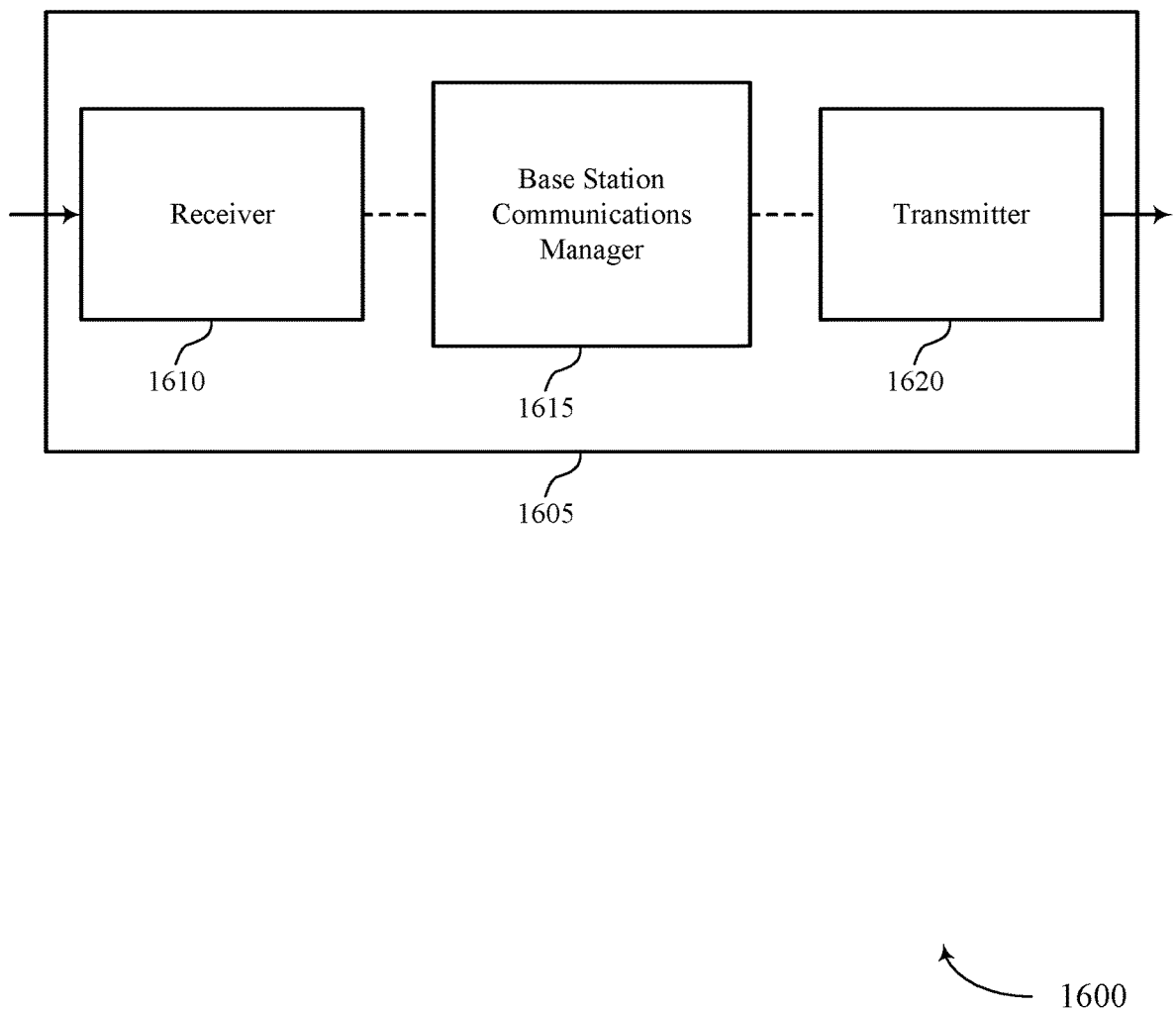
FIGS. 16 through 18 show block diagrams of a device that supports reference signal multiplexing in sTTIs in accordance with aspects of the present disclosure.

FIG. 16 shows a block diagram 1600 of a wireless device 1605 that supports reference signal multiplexing in sTTIs in accordance with aspects of the present disclosure. Wireless device 1605 may be an example of aspects of a base station 105 as described herein. Wireless device 1605 may include receiver 1610, base station communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to reference signal multiplexing in sTTIs, etc.). Information may be passed on to other components of the device. Receiver 1610 may be an example of aspects of the transceiver 1935 described with reference to FIG. 19. Receiver 1610 may utilize a single antenna or a set of antennas.

Base station communications manager 1615 may be an example of aspects of base station communications manager 1915 described with reference to FIG. 19.

Base station communications manager 1615 and/or at least some of its various sub-components may be implemented in hardware, software executed by a processor, firmware, or any combination thereof. If implemented in software executed by a processor, the functions of base station communications manager 1615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. Base station communications manager 1615 and/or at least some of its various sub-components may be physically located at various positions, including being distributed such that portions of functions are implemented at different physical locations by one or more physical devices. In some examples, base station communications manager 1615 and/or at least some of its various sub-components may be a separate and distinct component in accordance with various aspects of the present disclosure. In other examples, base station communications manager 1615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1615 may identify a reference signal configuration of a sTTI in a subframe, the reference signal configuration including at least one of a CSI-RS configuration or a CRS configuration, select, based on the reference signal configuration of the sTTI, a DMRS mapping pattern from a set of DMRS mapping patterns for mapping DMRS data to REs within the sTTI, configure REs within the sTTI according to the selected DMRS mapping pattern, and transmit DMRS data on the configured REs.

Transmitter 1620 may transmit signals generated by other components of the device 1605. In some examples, transmitter 1620 may be collocated with receiver 1610 in a transceiver module. For example, transmitter 1620 may be an example of aspects of transceiver 1935 described with reference to FIG. 19. Transmitter 1620 may utilize a single antenna or a set of antennas.

Figure 17:
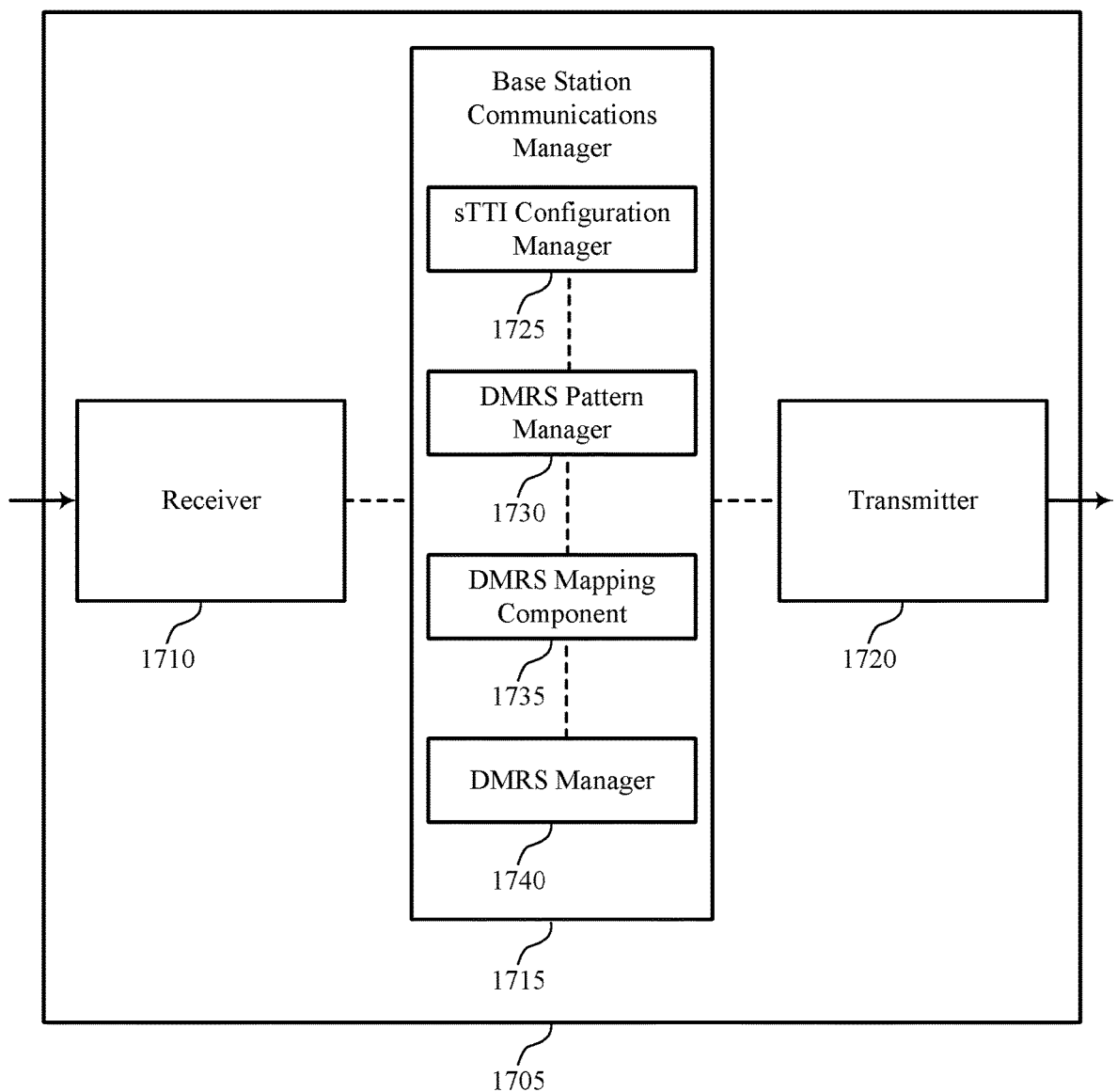

FIG. 17 shows a block diagram 1700 of a wireless device 1705 that supports reference signal multiplexing in sTTIs in accordance with aspects of the present disclosure. Wireless device 1705 may be an example of aspects of a wireless device 1605 or a base station 105 as described with reference to FIG. 16. Wireless device 1705 may include receiver 1710, base station communications manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to reference signal multiplexing in sTTIs, etc.). Information may be passed on to other components of the device. Receiver 1710 may be an example of aspects of the transceiver 1935 described with reference to FIG. 19. Receiver 1710 may utilize a single antenna or a set of antennas.

Base station communications manager 1715 may be an example of aspects of base station communications manager 1915 described with reference to FIG. 19. Base station communications manager 1715 may also include sTTI configuration manager 1725, DMRS pattern manager 1730, DMRS mapping component 1735, and DMRS manager 1740.

sTTI configuration manager 1725 may identify a reference signal configuration of an sTTI in a subframe, the reference signal configuration including at least one of a CSI-RS configuration or a CRS configuration. In some cases, the sTTI is two or three OFDM symbols, each OFDM symbol includes two RBs, and each RB includes twelve REs. In some cases, the sTTI is a slot, and the slot includes seven OFDM symbols that each include twelve REs.

DMRS pattern manager 1730 may select, based on the reference signal configuration of the sTTI, a DMRS mapping pattern from a set of DMRS mapping patterns for mapping DMRS data to REs within the sTTI. The set of DMRS mapping patterns may include patterns A1, B1, C1, D1, E1, A2, B2, C2, D2 as described herein with reference to FIGS. 3-7 and 11-14, or any combination thereof. In some cases, DMRS pattern manager 1730 may select a DMRS mapping pattern based at least in part on an antenna port configuration for CRS (e.g., a number of CRS ports and associated number of layers configured for CRS, such as a one port CRS having a two-layer configuration, or a two port CRS having a four-layer configuration).

DMRS mapping component 1735 may configure REs within the sTTI according to the selected DMRS mapping pattern.

DMRS manager 1740 may transmit DMRS data on the configured REs.

Transmitter 1720 may transmit signals generated by other components of the device 1705. In some examples, transmitter 1720 may be collocated with receiver 1710 in a transceiver module. For example, transmitter 1720 may be an example of aspects of transceiver 1935 described with reference to FIG. 19. Transmitter 1720 may utilize a single antenna or a set of antennas.

Figure 18:
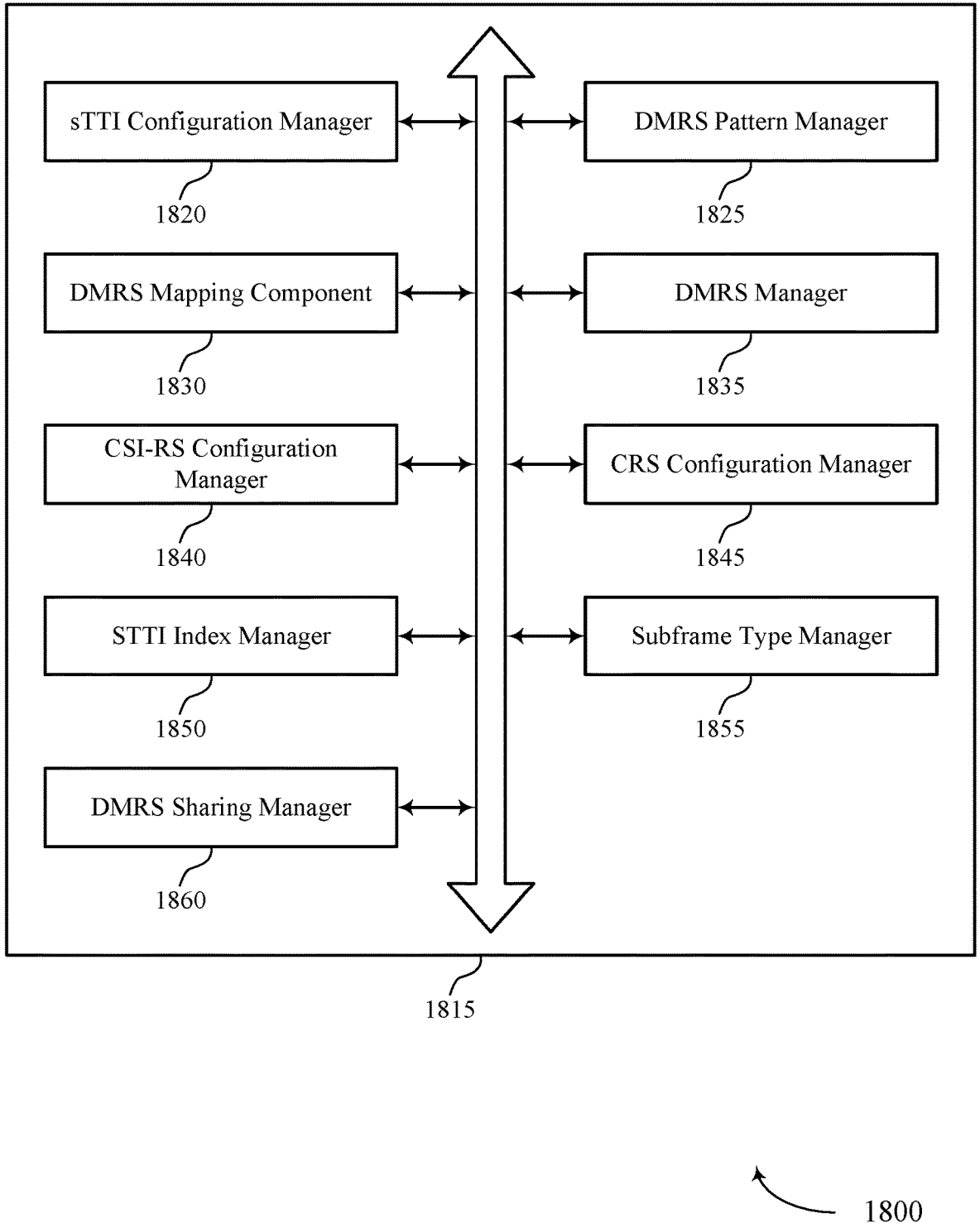

FIG. 18 shows a block diagram 1800 of base station communications manager 1815 that supports reference signal multiplexing in sTTIs in accordance with aspects of the present disclosure. Base station communications manager 1815 may be an example of aspects of base station communications manager 1615, 1715, or 1915 described with reference to FIGS. 16, 17, and 19. Base station communications manager 1815 may include sTTI configuration manager 1820, DMRS pattern manager 1825, DMRS mapping component 1830, DMRS manager 1835, CSI-RS configuration manager 1840, CRS configuration manager 1845, sTTI index manager 1850, subframe type manager 1855, and DMRS sharing manager 1860. Each of these modules may communicate, directly or indirectly, with one another (e.g., via one or more buses).

sTTI configuration manager 1820 may identify a reference signal configuration of an sTTI in a subframe, the reference signal configuration including at least one of a CSI-RS configuration or a CRS configuration. In some cases, the sTTI is two or three OFDM symbols, each OFDM symbol includes two RBs, and each RB includes twelve REs. In some cases, the sTTI is a slot, and the slot includes seven OFDM symbols that each include twelve REs.

DMRS pattern manager 1825 may select, based on the reference signal configuration of the sTTI, a DMRS mapping pattern from a set of DMRS mapping patterns for mapping DMRS data to REs within the sTTI. The set of DMRS mapping patterns may include patterns A1, B1, C1, D1, E1, A2, B2, C2, D2 as described herein with reference to FIGS. 3-7 and 11-14, or any combination thereof. In some cases, DMRS pattern manager 1825 may select a DMRS mapping pattern based at least in part on an antenna port configuration for CRS (e.g., a number of CRS ports and associated number of layers configured for CRS, such as a one port CRS having a two-layer configuration, or a two port CRS having a four-layer configuration).

In some cases, the sTTI includes two or three OFDM symbols, and pattern A1 may include mapping DMRS data for a first antenna port pair to a second-lowest-frequency RE and a ninth-lowest-frequency RE within a first RB of an OFDM symbol and to a fourth-lowest-frequency RE and an eleventh-lowest-frequency RE within a second RB of the OFDM symbol and mapping DMRS data for a second antenna port pair to a lowest-frequency RE and an eighth-lowest-frequency RE within the first RB of the OFDM symbol and to a third-lowest-frequency RE and a tenth-lowest-frequency RE within the second RB of the OFDM symbol. Pattern A1 may be selected as appropriate to avoid collisions with CRS data or CSI-RS data, including in scenarios as described herein, including scenarios corresponding to claims 3 through 6 below.

In some cases, the sTTI includes two or three OFDM symbols, and pattern B1 may include mapping DMRS data for a first antenna port pair to a third-lowest-frequency RE and a ninth-lowest-frequency RE within a first RB of an OFDM symbol and to a fifth-lowest-frequency RE and a twelfth-lowest-frequency RE within a second RB of the OFDM symbol and/or mapping DMRS data for a second antenna port pair being mapped to a second-lowest-frequency RE and an eighth-lowest-frequency RE within the first RB of the OFDM symbol and to a third-lowest-frequency RE and an eleventh-lowest-frequency RE within the second RB of the OFDM symbol. Pattern B1 may be selected as appropriate to avoid collisions with CRS data or CSI-RS data, including in scenarios as described herein, including scenarios corresponding to claims 8 through 14 below.

In some cases, the sTTI includes two or three OFDM symbols, and pattern C1 may include mapping DMRS data for a first antenna port pair to a third-lowest-frequency RE and a ninth-lowest-frequency RE within a first RB of an OFDM symbol and to a fourth-lowest-frequency RE and a twelfth-lowest-frequency RE within a second RB of the OFDM symbol and/or mapping DMRS data for a second antenna port pair to a lowest-frequency RE and a seventh-lowest-frequency RE within the first RB of the OFDM symbol and to a third-lowest-frequency RE and a tenth-lowest-frequency RE within the second RB of the OFDM symbol. Pattern C1 may be selected as appropriate to avoid collisions with CRS data or CSI-RS data, including in scenarios as described herein, including scenarios corresponding to claims 16 and 17 below.

In some cases, the sTTI includes two or three OFDM symbols, and pattern D1 may include mapping DMRS data for a first antenna port pair to a second-lowest-frequency RE and a tenth-lowest-frequency RE a first RB of an OFDM symbol and to a fourth-lowest-frequency RE and an eleventh-lowest-frequency RE within a second RB of the OFDM symbol and/or mapping DMRS data for a second antenna port pair being mapped to a lowest-frequency RE and an eighth-lowest-frequency RE within the first RB of the OFDM symbol and to a second-lowest-frequency RE and a tenth-lowest-frequency RE within the second RB of the OFDM symbol. Pattern D1 may be selected as appropriate to avoid collisions with CRS data or CSI-RS data, including in scenarios as described herein, including scenarios corresponding to claims 19 through 21 below.

In some cases, the sTTI includes two or three OFDM symbols, and pattern E1 may include mapping DMRS data for a first antenna port pair to a third-lowest-frequency RE and a ninth-lowest-frequency RE within a first RB of an OFDM symbol and to a sixth-lowest-frequency RE and a twelfth-lowest-frequency RE within a second RB of the OFDM symbol and/or mapping DMRS data for a second antenna port pair to a lowest-frequency RE and a seventh-lowest-frequency RE within the first RB of the OFDM symbol and to a third-lowest-frequency RE and a ninth-lowest-frequency RE within the second RB of the OFDM symbol. Pattern E1 may be selected as appropriate to avoid collisions with CRS data or CSI-RS data, including in scenarios as described herein, including scenarios corresponding to claim 23 below.

In some cases, the sTTI includes a slot of seven OFDM symbols, and pattern A2 may include mapping pattern is a baseline pattern. In some cases, the baseline pattern includes mapping DMRS data for a first antenna port pair to a second-lowest-frequency RE, a seventh-lowest-frequency RE, and a twelfth-lowest-frequency RE and/or mapping DMRS data for a second antenna port pair to a lowest-frequency RE, a sixth-lowest-frequency RE, and an eleventh-lowest-frequency RE. Pattern A2 may be selected as appropriate to avoid collisions with CRS data or CSI-RS data, including in scenarios as described herein, including scenarios corresponding to claim 29 below.

In some cases, the sTTI includes a slot of seven OFDM symbols, and pattern B2 may include mapping DMRS data for a first antenna port pair to a third-lowest-frequency RE, an eighth-lowest-frequency RE, and a twelfth-lowest-frequency RE and/or mapping data for a second antenna port pair to a second-lowest-frequency RE, a sixth-lowest-frequency RE, and an eleventh-lowest-frequency RE. Pattern B2 may be selected as appropriate to avoid collisions with CRS data or CSI-RS data, including in scenarios as described herein, including scenarios corresponding to claims 30 and 31 below.

In some cases, the sTTI includes a slot of seven OFDM symbols, and pattern C2 may include mapping DMRS data for a first antenna port pair to a third-lowest-frequency RE, a seventh-lowest-frequency RE, and a twelfth-lowest-frequency RE and/or mapping DMRS data for a second antenna port pair to a lowest-frequency RE, a sixth-lowest-frequency RE, and a tenth-lowest-frequency RE. Pattern C2 may be selected as appropriate to avoid collisions with CRS data or CSI-RS data, including in scenarios as described herein, including scenarios corresponding to claims 33 and 34 below.

In some cases, the sTTI includes a slot of seven OFDM symbols, and pattern D2 may include mapping DMRS data for a first antenna port pair to a second-lowest-frequency RE, a seventh-lowest-frequency RE, and an eleventh-lowest-frequency RE and/or mapping DMRS data for a second antenna port pair to a lowest-frequency RE, a fifth-lowest-frequency RE, and a tenth-lowest-frequency RE. Pattern C2 may be selected as appropriate to avoid collisions with CRS data or CSI-RS data, including in scenarios as described herein, including scenarios corresponding to claims 36 and 37 below.

DMRS mapping component 1830 may configure REs within the sTTI according to the selected DMRS mapping pattern.

DMRS manager 1835 may transmit DMRS data on the configured REs.

CSI-RS configuration manager 1840 may identify the CSI-RS configuration for a subframe or an sTTI as lacking CSI-RS data or as including CSI-RS data, and may identify the CSI-RS configuration as including CSI-RS data a given number of antenna ports.

CRS configuration manager 1845 may identify the CRS configuration for a subframe or an sTTI as lacking CRS data, as a shift0 CRS configuration, as a shift1 configuration, or as a shift2 configuration.

sTTI index manager 1850 may identify an index of the sTTI within the subframe or a slot of the subframe.

Subframe type manager 1855 may identify the subframe as a an MBSFN subframe, as not an MBSFN subframe, or otherwise identify a type of the subframe.

DMRS sharing manager 1860 may configure the sTTI to use DMRS sharing, and thus, to not to include DMRS data.

Figure 19:
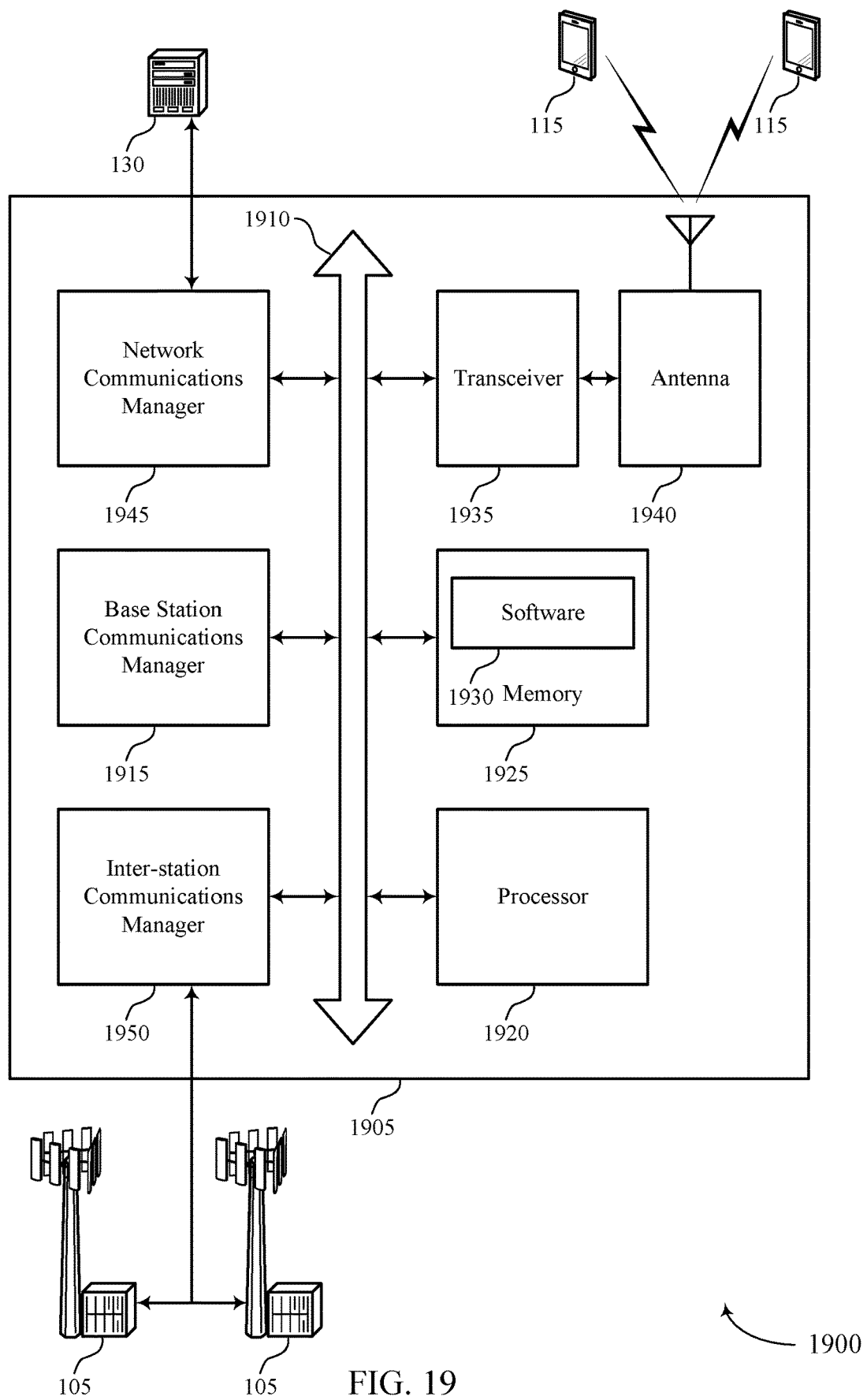
FIG. 19 illustrates a block diagram of a system including a base station that supports reference signal multiplexing in sTTIs in accordance with aspects of the present disclosure.

FIG. 19 shows a diagram of a system 1900 including a device 1905 that supports reference signal multiplexing in sTTIs in accordance with aspects of the present disclosure. Device 1905 may be an example of or include the components of wireless device 1605, wireless device 1705, or a base station 105 as described above, e.g., with reference to FIGS. 16 and 17. Device 1905 may include components for bi-directional voice and data communications including components for transmitting and receiving communications, including base station communications manager 1915, processor 1920, memory 1925, software 1930, transceiver 1935, antenna 1940, network communications manager 1945, and inter-station communications manager 1950. These components may be in electronic communication via one or more buses (e.g., bus 1910). Device 1905 may communicate wirelessly with one or more UEs 115.

Processor 1920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g., functions or tasks supporting reference signal multiplexing in sTTIs).

Memory 1925 may include random access memory (RAM) and read only memory (ROM). Memory 1925 may store computer-readable, computer-executable software 1930 including instructions that, when executed, cause the processor to perform various functions described herein. In some cases, memory 1925 may contain, among other things, a basic input/output system (BIOS) which may control basic hardware or software operation such as the interaction with peripheral components or devices.

Software 1930 may include code to implement aspects of the present disclosure, including code to support reference signal multiplexing in sTTIs. Software 1930 may be stored in a non-transitory computer-readable medium such as system memory or other memory. In some cases, software 1930 may not be directly executable by the processor but may cause a computer (e.g., when compiled and executed) to perform functions described herein.

Transceiver 1935 may communicate bi-directionally, via one or more antennas, wired, or wireless links as described above. For example, transceiver 1935 may represent a wireless transceiver and may communicate bi-directionally with another wireless transceiver. Transceiver 1935 may also include a modem to modulate the packets and provide the modulated packets to the antennas for transmission, and to demodulate packets received from the antennas.

In some cases, the wireless device 1905 may include a single antenna 1940. However, in some cases the device 1905 may have more than one antenna 1940, which may be capable of concurrently transmitting or receiving multiple wireless transmissions.

Network communications manager 1945 may manage communications with the core network (e.g., via one or more wired backhaul links). For example, the network communications manager 1945 may manage the transfer of data communications for client devices, such as one or more UEs 115.

Inter-station communications manager 1950 may manage communications with other base station 105, and may include a controller or scheduler for controlling communications with UEs 115 in cooperation with other base stations 105. For example, the inter-station communications manager 1950 may coordinate scheduling for transmissions to UEs 115 for various interference mitigation techniques such as beamforming or joint transmission. In some examples, inter-station communications manager 1950 may provide an X2 interface within an Long Term Evolution (LTE)/LTE-A wireless communication network technology to provide communication between base stations 105.

Figure 20:
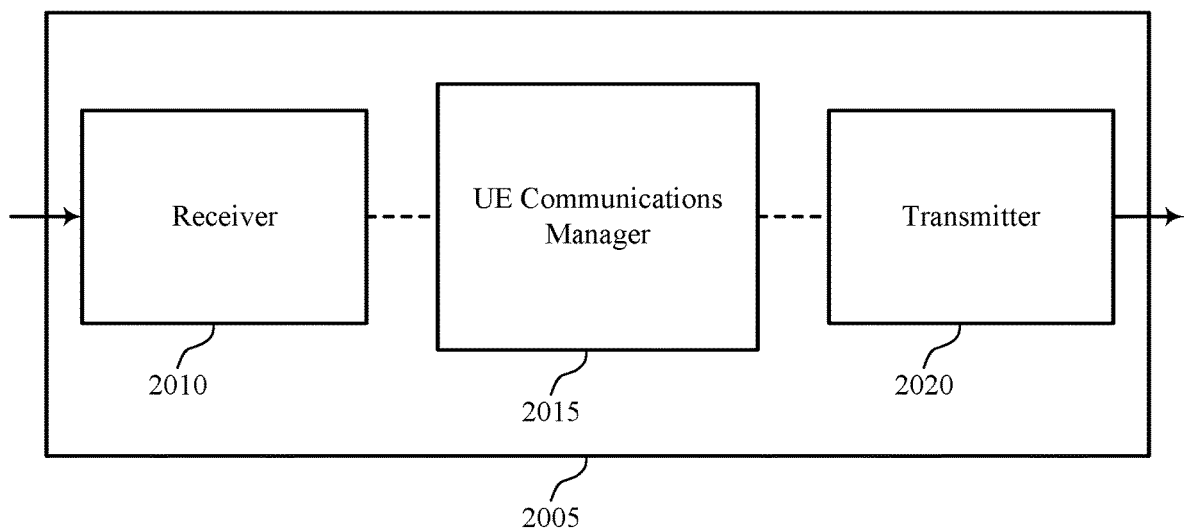
FIGS. 20 through 22 show block diagrams of a device that supports reference signal multiplexing in sTTIs in accordance with aspects of the present disclosure.

FIG. 20 shows a block diagram 2000 of a wireless device 2005 that supports reference signal multiplexing in sTTIs in accordance with aspects of the present disclosure. Wireless device 2005 may be an example of aspects of a UE 115 as described herein. Wireless device 2005 may include receiver 2010, UE communications manager 2015, and transmitter 2020. Wireless device 2005 may also include a processor. Each of these components may be in communication with one another (e.g., via one or more buses).

Receiver 2010 may receive information such as packets, user data, or control information associated with various information channels (e.g., control channels, data channels, and information related to reference signal multiplexing in sTTIs, etc.). Information may be passed on to other components of the device. Receiver 2010 may be an example of aspects of the transceiver 2335 described with reference to FIG. 23. Receiver 2010 may utilize a single antenna or a set of antennas.

UE communications manager 2015 may be an example of aspects of UE communications manager 2315 described with reference to FIG. 23.

UE communications manager 2015 and/or at least some of its various sub-components may be implemented in hardware, software executed by a processor, firmware, or any combination thereof. If implemented in software executed by a processor, the functions of UE communications manager 2015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. UE communications manager 2015 and/or at least some of its various sub-components may be physically located at various positions, including being distributed such that portions of functions are implemented at different physical locations by one or more physical devices. In some examples, UE communications manager 2015 and/or at least some of its various sub-components may be a separate and distinct component in accordance with various aspects of the present disclosure. In other examples, UE communications manager 2015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 2015 may identify a reference signal configuration of an sTTI in a subframe, the reference signal configuration including at least one of a CSI-RS configuration or a CRS configuration, select, based on the reference signal configuration of the sTTI, a DMRS mapping pattern from a set of DMRS mapping patterns, determine, based on the selected mapping pattern, one or more REs within the sTTI to monitor for DMRS data, and monitor the one or more REs for DMRS data.

Transmitter 2020 may transmit signals generated by other components of the device. In some examples, transmitter 2020 may be collocated with receiver 2010 in a transceiver module. For example, transmitter 2020 may be an example of aspects of the transceiver 2335 described with reference to FIG. 23. Transmitter 2020 may utilize a single antenna or a set of antennas.

Figure 21:
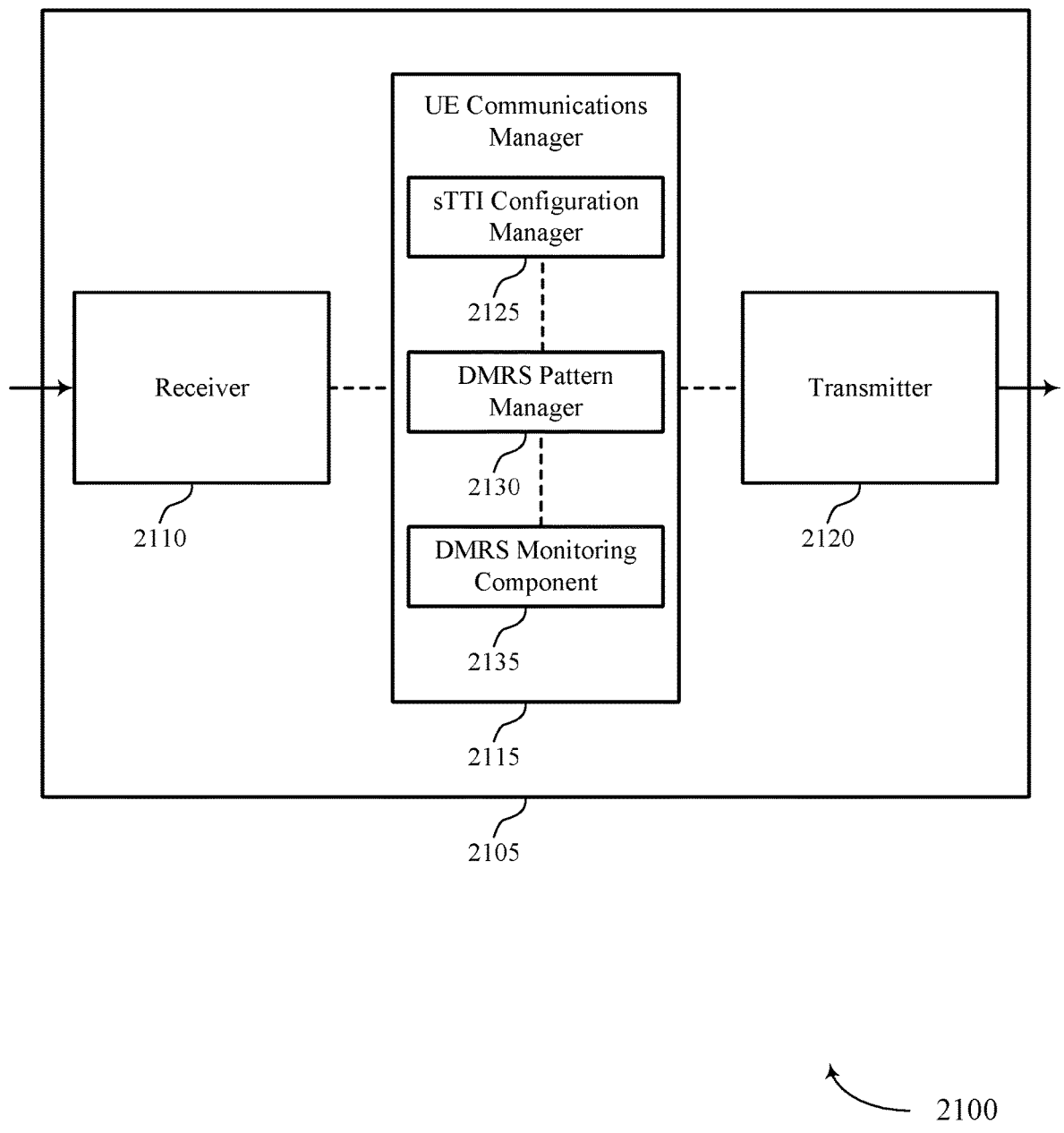

FIG. 21 shows a block diagram 2100 of a wireless device 2105 that supports reference signal multiplexing in sTTIs in accordance with aspects of the present disclosure. Wireless device 2105 may be an example of aspects of a wireless device 2005 or a UE 115 as described with reference to FIG. 20. Wireless device 2105 may include receiver 2110, UE communications manager 2115, and transmitter 2120. Wireless device 2105 may also include a processor. Each of these components may be in communication with one another (e.g., via one or more buses).

Receiver 2110 may receive information such as packets, user data, or control information associated with various information channels (e.g., control channels, data channels, and information related to reference signal multiplexing in sTTIs, etc.). Information may be passed on to other components of the device. Receiver 2110 may be an example of aspects of the transceiver 2335 described with reference to FIG. 23. Receiver 2110 may utilize a single antenna or a set of antennas.

UE communications manager 2115 may be an example of aspects of UE communications manager 2315 described with reference to FIG. 23. UE communications manager 2115 may also include sTTI configuration manager 2125, DMRS pattern manager 2130, and DMRS monitoring component 2135.

sTTI configuration manager 2125 may identify a reference signal configuration of an sTTI in a subframe, the reference signal configuration including at least one of a CSI-RS configuration or a CRS configuration. In some cases, sTTI configuration manager 2125 may identify the CSI-RS configuration based at least in part on whether the subframe includes CSI-RS data. In some cases, sTTI configuration manager 2125 may identify the CRS configuration based at least in part on a CRS shift for a cell corresponding to the subframe. In some cases, sTTI configuration manager 2125 may identify whether the subframe includes a multicast-broadcast single-frequency network (MBSFN) subframe, In some cases, sTTI configuration manager 2125 may identify a quantity of symbols included in the sTTI. In some cases, sTTI configuration manager 2125 may identify an index of the sTTI or of a symbol included in the sTTI.

DMRS pattern manager 2130 may select, based on the reference signal configuration of the sTTI, a DMRS mapping pattern from a set of DMRS mapping patterns. The set of DMRS mapping patterns may include patterns A1, B1, C1, D1, E1, A2, B2, C2, D2 as described herein with reference to FIGS. 3-7 and 11-14, or any combination thereof. In some cases, DMRS pattern manager 2130 may select a DMRS mapping pattern based at least in part on an antenna port configuration for CRS (e.g., a number of CRS ports and associated number of layers configured for CRS, such as a one port CRS having a two-layer configuration, or a two port CRS having a four-layer configuration) received via, for example, RRC signaling. In some cases, DMRS pattern manager 2130 may select the DMRS mapping pattern based at least in part on whether the subframe includes an MBSFN subframe. In some cases, DMRS mapping manager 2135 may select the DMRS mapping pattern based at least in part on the quantity of symbols included in the sTTI. In some cases, DMRS mapping manager 2135 may select the DMRS mapping pattern based at least in part on the index of the sTTI or of a symbol included in the sTTI.

DMRS monitoring component 2135 may monitor the one or more REs for DMRS data.

Transmitter 2120 may transmit signals generated by other components of the device. In some examples, the transmitter 2120 may be collocated with receiver 2110 in a transceiver module. For example, transmitter 2120 may be an example of aspects of transceiver 2335 described with reference to FIG. 23. Transmitter 2120 may utilize a single antenna or a set of antennas.

Figure 22:
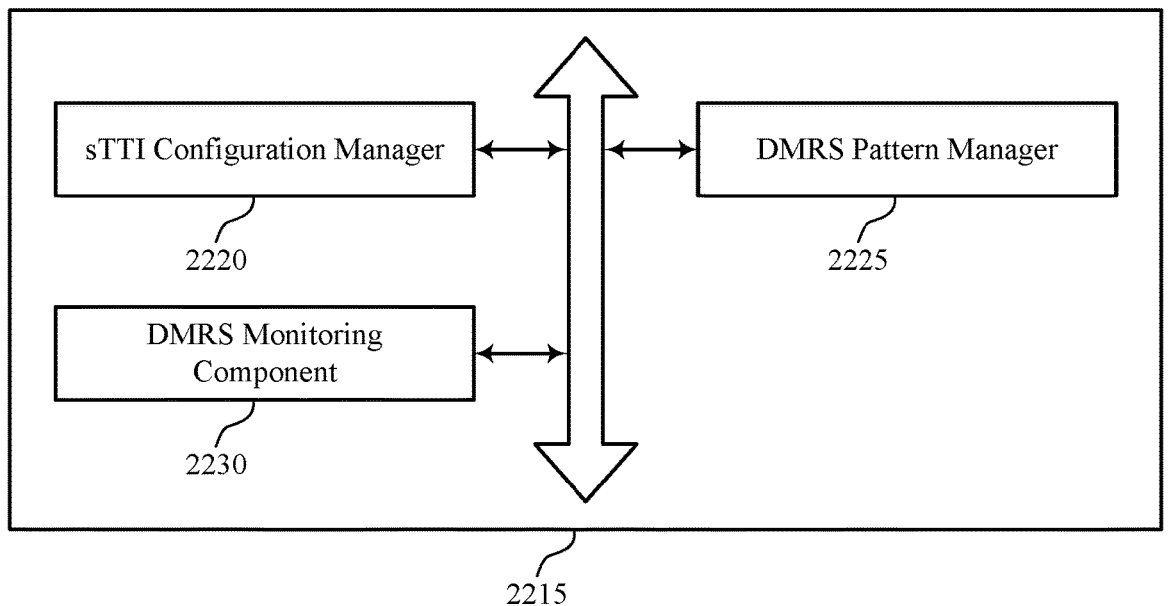

FIG. 22 shows a block diagram 2200 of a UE communications manager 2215 that supports reference signal multiplexing in sTTIs in accordance with aspects of the present disclosure. UE communications manager 2215 may be an example of aspects of UE communications manager 2015, 2115, and 2315 described with reference to FIGS. 20, 21, and 23. UE communications manager 2215 may include sTTI configuration manager 2220, DMRS pattern manager 2225, and DMRS monitoring component 2230. Each of these modules may communicate, directly or indirectly, with one another (e.g., via one or more buses).

sTTI configuration manager 2220 may identify a reference signal configuration of an sTTI in a subframe, the reference signal configuration including at least one of a CSI-RS configuration or a CRS configuration. In some cases, sTTI configuration manager 2220 may identify the CSI-RS configuration based at least in part on whether the subframe includes CSI-RS data. In some cases, sTTI configuration manager 2220 may identify the CRS configuration based at least in part on a CRS shift for a cell corresponding to the subframe. In some cases, sTTI configuration manager 2220 may identify whether the subframe includes a multicast-broadcast single-frequency network (MBSFN) subframe, In some cases, sTTI configuration manager 2220 may identify a quantity of symbols included in the sTTI. In some cases, sTTI configuration manager 2220 may identify an index of the sTTI or of a symbol included in the sTTI.

DMRS pattern manager 2225 may select, based on the reference signal configuration of the sTTI, a DMRS mapping pattern from a set of DMRS mapping patterns. The set of DMRS mapping patterns may include patterns A1, B1, C1, D1, E1, A2, B2, C2, D2 as described herein with reference to FIGS. 3-7 and 11-14, or any combination thereof. In some cases, DMRS pattern manager 2225 may select a DMRS mapping pattern based at least in part on an antenna port configuration for CRS (e.g., a number of CRS ports and associated number of layers configured for CRS, such as a one port CRS having a two-layer configuration, or a two port CRS having a four-layer configuration) received via, for example, RRC signaling. In some cases, DMRS pattern manager 2225 may select the DMRS mapping pattern based at least in part on whether the subframe includes an MBSFN subframe. In some cases, DMRS mapping manager 2135 may select the DMRS mapping pattern based at least in part on the quantity of symbols included in the sTTI. In some cases, DMRS mapping manager 2135 may select the DMRS mapping pattern based at least in part on the index of the sTTI or of a symbol included in the sTTI.

DMRS monitoring component 2230 may monitor the one or more REs for DMRS data.

Figure 23:
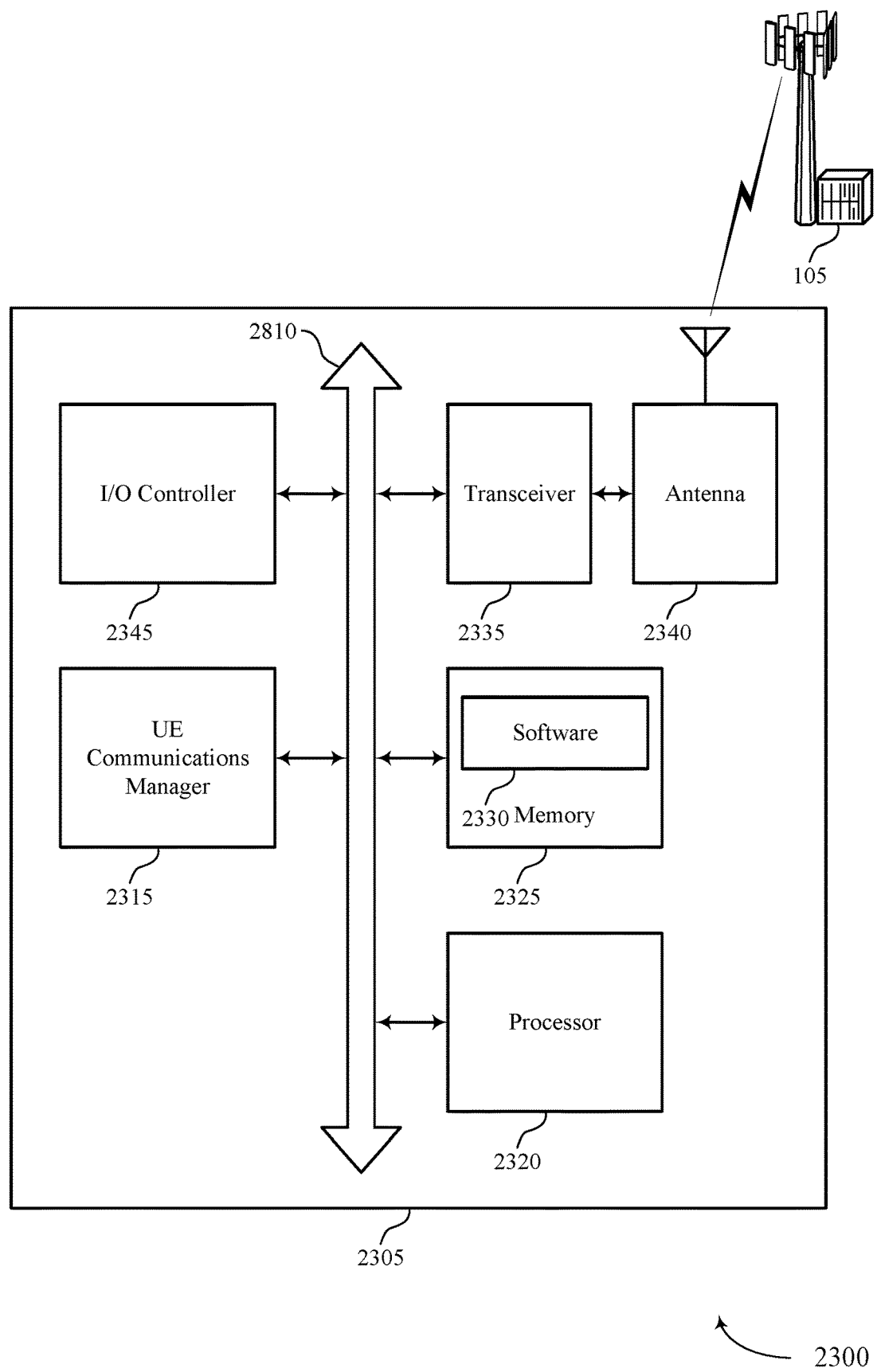
FIG. 23 illustrates a block diagram of a system including a user equipment (UE) that supports reference signal multiplexing in sTTIs in accordance with aspects of the present disclosure.

FIG. 23 shows a diagram of a system 2300 including a device 2305 that supports reference signal multiplexing in sTTIs in accordance with aspects of the present disclosure. Device 2305 may be an example of or include the components of UE 115 as described above, e.g., with reference to FIG. 1. Device 2305 may include components for bi-directional voice and data communications including components for transmitting and receiving communications, including UE communications manager 2315, processor 2320, memory 2325, software 2330, transceiver 2335, antenna 2340, and I/O controller 2345. These components may be in electronic communication via one or more buses (e.g., bus 2310). Device 2305 may communicate wirelessly with one or more base stations 105.

Processor 2320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2320 may be configured to operate a memory array using a memory controller. In other cases, a memory controller may be integrated into processor 2320. Processor 2320 may be configured to execute computer-readable instructions stored in a memory to perform various functions (e.g., functions or tasks supporting reference signal multiplexing in sTTIs).

Memory 2325 may include RAM and ROM. Memory 2325 may store computer-readable, computer-executable software 2330 including instructions that, when executed, cause the processor to perform various functions described herein. In some cases, memory 2325 may contain, among other things, a BIOS which may control basic hardware or software operation such as the interaction with peripheral components or devices.

Software 2330 may include code to implement aspects of the present disclosure, including code to support reference signal multiplexing in sTTIs. Software 2330 may be stored in a non-transitory computer-readable medium such as system memory or other memory. In some cases, software 2330 may not be directly executable by the processor but may cause a computer (e.g., when compiled and executed) to perform functions described herein.

Transceiver 2335 may communicate bi-directionally, via one or more antennas, wired, or wireless links as described above. For example, transceiver 2335 may represent a wireless transceiver and may communicate bi-directionally with another wireless transceiver. Transceiver 2335 may also include a modem to modulate the packets and provide the modulated packets to the antennas for transmission, and to demodulate packets received from the antennas.

In some cases, the wireless device 2305 may include a single antenna 2340. However, in some cases the device 2305 may have more than one antenna 2340, which may be capable of concurrently transmitting or receiving multiple wireless transmissions.

I/O controller 2345 may manage input and output signals for device 2305. I/O controller 2345 may also manage peripherals not integrated into device 2305. In some cases, I/O controller 2345 may represent a physical connection or port to an external peripheral. In some cases, I/O controller 2345 may utilize an operating system such as iOS®, ANDROID®, MS-DOS®, MS-WINDOWS®, OS/2®, UNIX®, LINUX®, or another known operating system. In other cases, I/O controller 2345 may represent or interact with a modem, a keyboard, a mouse, a touchscreen, or a similar device. In some cases, I/O controller 2345 may be implemented as part of a processor. In some cases, a user may interact with device 2305 via I/O controller 2345 or via hardware components controlled by I/O controller 2345.

Figure 24:
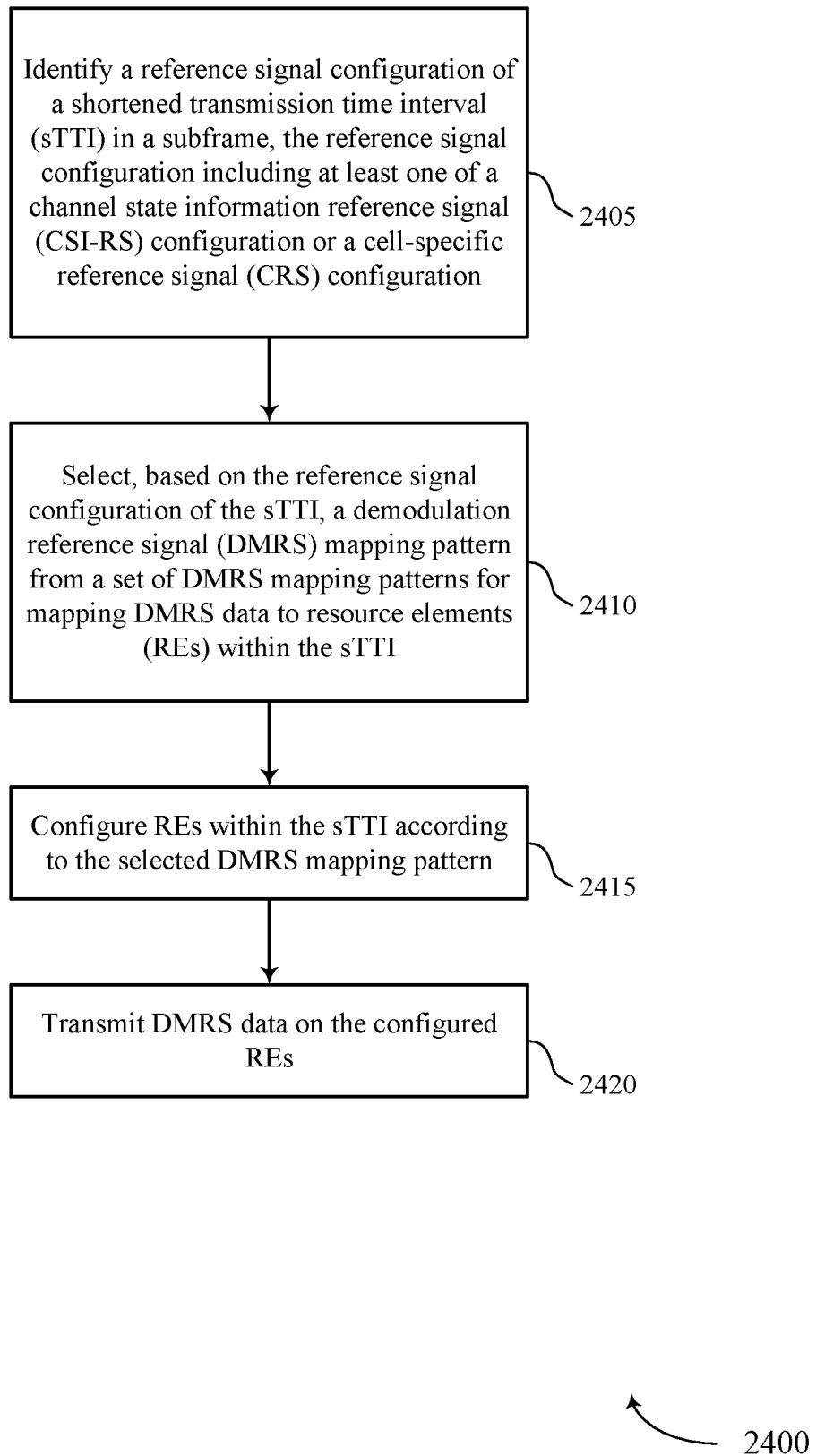
FIGS. 24 through 25 illustrate methods for reference signal multiplexing in sTTIs in accordance with aspects of the present disclosure.

FIG. 24 shows a flowchart illustrating a method 2400 for reference signal multiplexing in sTTIs in accordance with aspects of the present disclosure. The operations of method 2400 may be implemented by a base station 105 or its components as described herein. For example, the operations of method 2400 may be performed by base station communications manager 1615, 1715, 1815, and 1915 as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At 2405, the base station 105 may identify a reference signal configuration of an sTTI in a subframe, the reference signal configuration including at least one of a CSI-RS configuration or a CRS configuration. The operations of 2405 may be performed according to the methods described herein. In certain examples, aspects of the operations of 2405 may be performed by sTTI configuration manager 1615, 1725, 1820, and 1915 as described with reference to FIGS. 16 through 19.

At 2410, the base station 105 may select, based at least in part on the reference signal configuration of the sTTI, a DMRS mapping pattern from a plurality of DMRS mapping patterns for mapping DMRS data to REs within the sTTI. The operations of 2410 may be performed according to the methods described herein. In certain examples, aspects of the operations of 2410 may be performed by DMRS pattern manager 1615, 1730, 1825, and 1915 as described with reference to FIGS. 16 through 19.

At 2415, the base station 105 may configure REs within the sTTI according to the selected DMRS mapping pattern. The operations of 2415 may be performed according to the methods described herein. In certain examples, aspects of the operations of 2415 may be performed by DMRS mapping component 1615, 1735, 1830, and 1915 as described with reference to FIGS. 16 through 19.

At 2420, the base station 105 may transmit DMRS data on the configured REs. The operations of 2420 may be performed according to the methods described herein. In certain examples, aspects of the operations of 2420 may be performed by DMRS manager 1615, 1740, 1835, and 1915 as described with reference to FIGS. 16 through 19.

Figure 25:
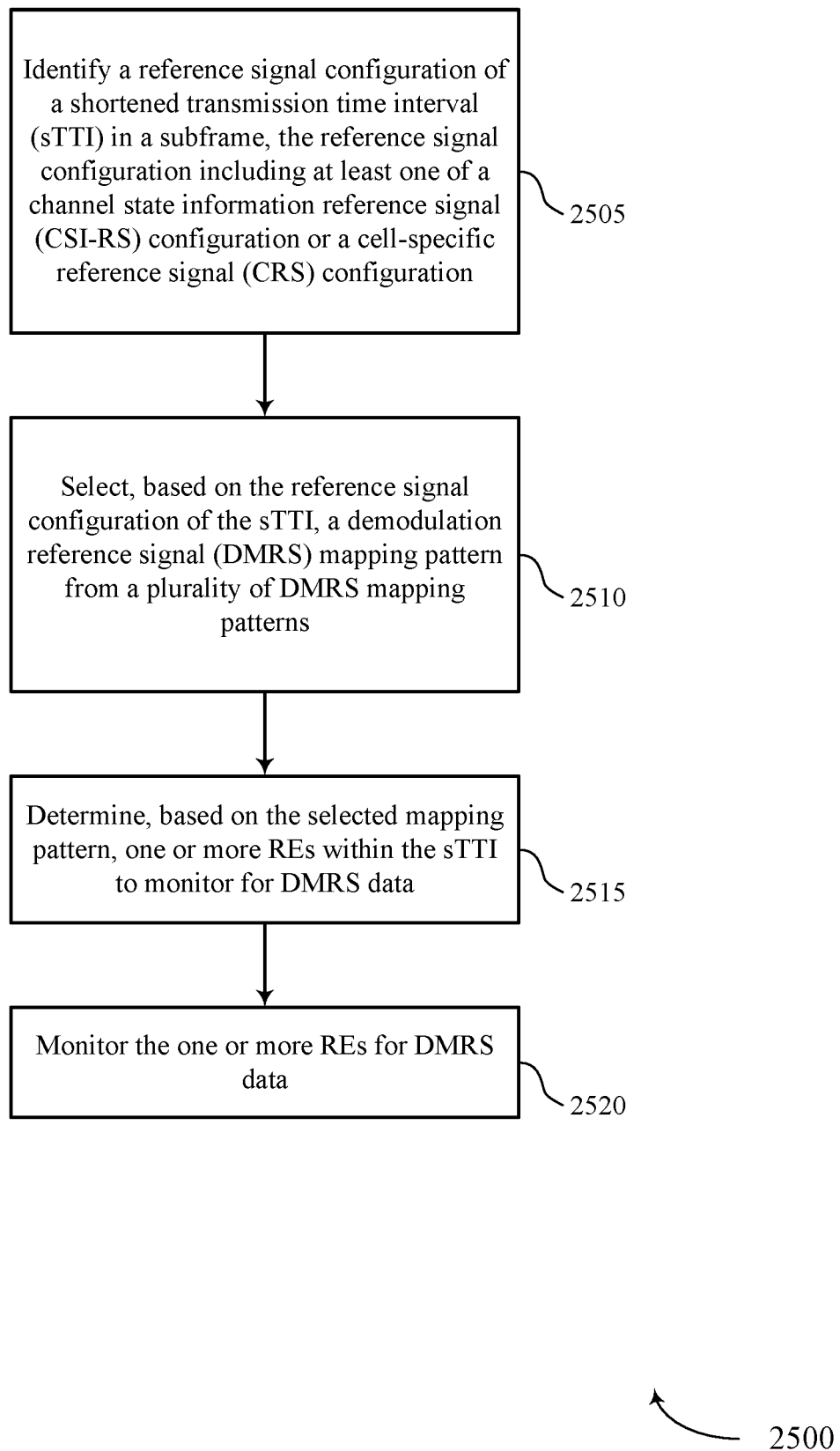

FIG. 25 shows a flowchart illustrating a method 2500 for reference signal multiplexing in sTTIs in accordance with aspects of the present disclosure. The operations of method 2500 may be implemented by a base station 105 or its components as described herein. For example, the operations of method 2500 may be performed by a base station communications manager as described with reference to FIGS. 16 through 19. In some examples, a base station 105 may execute a set of codes to control the functional elements of the device to perform the functions described below. Additionally or alternatively, the base station 105 may perform aspects of the functions described below using special-purpose hardware.

At 2505, the base station 105 may identify a reference signal configuration of an sTTI in a subframe, the reference signal configuration including at least one of a CSI-RS configuration or a CRS configuration. The operations of 2505 may be performed according to the methods described herein. In certain examples, aspects of the operations of 2505 may be performed by a sTTI configuration manager 1615, 1725, 1820, and 1915 as described with reference to FIGS. 16 through 19.

At 2510, the base station 105 may select, based at least in part on the reference signal configuration of the sTTI, a DMRS mapping pattern from a plurality of DMRS mapping patterns. The operations of 2510 may be performed according to the methods described herein. In certain examples, aspects of the operations of 2510 may be performed by DMRS pattern manager 1615, 1730, 1825, and 1915 as described with reference to FIGS. 16 through 19.

At 2515, the base station 105 may configure REs within the sTTI according to the selected DMRS mapping pattern. The operations of 2515 may be performed according to the methods described herein. In certain examples, aspects of the operations of 2515 may be performed by a DMRS mapping component 1615, 1735, 1830, and 1915 as described with reference to FIGS. 16 through 19.

At 2520, the base station 105 may transmit the configured REs. The operations of 2520 may be performed according to the methods described herein. In certain examples, aspects of the operations of 2520 may be performed by DMRS manager 1615, 1740, 1835, and 1915 as described with reference to FIGS. 16 through 19.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying a reference signal configuration of a shortened transmission time interval (sTTI) in a subframe, the reference signal configuration including at least one of a channel state information reference signal (CSI-RS) configuration or a cell-specific reference signal (CRS) configuration;
    selecting, based at least in part on the reference signal configuration of the sTTI, a demodulation reference signal (DMRS) mapping pattern from a plurality of DMRS mapping patterns for mapping DMRS data to resource elements (REs) within the sTTI, wherein the selecting comprises:
        selecting a first DMRS mapping pattern to be applied to the sTTI, wherein the first DMRS mapping pattern comprises DMRS data for a first antenna port pair being mapped to a second-lowest-frequency RE and a ninth-lowest-frequency RE within a first resource block (RB) of an OFDM symbol and to a fourth-lowest-frequency RE and an eleventh-lowest-frequency RE within a second RB of the OFDM symbol, and wherein the sTTI comprises two or three OFDM symbols; or
        selecting a second DMRS mapping pattern to be applied to the sTTI, wherein the second DMRS mapping pattern comprises the DMRS data for the first antenna port pair being mapped to a third-lowest-frequency RE and the ninth-lowest-frequency RE within the first RB of the OFDM symbol and to a fifth-lowest-frequency RE and a twelfth-lowest-frequency RE within the second RB of the OFDM symbol, and wherein the sTTI comprises two or three OFDM symbols; or
        selecting a third DMRS mapping pattern to be applied to the sTTI, wherein the third DMRS mapping pattern comprises the DMRS data for the first antenna port pair being mapped to the third-lowest-frequency RE and the ninth-lowest-frequency RE within the first RB of the OFDM symbol and to the fourth-lowest-frequency RE and the twelfth-lowest-frequency RE within the second RB of the OFDM symbol, and wherein the sTTI comprises two or three OFDM symbols; or
        selecting a fourth DMRS mapping pattern to be applied to the sTTI, wherein the fourth DMRS mapping pattern comprises the DMRS data for the first antenna port pair being mapped to the second-lowest-frequency RE and a tenth-lowest-frequency RE the first RB of the OFDM symbol and to the fourth-lowest-frequency RE and the eleventh-lowest-frequency RE within the second RB of the OFDM symbol, and wherein the sTTI comprises two or three OFDM symbols; or selecting a fifth DMRS mapping pattern to be applied to the sTTI, wherein the fifth DMRS mapping pattern comprises the DMRS data for the first antenna port pair being mapped to the third-lowest-frequency RE and the ninth-lowest-frequency RE within the first RB of the OFDM symbol and to a sixth-lowest-frequency RE and the twelfth-lowest-frequency RE within the second RB of the OFDM symbol, and wherein the sTTI comprises two or three OFDM symbols; or selecting a sixth DMRS mapping pattern to be applied to the sTTI, wherein the sixth DMRS mapping pattern comprises the DMRS data for the first antenna port pair being mapped to the second-lowest-frequency RE, a seventh-lowest-frequency RE, and the twelfth-lowest-frequency RE, and wherein the sTTI comprises a slot of seven OFDM symbols; or selecting a seventh DMRS mapping pattern to be applied to the sTTI, wherein the seventh DMRS mapping pattern comprises the DMRS data for the first antenna port pair being mapped to the third-lowest-frequency RE, an eighth-lowest-frequency RE, and the twelfth-lowest-frequency RE, and wherein the sTTI comprises the slot of seven OFDM symbols; or selecting an eighth DMRS mapping pattern to be applied to the sTTI, wherein the eighth DMRS mapping pattern comprises the DMRS data for the first antenna port pair being mapped to the third-lowest-frequency RE, the seventh-lowest-frequency RE, and the twelfth-lowest-frequency RE, and wherein the sTTI comprises the slot of seven OFDM symbols; or selecting a ninth DMRS mapping pattern to be applied to the sTTI, wherein the ninth DMRS mapping pattern comprises the DMRS data for the first antenna port pair being mapped to the second-lowest-frequency RE, the seventh-lowest-frequency RE, and the eleventh-lowest-frequency RE, and wherein the sTTI comprises the slot of seven OFDM symbols;

configuring REs within the sTTI according to the selected DMRS mapping pattern; and transmitting the DMRS data on the configured REs.

2. The method of claim 1, wherein the first DMRS mapping pattern further comprises:
DMRS data for a second antenna port pair being mapped to a lowest-frequency RE and the eighth-lowest-frequency RE within the first RB of the OFDM symbol and to the third-lowest-frequency RE and the tenth-lowest-frequency RE within the second RB of the OFDM symbol.

3. The method of claim 1, further comprising:
identifying the CSI-RS configuration as lacking CSI-RS data; and
identifying the CRS configuration as lacking CRS data.

4. The method of claim 3, wherein identifying the CRS configuration as lacking CRS data comprises:
identifying the sTTI as a temporally third or fifth sTTI within the subframe.

5. The method of claim 3, wherein identifying the CRS configuration as lacking CRS data comprises:

identifying the subframe as a multicast-broadcast single-frequency network (MBSFN) subframe.

6. The method of claim 1, further comprising:
identifying the sTTI as a temporally sixth sTTI within the subframe; and
mapping the DMRS data for the first antenna port pair or other DMRS data to a temporally second or third OFDM symbol within the sixth sTTI.

7. The method of claim 1, wherein the second DMRS mapping pattern further comprises:
DMRS data for a second antenna port pair being mapped to the second-lowest-frequency RE and the eighth-lowest-frequency RE within the first RB of the OFDM symbol and to the third-lowest-frequency RE and the eleventh-lowest-frequency RE within the second RB of the OFDM symbol.

8. The method of claim 1, further comprising:
identifying the CSI-RS configuration as lacking CSI-RS data; and
identifying the CRS configuration as a shift0 configuration.

9. The method of claim 1, further comprising:
identifying the CSI-RS configuration as comprising CSI-RS data;
identifying the CRS configuration as a shift0 configuration; and
identifying the sTTI as a temporally sixth sTTI within the subframe.

10. The method of claim 1, further comprising:
identifying the CSI-RS configuration as comprising CSI-RS data;
identifying the CRS configuration as a shift0 configuration; and
identifying the sTTI as a temporally first, second, or fourth sTTI within the subframe.

11. The method of claim 1, further comprising:
identifying the CSI-RS configuration as comprising CSI-RS data; and
identifying the CRS configuration as lacking CRS data.

12. The method of claim 11, wherein identifying the CRS configuration as lacking CRS data comprises:
identifying the sTTI as a temporally third or fifth sTTI within the subframe.

13. The method of claim 1, further comprising:
identifying the subframe as a multicast-broadcast single-frequency network (MBSFN) subframe; and
identifying the sTTI as a temporally third, fifth, or sixth sTTI within the subframe.

14. The method of claim 1, further comprising:
identifying the sTTI as a temporally sixth sTTI within the subframe; and
mapping the DMRS data to a temporally second or third OFDM symbol within the sixth sTTI.

15. The method of claim 1, wherein the third DMRS mapping pattern further comprises:
DMRS data for a second antenna port pair being mapped to a lowest-frequency RE and the seventh-lowest-frequency RE within the first RB of the OFDM symbol and to the third-lowest-frequency RE and the tenth-lowest-frequency RE within the second RB of the OFDM symbol.

16. The method of claim 1, further comprising:
identifying the CSI-RS configuration as comprising CSI-RS data;
identifying the CRS configuration as a shift1 configuration; and identifying the sTTI as a temporally first, second, or fourth sTTI within the subframe.

17. The method of claim 1, further comprising:
identifying the CSI-RS configuration as lacking CSI-RS data; and
identifying the CRS configuration as a shift1 configuration.

18. The method of claim 1, wherein the fourth DMRS mapping pattern further comprises:
DMRS data for a second antenna port pair being mapped to a lowest-frequency RE and the eighth-lowest-frequency RE within the first RB of the OFDM symbol and to the second-lowest-frequency RE and the tenth-lowest-frequency RE within the second RB of the OFDM symbol.

19. The method of claim 1, further comprising:
identifying the CSI-RS configuration as lacking CSI-RS data; and
identifying the CRS configuration as a shift2 configuration.

20. The method of claim 1, further comprising:
identifying the CSI-RS configuration as comprising CSI-RS data;
identifying the CRS configuration as a shift2 configuration; and
identifying the sTTI as a temporally sixth sTTI within the subframe.

21. The method of claim 1, further comprising:
identifying the CSI-RS configuration as comprising CSI-RS data;
identifying the CRS configuration as a shift2 configuration; and
identifying the sTTI as a temporally first, second, or fourth sTTI within the subframe.

22. The method of claim 1, wherein the fifth DMRS mapping pattern further comprises:
DMRS data for a second antenna port pair being mapped to a lowest-frequency RE and the seventh-lowest-frequency RE within the first RB of the OFDM symbol and to the third-lowest-frequency RE and the ninth-lowest-frequency RE within the second RB of the OFDM symbol.

23. The method of claim 1, further comprising:
identifying the CSI-RS configuration as comprising CSI-RS data;
identifying the CRS configuration as a shift1 configuration; and
identifying the sTTI as a temporally sixth sTTI within the subframe.

24. The method of claim 1, further comprising:
identifying the CSI-RS configuration as comprising CSI-RS data for more than twelve antenna ports; and
configuring the sTTI to include no DMRS data.

25. The method of claim 1, further comprising:
identifying the CSI-RS configuration as comprising CSI-RS data for twenty-four ports;
identifying the sTTI as a temporally fifth sTTI within the subframe; and
configuring the sTTI to include no DMRS data.

26. The method of claim 1, further comprising:
identifying the CSI-RS configuration as comprising CSI-RS data for thirty-two ports;
identifying the sTTI as a temporally third or fifth sTTI within the subframe; and
configuring the sTTI to include no DMRS data.

27. The method of claim 1, wherein the sixth DMRS mapping pattern further comprises:
DMRS data for a second antenna port pair being mapped to a lowest-frequency RE, the sixth-lowest-frequency RE, and the eleventh-lowest-frequency RE.

28. The method of claim 1, further comprising:
identifying the CSI-RS configuration as lacking CSI-RS data; and
identifying the sTTI as a temporally second slot of the subframe.

29. The method of claim 1, wherein the seventh DMRS mapping pattern further comprises:
DMRS data for a second antenna port pair being mapped to the second-lowest-frequency RE, the sixth-lowest-frequency RE, and the eleventh-lowest-frequency RE.

30. The method of claim 1, further comprising:
identifying the CRS configuration as a shift0 configuration; and
identifying the sTTI as a temporally first slot of the subframe.

31. The method of claim 1, further comprising:
identifying the CSI-RS configuration as comprising CSI-RS data;
identifying the CRS configuration as a shift0 configuration; and
identifying the sTTI as a temporally second slot of the subframe.

32. The method of claim 1, wherein the eighth DMRS mapping pattern further comprises:
DMRS data for a second antenna port pair being mapped to a lowest-frequency RE, the sixth-lowest-frequency RE, and the tenth-lowest-frequency RE.

33. The method of claim 1, further comprising:
identifying the CRS configuration as a shift1 configuration; and
identifying the sTTI as a temporally first slot of the subframe.

34. The method of claim 1, further comprising:
identifying the CSI-RS configuration as comprising CSI-RS data;
identifying the CRS configuration as a shift1 configuration; and
identifying the sTTI as a temporally second slot of the subframe.

35. The method of claim 1, wherein the ninth DMRS mapping pattern further comprises:
DMRS data for a second antenna port pair being mapped to a lowest-frequency RE, the fifth-lowest-frequency RE, and the tenth-lowest-frequency RE.

36. The method of claim 1, further comprising:
identifying the CRS configuration as a shift2 configuration; and
identifying the sTTI as a temporally first slot of the subframe.

37. The method of claim 1, further comprising:
identifying the CSI-RS configuration as comprising CSI-RS data;
identifying the CRS configuration as a shift2 configuration; and
identifying the sTTI as a temporally second slot of the subframe.

38. The method of claim 1, wherein:
the sTTI comprises two or three OFDM symbols;
each OFDM symbol comprises two resource blocks (RBs); and
each RB comprises twelve REs.

39. The method of claim 1, wherein:
the sTTI comprises a slot;
the slot comprises seven OFDM symbols; and
each OFDM symbol comprises twelve REs.

40. A method for wireless communication, comprising:

identifying a reference signal configuration of a shortened transmission time interval (sTTI) in a subframe, the reference signal configuration including at least one of a channel state information reference signal (CSI-RS) configuration or a cell-specific reference signal (CRS) configuration;

selecting, based at least in part on the reference signal configuration of the sTTI, a demodulation reference signal (DMRS) mapping pattern from a plurality of DMRS mapping patterns, wherein the selecting comprises:

selecting a first DMRS mapping pattern to be applied to the sTTI, wherein the first DMRS mapping pattern comprises DMRS data for a first antenna port pair being mapped to a second-lowest-frequency RE and a ninth-lowest-frequency RE within a first resource block (RB) of an OFDM symbol and to a fourth-lowest-frequency RE and an eleventh-lowest-frequency RE within a second RB of the OFDM symbol, and wherein the sTTI comprises two or three OFDM symbols; or selecting a second DMRS mapping pattern to be applied to the sTTI, wherein the second DMRS mapping pattern comprises the DMRS data for the first antenna port pair being mapped to a third-lowest-frequency RE and the ninth-lowest-frequency RE within the first RB of the OFDM symbol and to a fifth-lowest-frequency RE and a twelfth-lowest-frequency RE within the second RB of the OFDM symbol, and wherein the sTTI comprises two or three OFDM symbols; or selecting a third DMRS mapping pattern to be applied to the sTTI, wherein the third DMRS mapping pattern comprises the DMRS data for the first antenna port pair being mapped to the third-lowest-frequency RE and the ninth-lowest-frequency RE within the first RB of the OFDM symbol and to the fourth-lowest-frequency RE and the twelfth-lowest-frequency RE within the second RB of the OFDM symbol, and wherein the sTTI comprises two or three OFDM symbols; or selecting a fourth DMRS mapping pattern to be applied to the sTTI, wherein the fourth DMRS mapping pattern comprises the DMRS data for the first antenna port pair being mapped to the second-lowest-frequency RE and a tenth-lowest-frequency RE the first RB of the OFDM symbol and to the fourth-lowest-frequency RE and the eleventh-lowest-frequency RE within the second RB of the OFDM symbol, and wherein the sTTI comprises two or three OFDM symbols; or selecting a fifth DMRS mapping pattern to be applied to the sTTI, wherein the fifth DMRS mapping pattern comprises the DMRS data for the first antenna port pair being mapped to the third-lowest-frequency RE and the ninth-lowest-frequency RE within the first RB of the OFDM symbol and to a sixth-lowest-frequency RE and the twelfth-lowest-frequency RE within the second RB of the OFDM symbol, and wherein the sTTI comprises two or three OFDM symbols; or selecting a sixth DMRS mapping pattern to be applied to the sTTI, wherein the sixth DMRS mapping pattern comprises the DMRS data for the first antenna port pair being mapped to the second-lowest-frequency RE, a seventh-lowest-frequency RE, and the twelfth-lowest-frequency RE, and wherein the sTTI comprises a slot of seven OFDM symbols; or selecting a seventh DMRS mapping pattern to be applied to the sTTI, wherein the seventh DMRS mapping pattern comprises the DMRS data for the first antenna port pair being mapped to the third-lowest-frequency RE, an eighth-lowest-frequency RE, and the twelfth-lowest-frequency RE, and wherein the sTTI comprises the slot of seven OFDM symbols; or selecting an eighth DMRS mapping pattern to be applied to the sTTI, wherein the eighth DMRS mapping pattern comprises the DMRS data for the first antenna port pair being mapped to the third-lowest-frequency RE, the seventh-lowest-frequency RE, and the twelfth-lowest-frequency RE, and wherein the sTTI comprises the slot of seven OFDM symbols; or selecting a ninth DMRS mapping pattern to be applied to the sTTI, wherein the ninth DMRS mapping pattern comprises the DMRS data for the first antenna port pair being mapped to the second-lowest-frequency RE, the seventh-lowest-frequency RE, and the eleventh-lowest-frequency RE, and wherein the sTTI comprises the slot of seven OFDM symbols;

determining, based at least in part on the selected mapping pattern, one or more REs within the sTTI to monitor for DMRS data; and monitoring the one or more REs for the DMRS data.

41. The method of claim 40, further comprising:
identifying the CSI-RS configuration based at least in part on whether the subframe includes CSI-RS data.

42. The method of claim 40, further comprising:
identifying the CRS configuration based at least in part on a CRS shift for a cell corresponding to the subframe.

43. The method of claim 40, further comprising:
identifying whether the subframe comprises a multicast-broadcast single-frequency network (MBSFN) subframe; and
selecting the DMRS mapping pattern based at least in part on whether the subframe comprises an MBSFN subframe.

44. The method of claim 40, further comprising:
identifying a quantity of symbols included in the sTTI; and
selecting the DMRS mapping pattern based at least in part on the quantity of symbols included in the sTTI.

45. The method of claim 40, further comprising:
identifying an index of the sTTI or of a symbol included in the sTTI; and
selecting the DMRS mapping pattern based at least in part on the index.

46. An apparatus for wireless communication, comprising:
a processor;
memory in electronic communication with the processor; and
instructions stored in the memory and executable by the processor to cause the apparatus to:
 identify a reference signal configuration of a shortened transmission time interval (sTTI) in a subframe, the reference signal configuration including at least one of a channel state information reference signal (CSI-RS) configuration or a cell-specific reference signal (CRS) configuration;

select, based at least in part on the reference signal configuration of the sTTI, a demodulation reference signal (DMRS) mapping pattern from a plurality of DMRS mapping patterns for mapping DMRS data to resource elements (REs) within the sTTI, wherein the instructions for selecting the DMRS mapping pattern are executable by the processor to cause the apparatus to:

select a first DMRS mapping pattern to be applied to the sTTI, wherein the first DMRS mapping pattern comprises DMRS data for a first antenna port pair being mapped to a second-lowest-frequency RE and a ninth-lowest-frequency RE within a first resource block (RB) of an OFDM symbol and to a fourth-lowest-frequency RE and an eleventh-lowest-frequency RE within a second RB of the OFDM symbol, and wherein the sTTI comprises two or three OFDM symbols; or select a second DMRS mapping pattern to be applied to the sTTI, wherein the second DMRS mapping pattern comprises the DMRS data for the first antenna port pair being mapped to a third-lowest-frequency RE and the ninth-lowest-frequency RE within the first RB of the OFDM symbol and to a fifth-lowest-frequency RE and a twelfth-lowest-frequency RE within the second RB of the OFDM symbol, and wherein the sTTI comprises two or three OFDM symbols; or select a third DMRS mapping pattern to be applied to the sTTI, wherein the third DMRS mapping pattern comprises the DMRS data for the first antenna port pair being mapped to the third-lowest-frequency RE and the ninth-lowest-frequency RE within the first RB of the OFDM symbol and to the fourth-lowest-frequency RE and the twelfth-lowest-frequency RE within the second RB of the OFDM symbol, and wherein the sTTI comprises two or three OFDM symbols; or select a fourth DMRS mapping pattern to be applied to the sTTI, wherein the fourth DMRS mapping pattern comprises the DMRS data for the first antenna port pair being mapped to the second-lowest-frequency RE and a tenth-lowest-frequency RE the first RB of the OFDM symbol and to the fourth-lowest-frequency RE and the eleventh-lowest-frequency RE within the second RB of the OFDM symbol, and wherein the sTTI comprises two or three OFDM symbols; or select a fifth DMRS mapping pattern to be applied to the sTTI, wherein the fifth DMRS mapping pattern comprises the DMRS data for the first antenna port pair being mapped to the third-lowest-frequency RE and the ninth-lowest-frequency RE within the first RB of the OFDM symbol and to a sixth-lowest-frequency RE and the twelfth-lowest-frequency RE within the second RB of the OFDM symbol, and wherein the sTTI comprises two or three OFDM symbols; or select aسixth DMRS mapping pattern to be applied to the sTTI, wherein the sixth DMRS mapping pattern comprises the DMRS data for the first antenna port pair being mapped to the second-lowest-frequency RE, a seventh-lowest-frequency RE, and the twelfth-lowest-frequency RE, and wherein the sTTI comprises a slot of seven OFDM symbols; or select a seventh DMRS mapping pattern to be applied to the sTTI, wherein the seventh DMRS mapping pattern comprises the DMRS data for the first antenna port pair being mapped to the third-lowest-frequency RE, an eighth-lowest-frequency RE, and the twelfth-lowest-frequency RE, and wherein the sTTI comprises the slot of seven OFDM symbols; or select an eighth DMRS mapping pattern to be applied to the sTTI, wherein the eighth DMRS mapping pattern comprises the DMRS data for the first antenna port pair being mapped to the third-lowest-frequency RE, the seventh-lowest-frequency RE, and the twelfth-lowest-frequency RE, and wherein the sTTI comprises the slot of seven OFDM symbols; or select a ninth DMRS mapping pattern to be applied to the sTTI, wherein the ninth DMRS mapping pattern comprises the DMRS data for the first antenna port pair being mapped to the second-lowest-frequency RE, the seventh-lowest-frequency RE, and the eleventh-lowest-frequency RE, and wherein the sTTI comprises the slot of seven OFDM symbols;

configure REs within the sTTI according to the selected DMRS mapping pattern; and transmit the DMRS data on the configured REs.

47. An apparatus for wireless communication, comprising:

a processor;

memory in electronic communication with the processor; and instructions stored in the memory and executable by the processor to cause the apparatus to:

identify a reference signal configuration of a shortened transmission time interval (sTTI) in a subframe, the reference signal configuration including at least one of a channel state information reference signal (CSI-RS) configuration or a cell-specific reference signal (CRS) configuration;

select, based at least in part on the reference signal configuration of the sTTI, a demodulation reference signal (DMRS) mapping pattern from a plurality of DMRS mapping patterns, wherein the instructions to for selecting the DMRS mapping pattern are executable by the processor to cause the apparatus to:

select a first DMRS mapping pattern to be applied to the sTTI, wherein the first DMRS mapping pattern comprises DMRS data for a first antenna port pair being mapped to a second-lowest-frequency RE and a ninth-lowest-frequency RE within a first resource block (RB) of an OFDM symbol and to a fourth-lowest-frequency RE and an eleventh-lowest-frequency RE within a second RB of the OFDM symbol, and wherein the sTTI comprises two or three OFDM symbols; or select a second DMRS mapping pattern to be applied to the sTTI, wherein the second DMRS mapping pattern comprises the DMRS data for the first antenna port pair being mapped to a third-lowest-frequency RE and the ninth-lowest-frequency RE within the first RB of the OFDM symbol and to a fifth-lowest-frequency RE and a twelfth-lowest-frequency RE within the second RB of the OFDM symbol, and wherein the sTTI comprises two or three OFDM symbols; or select a third DMRS mapping pattern to be applied to the sTTI, wherein the third DMRS mapping pattern comprises the DMRS data for the first antenna port pair being mapped to the third-lowest-frequency RE and the ninth-lowest-frequency RE within the first RB of the OFDM symbol and to the fourth-lowest-frequency RE and the twelfth-lowest-frequency RE within the second RB of the OFDM symbol, and wherein the sTTI comprises two or three OFDM symbols; or select a fourth DMRS mapping pattern to be applied to the sTTI, wherein the fourth DMRS mapping pattern comprises the DMRS data for the first antenna port pair being mapped to the second-lowest-frequency RE and a tenth-lowest-frequency RE the first RB of the OFDM symbol and to the fourth-lowest-frequency RE and the eleventh-lowest-frequency RE within the second RB of the OFDM symbol, and wherein the sTTI comprises two or three OFDM symbols; or select a fifth DMRS mapping pattern to be applied to the sTTI, wherein the fifth DMRS mapping pattern comprises the DMRS data for the first antenna port pair being mapped to the third-lowest-frequency RE and the ninth-lowest-frequency RE within the first RB of the OFDM symbol and to a sixth-lowest-frequency RE and the twelfth-lowest-frequency RE within the second RB of the OFDM symbol, and wherein the sTTI comprises two or three OFDM symbols; or select a sixth DMRS mapping pattern to be applied to the sTTI, wherein the sixth DMRS mapping pattern comprises the DMRS data for the first antenna port pair being mapped to the second-lowest-frequency RE, a seventh-lowest-frequency RE, and the twelfth-lowest-frequency RE, and wherein the sTTI comprises a slot of seven OFDM symbols; or select a seventh DMRS mapping pattern to be applied to the sTTI, wherein the seventh DMRS mapping pattern comprises the DMRS data for the first antenna port pair being mapped to the third-lowest-frequency RE, an eighth-lowest-frequency RE, and the twelfth-lowest-frequency RE, and wherein the sTTI comprises the slot of seven OFDM symbols; or select an eighth DMRS mapping pattern to be applied to the sTTI, wherein the eighth DMRS mapping pattern comprises the DMRS data for the first antenna port pair being mapped to the third-lowest-frequency RE, the seventh-lowest-frequency RE, and the twelfth-lowest-frequency RE, and wherein the sTTI comprises the slot of seven OFDM symbols; or select a ninth DMRS mapping pattern to be applied to the sTTI, wherein the ninth DMRS mapping pattern comprises the DMRS data for the first antenna port pair being mapped to the second-lowest-frequency RE, the seventh-lowest-frequency RE, and the eleventh-lowest-frequency RE, and wherein the sTTI comprises the slot of seven OFDM symbols;

determine, based at least in part on the selected mapping pattern, one or more REs within the sTTI to monitor for DMRS data; and monitor the one or more REs for the DMRS data.

* * * * *